United States Patent
Amitai et al.

(10) Patent No.: US 11,340,458 B2
(45) Date of Patent: May 24, 2022

(54) HIGHLY EFFICIENT COMPACT HEAD-MOUNTED DISPLAY SYSTEM

(71) Applicant: OORYM OPTICS LTD., Rehovot (IL)

(72) Inventors: Yaakov Amitai, Rehovot (IL); Menachem Amitai, Rehovot (IL)

(73) Assignee: OORYM OPTICS LTD., Rehovot (IL)

( * ) Notice: Subject to any disclaimer, the term of this patent is extended or adjusted under 35 U.S.C. 154(b) by 98 days.

(21) Appl. No.: 16/753,170

(22) PCT Filed: Oct. 15, 2018

(86) PCT No.: PCT/IL2018/051105
§ 371 (c)(1),
(2) Date: Apr. 2, 2020

(87) PCT Pub. No.: WO2019/077601
PCT Pub. Date: Apr. 25, 2019

(65) Prior Publication Data
US 2020/0292818 A1    Sep. 17, 2020

(30) Foreign Application Priority Data

Oct. 16, 2017 (IL) ............................. 255049
Jan. 21, 2018 (IL) ............................. 257039

(51) Int. Cl.
*G02B 27/01* (2006.01)
(52) U.S. Cl.
CPC .... *G02B 27/0172* (2013.01); *G02B 2027/013* (2013.01); *G02B 2027/0125* (2013.01)
(58) Field of Classification Search
CPC .......................... G02B 27/017; G02B 27/0172
See application file for complete search history.

(56) References Cited

U.S. PATENT DOCUMENTS

2003/0165017 A1* 9/2003 Amitai ............... G02B 27/0172
                                                                359/636
2015/0241707 A1   8/2015 Schowengerdt
(Continued)

FOREIGN PATENT DOCUMENTS

IL            244181 A  *  7/2016  ............. G02B 6/00
WO       WO 01/95027       12/2001
WO       WO 2017/141242     8/2017

OTHER PUBLICATIONS

European Patent Office, European International Search Report and Written Opinion of the International Searching Authority, PCT/IL2018/051105, dated Jan. 21, 2019, 10 pages.

*Primary Examiner* — Alexander Eisen
*Assistant Examiner* — Cory A Almeida

(57) ABSTRACT

An optical device includes input and output apertures (86, 89), a light-transmitting substrate (64), a coupling-in element (55) positioned outside of the substrate for coupling light waves having a field-of view into the substrate, a first flat reflecting surface (65) located between two major surfaces (70,72) of the light-transmitting substrate for total internal reflection of the coupled-in light waves from the major surfaces, and a second flat reflecting surface (67) located between the two major substrate surfaces for coupling light waves out of the substrate for redirecting into a viewer's eye by an optical element (80). The substrate and coupling-in element (55) are formed of substantially different optical materials and the ratio between the fields of view of the light waves coupled-out from the substrate into the viewers' eye and of the light waves coupled inside the substrate, is substantially bigger than the refractive index of the substrate.

20 Claims, 31 Drawing Sheets

(56) References Cited

U.S. PATENT DOCUMENTS

2015/0260992 A1* 9/2015 Luttmann .......... G02B 27/0172
359/631
2019/0129175 A1* 5/2019 Amitai ..................... G02B 6/00

* cited by examiner

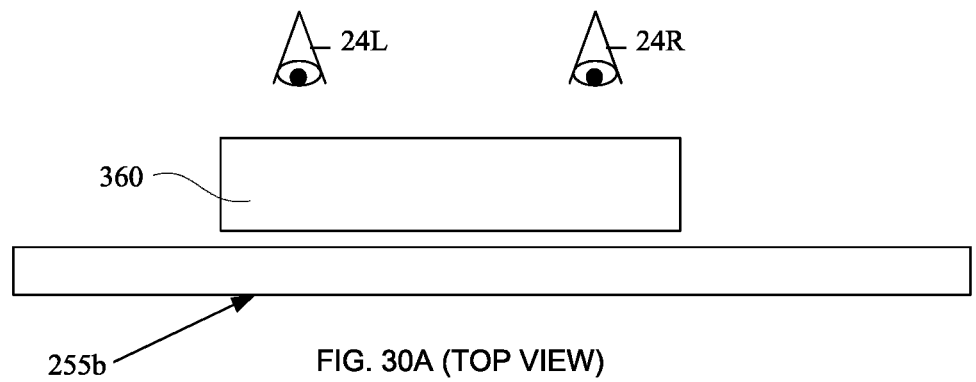
FIG. 30A (TOP VIEW)
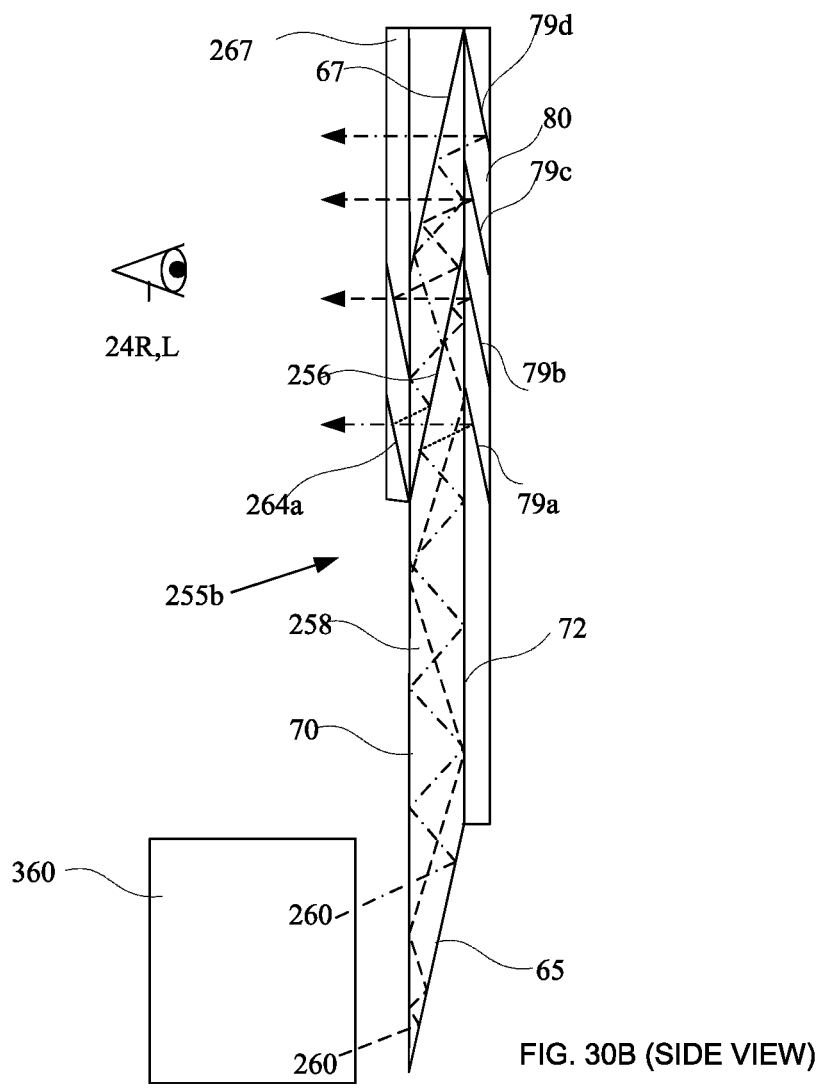
FIG. 30B (SIDE VIEW)

HIGHLY EFFICIENT COMPACT HEAD-MOUNTED DISPLAY SYSTEM

FIELD OF THE INVENTION

The present invention relates to substrate-based light waves guided optical devices, and particularly to devices which include a reflecting surface carried by a light-transmissive substrate and a dynamic partially reflecting surface which is attached the substrate.

The invention can be implemented to advantage in a large number of imaging applications, such as, head-mounted and head-up displays, cellular phones, compact displays, 3-D displays, compact beam expanders, as well as non-imaging applications such as flat-panel indicators, compact illuminators and scanners.

BACKGROUND OF THE INVENTION

One of the important applications for compact optical elements is in head-mounted displays (HMDs), wherein an optical module serves both as an imaging lens and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), or a scanning source and similar devices, or indirectly, by means of a relay lens, or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for a moderate performance device, is impractical. This is a major drawback for all kinds of displays but especially in HMDs, wherein the system should be as light and compact as possible.

The need for compactness has led to several different complex optical solutions, all of which, on the one hand, are still not sufficiently compact for most practical applications, and on the other hand, suffer major drawbacks in terms of manufacturability. Furthermore, the eye-motion-box (EMB) of the optical viewing angles resulting from these designs is usually very small, typically less than 8 mm. Hence, the performance of the optical system is very sensitive, even for small movements of the optical system relative to the eye of the viewer, and do not allow sufficient pupil motion for conveniently reading text from such displays.

The teachings included in Publication Nos. WO2017/141239, WO2017/141240, and WO2017/141242, are herein incorporated by reference.

SUMMARY OF THE INVENTION

The present invention facilitates the provision of compact substrates for, amongst other applications, HMDs. The invention allows relatively wide FOVs together with relatively large EMB values. The resulting optical system offers a large, high-quality image, which also accommodates large movements of the eye. The optical system according to the present invention is particularly advantageous because it is substantially more compact than state-of-the-art implementations, and yet it can be readily incorporated, even into optical systems having specialized configurations.

A further application of the present invention is to provide a compact display with a wide FOV for mobile, hand-held applications such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically compact display with a large virtual image. This is a key feature in mobile communi-cations, and especially for mobile internet access, solving one of the main limitations for its practical implementation, thereby enabling the viewing of digital content of a full format internet page within a small, hand-held device, such as a cellular phone.

A broad object of the present invention is, therefore, to alleviate the drawbacks of state-of-the-art compact optical display devices and to provide other optical components and systems having improved performance, according to specific requirements.

In accordance with the present invention there is therefore provided an optical device comprising an input aperture, an output aperture, a light-transmitting substrate having at least two major surfaces and edges, composed of a first optical material, a coupling-in element positioned outside of the substrate and composed of a second optical material, for coupling light waves having a field-of view into the substrate, a first flat reflecting surface located between the two major surfaces of the light-transmitting substrate for reflecting the coupled-in light waves to effect total internal reflection from the major surfaces of the substrate, a second flat reflecting surface having at least one active side located between the two major surfaces of the light-transmitting substrate for coupling light waves out of the substrate, and a redirecting optical element positioned outside of the substrate for redirecting light waves coupled-out from the substrate into a viewer's eye, wherein the refractive indices of the first and the second optical materials are substantially different and the ratio between the field of view of the light waves coupled-out from the substrate into the viewers' eye and the field of view of the light waves coupled inside the substrate, is substantially bigger than the refractive index of the first optical material.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for the purpose of illustrative discussion of the preferred embodiments of the present invention only, and are presented to provide what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a prior art exemplary light-transmitting substrate;

FIGS. 2A and 2B illustrate desired reflectance and transmittance characteristics of selectively reflecting surfaces, used in a prior art exemplary light-transmitting substrate, for two ranges of incident angles;

FIG. 3 illustrates a reflectance curve as a function of the incident angle for an exemplary dielectric coating;

FIG. 4 is a schematic sectional view of a light-transmitting substrate, wherein the coupling-in, as well as the coupling-out elements, are diffractive optical elements;

FIGS. 5A and 5B illustrate sectional views of a transparent substrate having coupling-in and coupling-out surfaces, and a partially reflecting combining element;

FIGS. 6A and 6B are schematic sectional views of an active folding partially reflecting element which dynamically redirects the coupled-out light waves into a viewer's eye, according to the present invention;

FIGS. 7A and 7B are other embodiments of schematic sectional views of an active folding partially reflecting element which dynamically redirects the coupled-out light waves into a viewer's eye, according to the present invention;

Figure 8A:
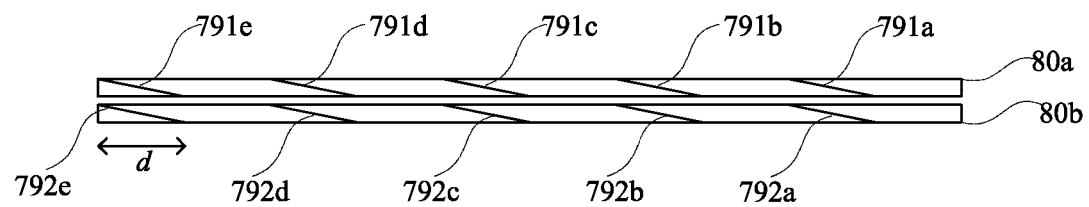
Figure 8B:
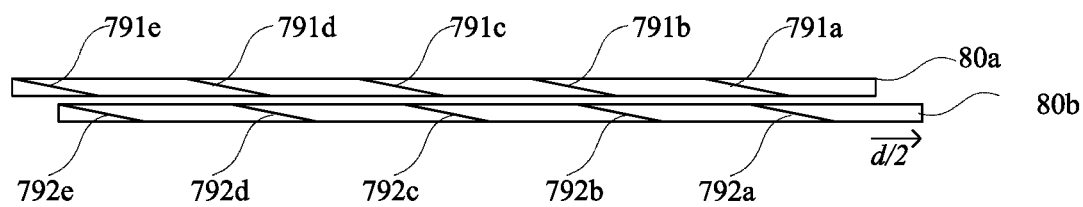
Figure 8C:
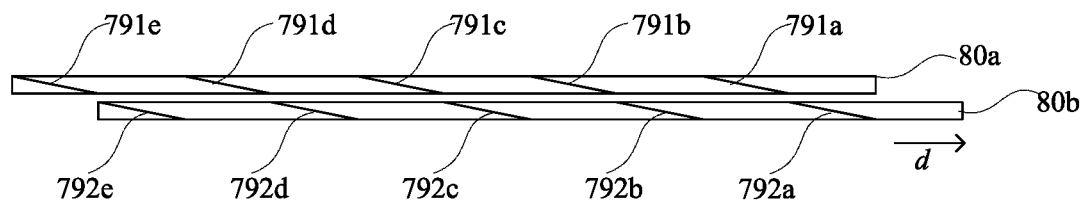
Figure 9A:
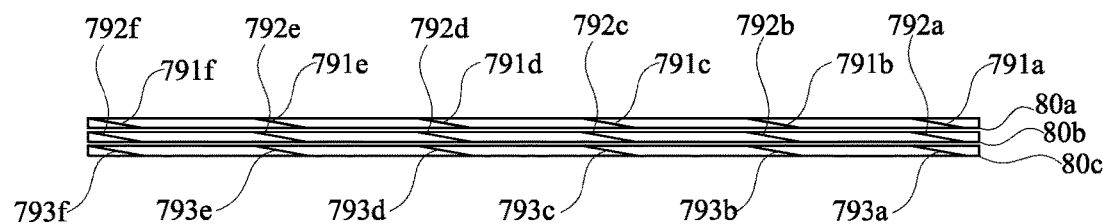
Figure 9B:
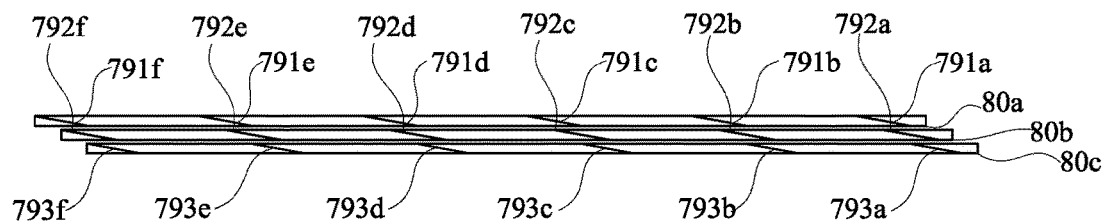
Figure 9C:
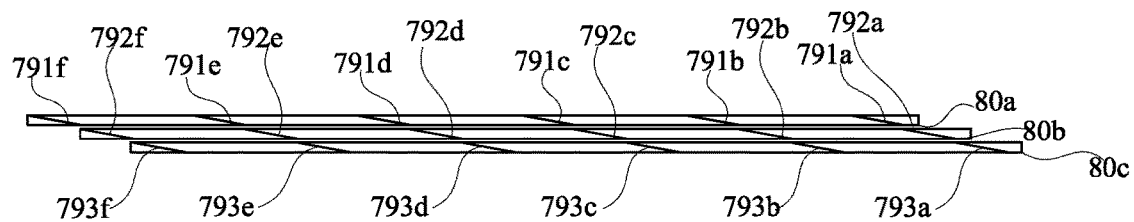
Figure 10A:
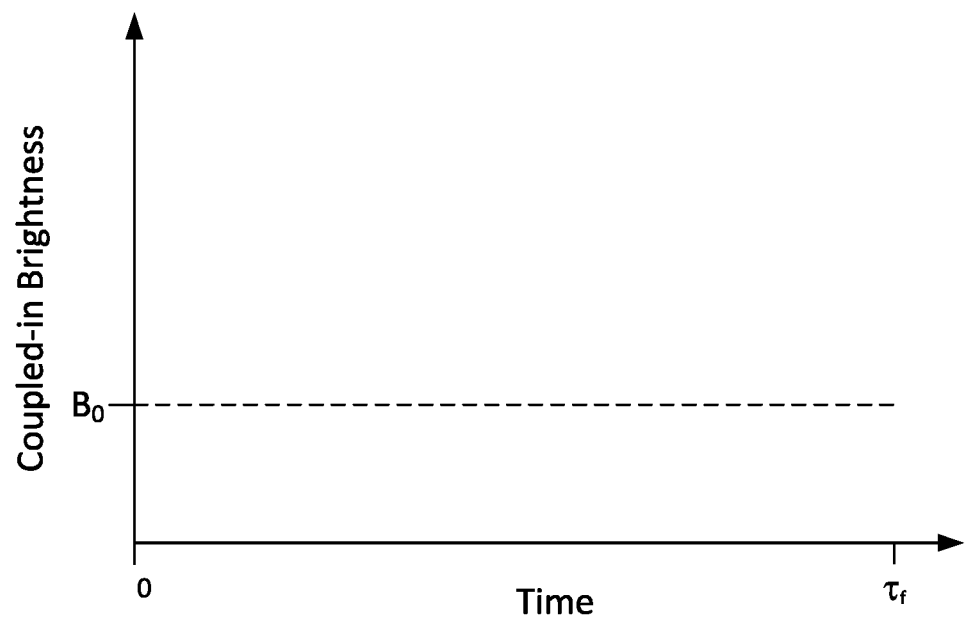
Figure 10B:
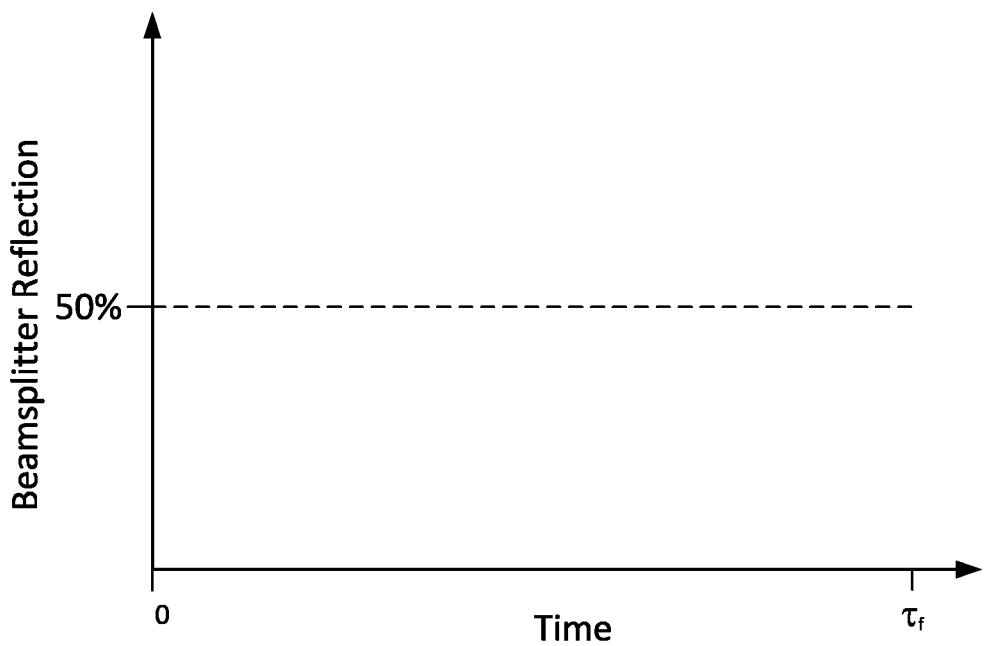
Figure 11A:
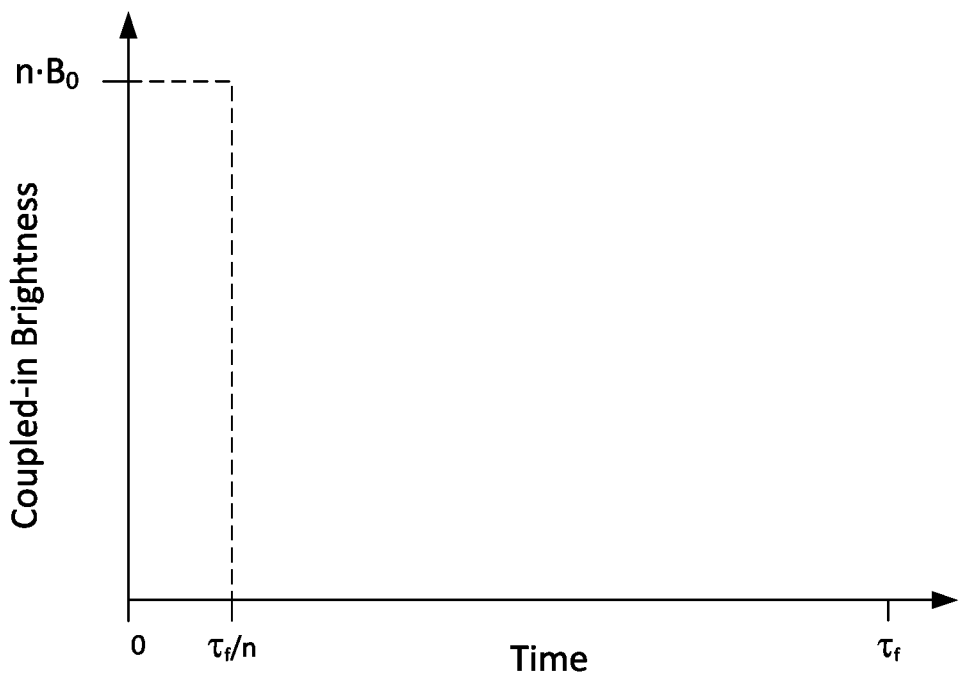
Figure 11B:
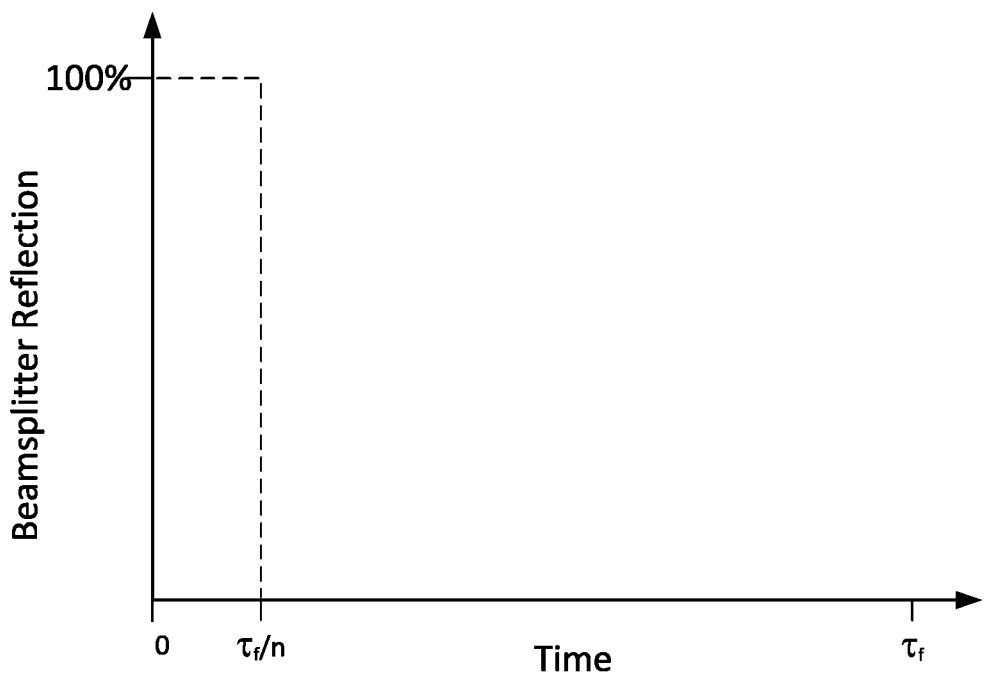
Figure 12A:
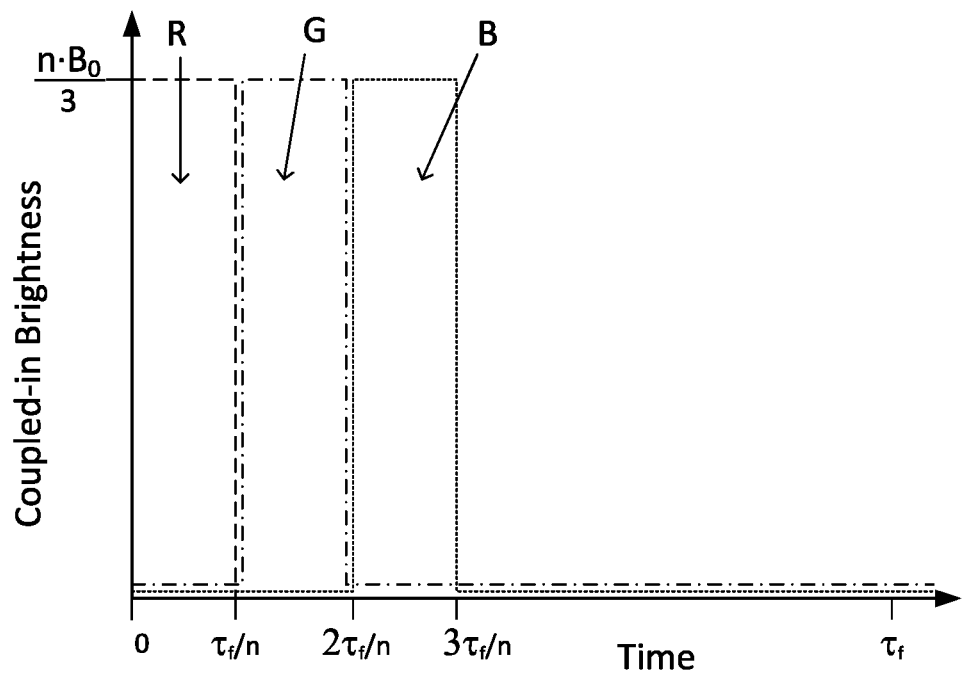
Figure 12B:
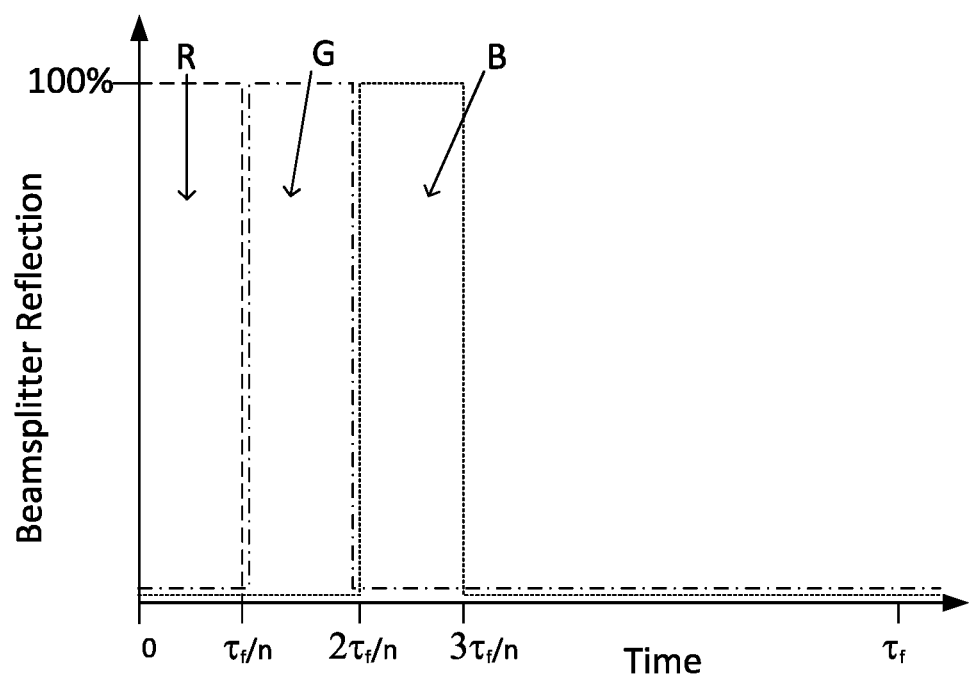
Figure 13A:
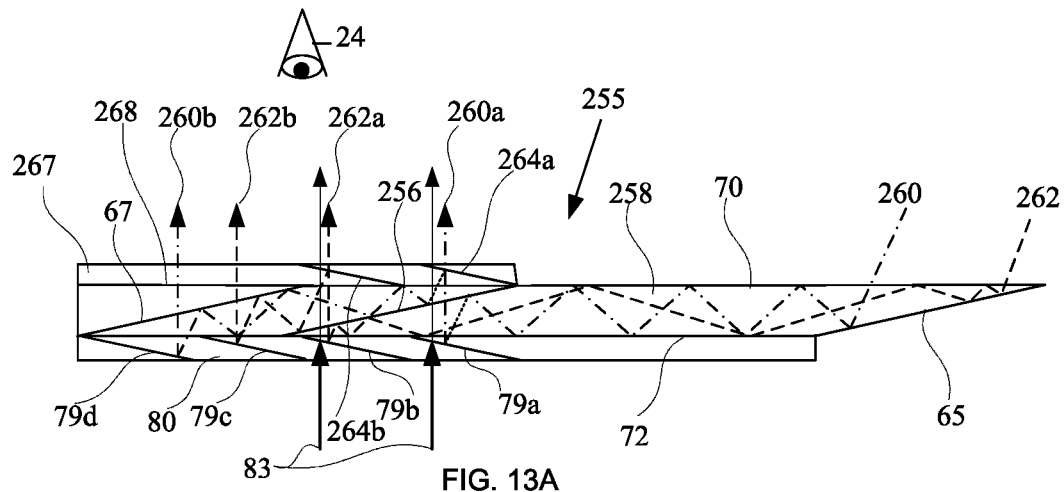
Figure 13B:
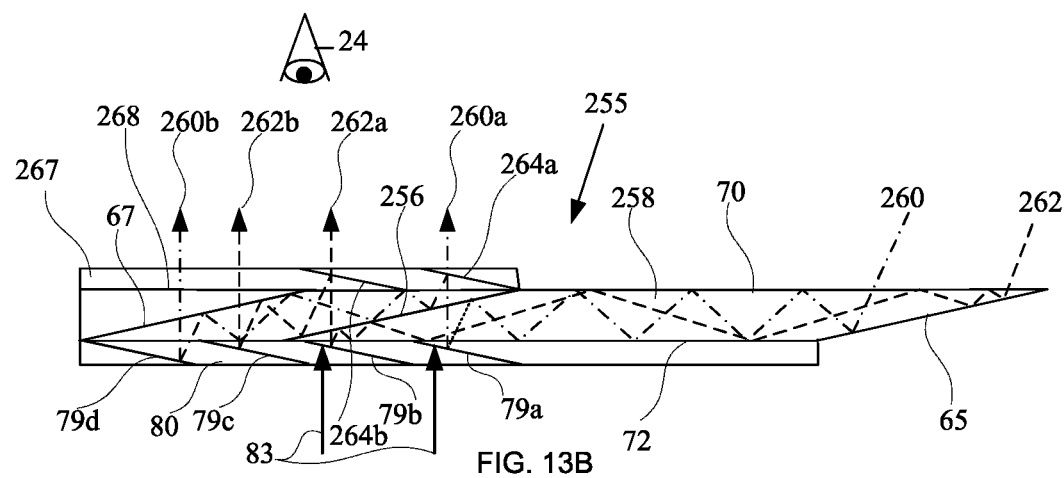
Figure 13C:
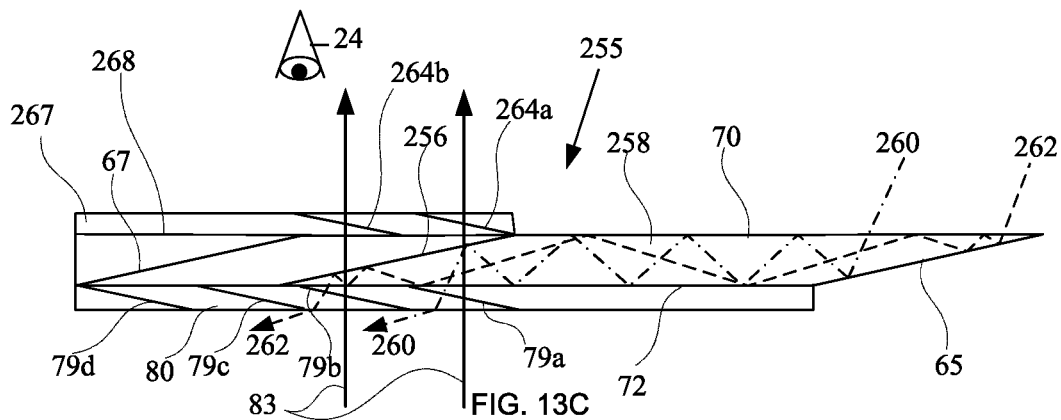
Figure 15A:
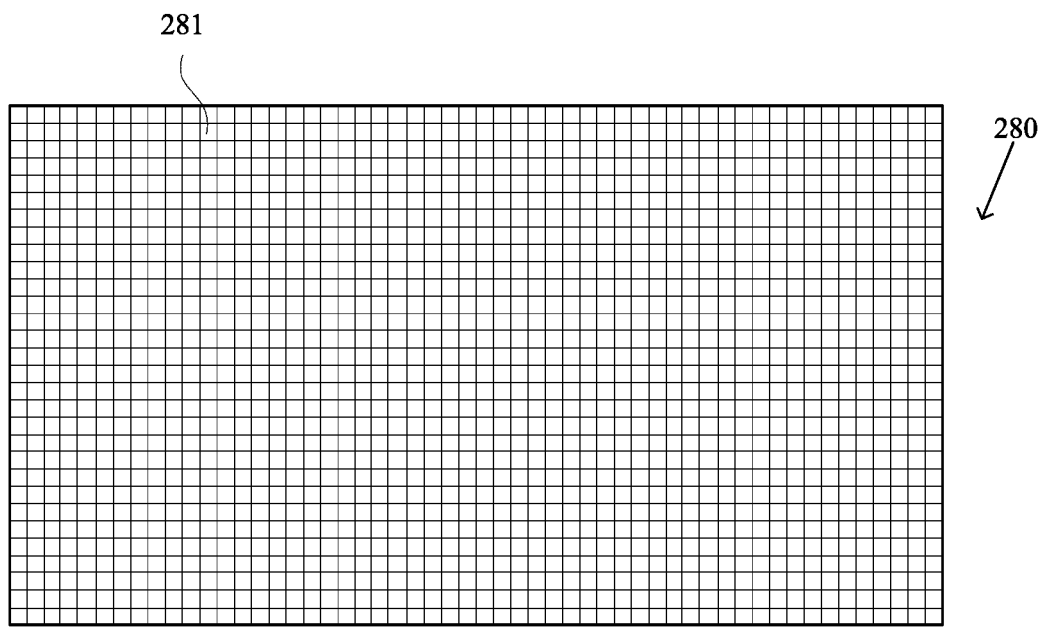
Figure 15B:
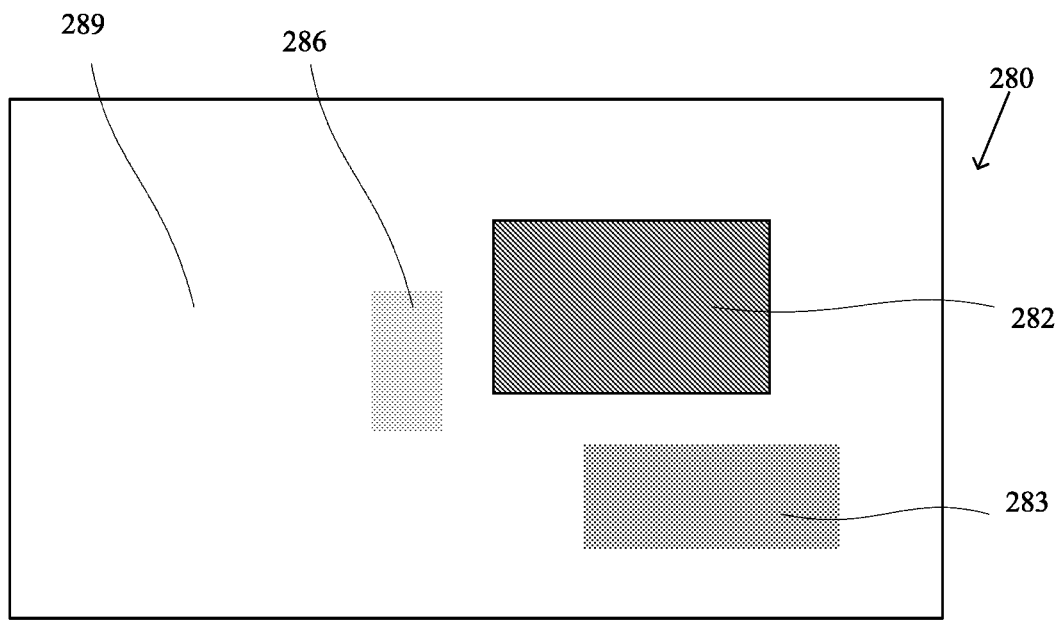
Figure 16A:
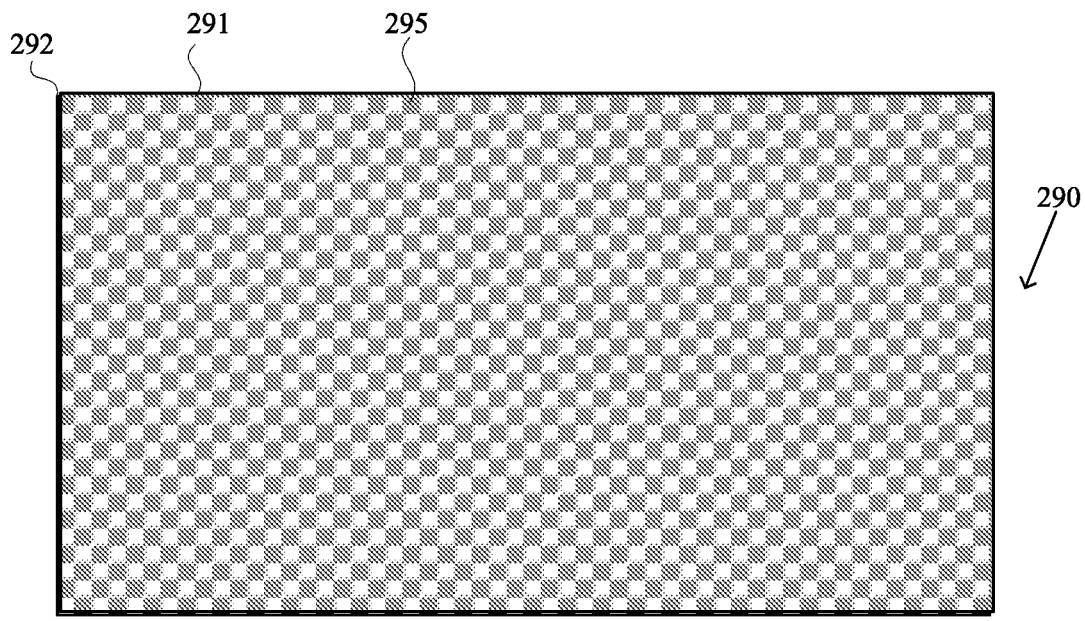
Figure 16B:
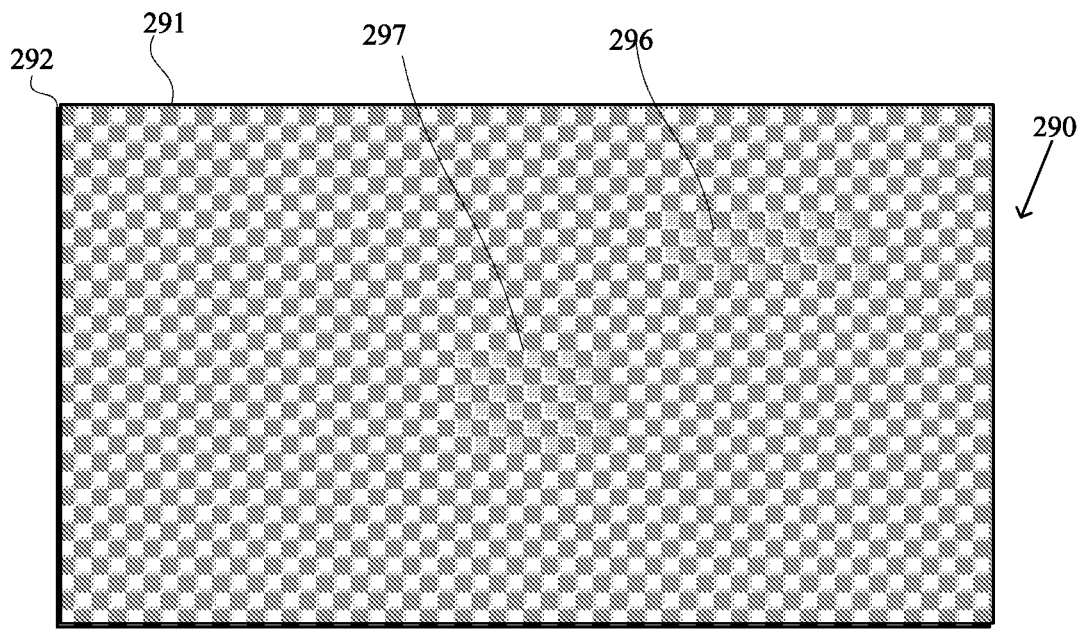
Figure 17A:
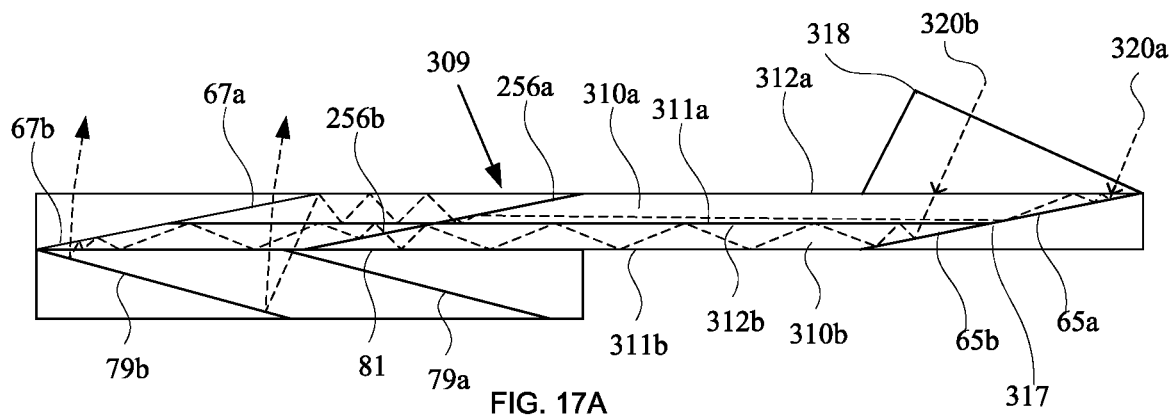
Figure 17B:
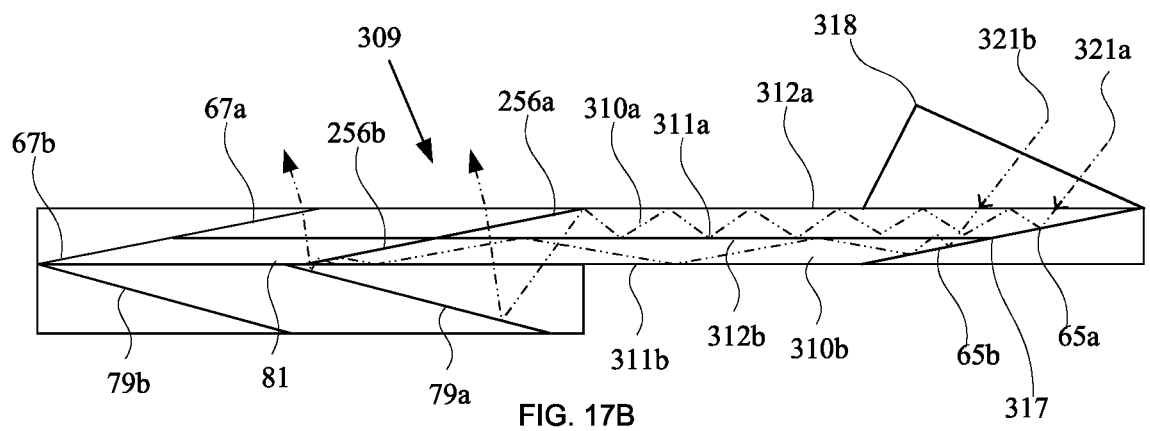
Figure 17C:
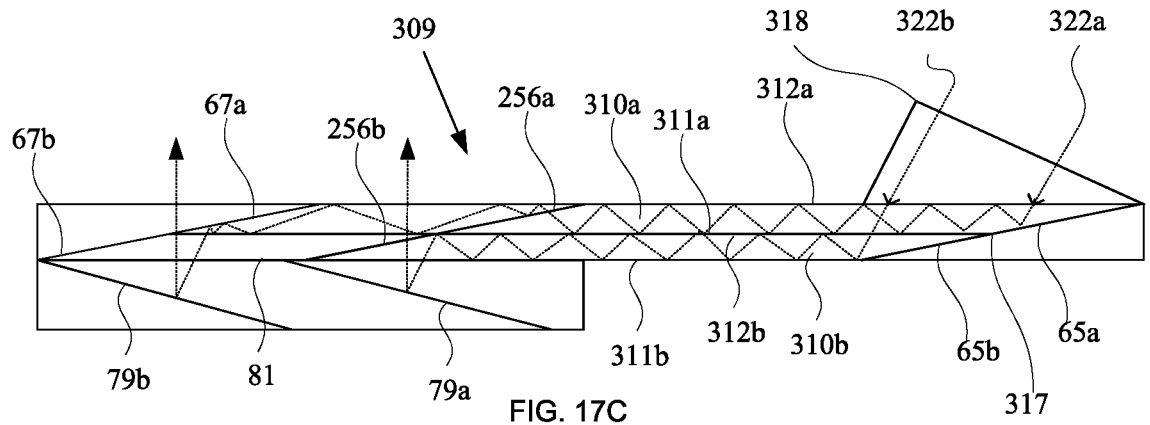
Figure 18:
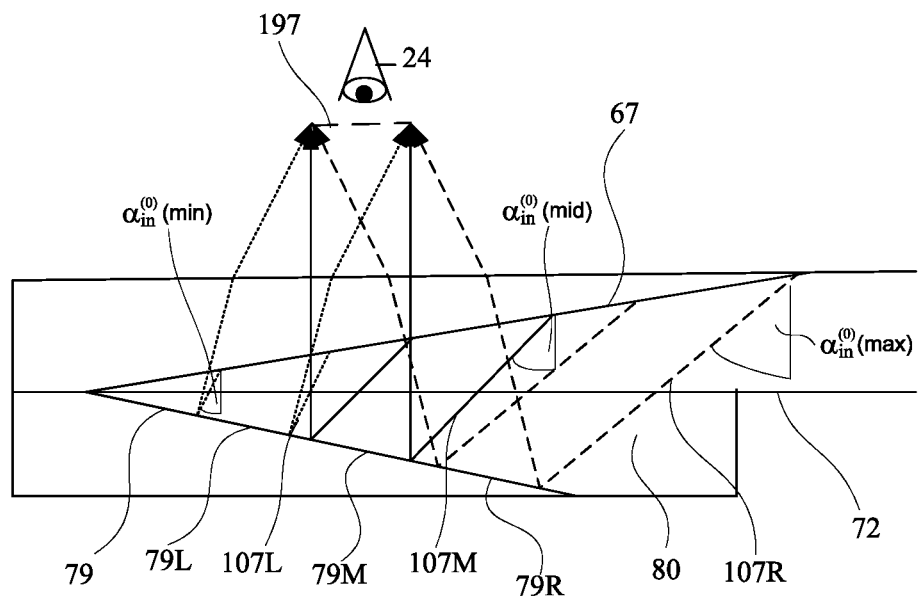
Figure 19A:
Figure 19B:
Figure 20:
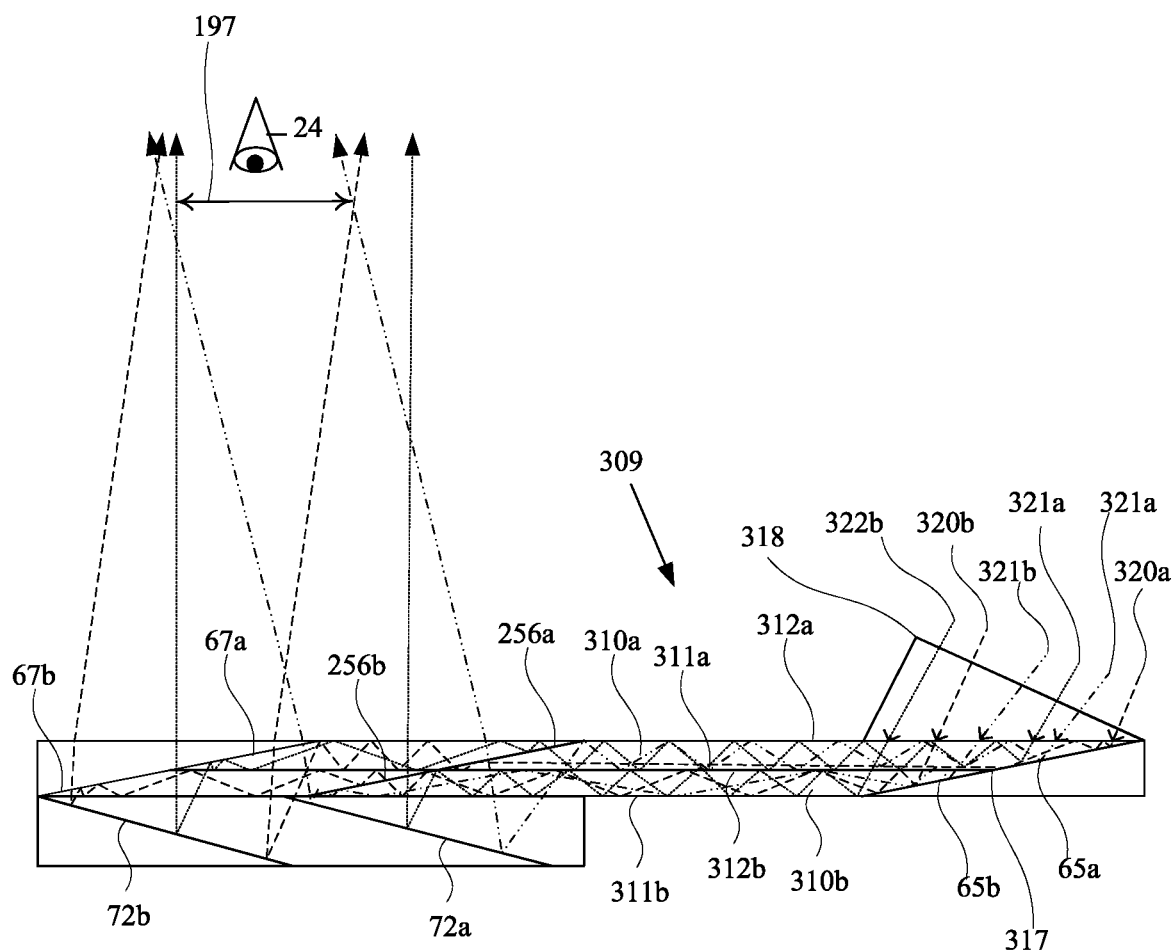
Figure 21:
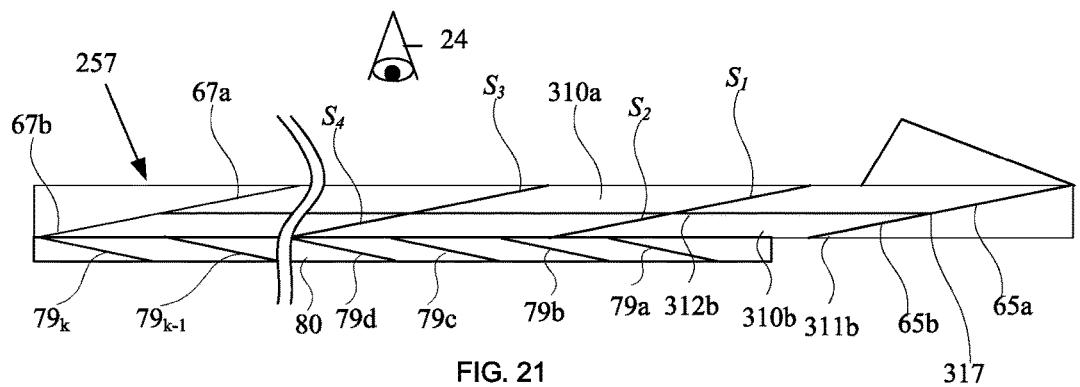
Figure 22:
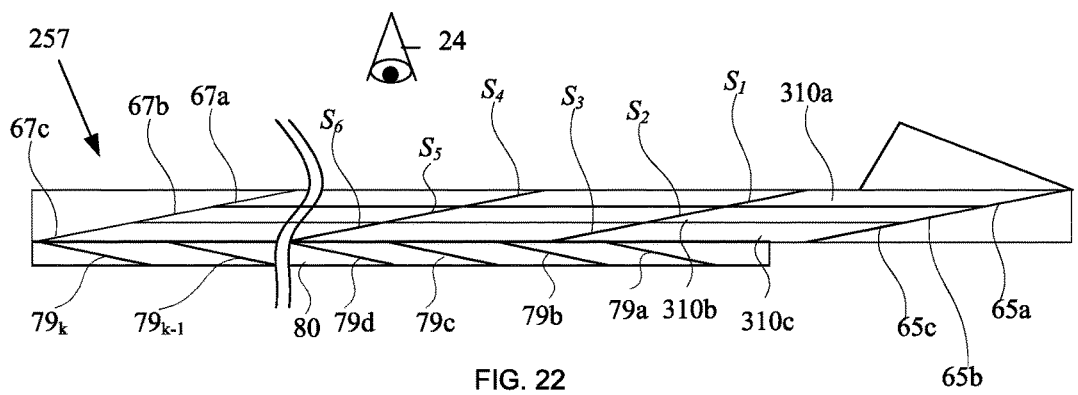
Figure 23:
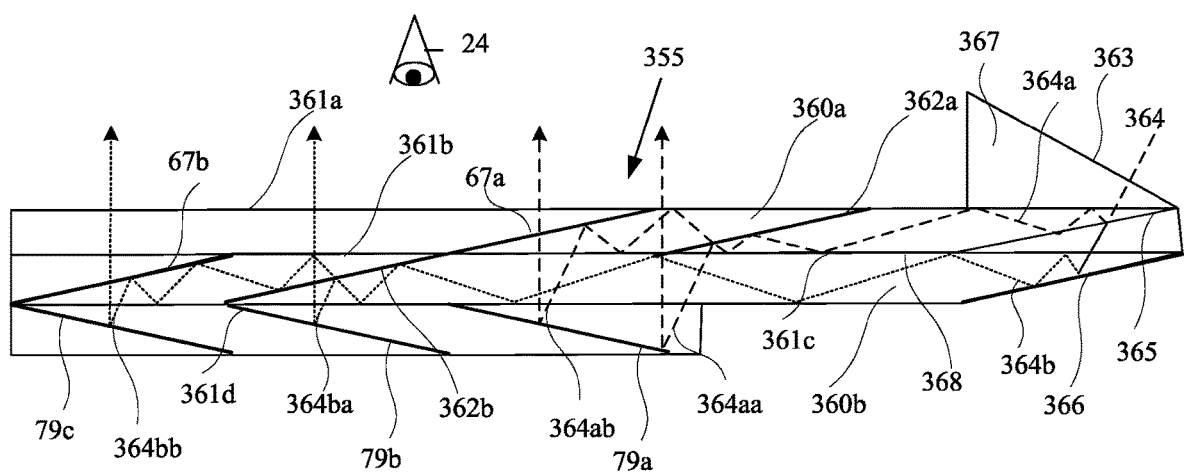
Figure 24A:
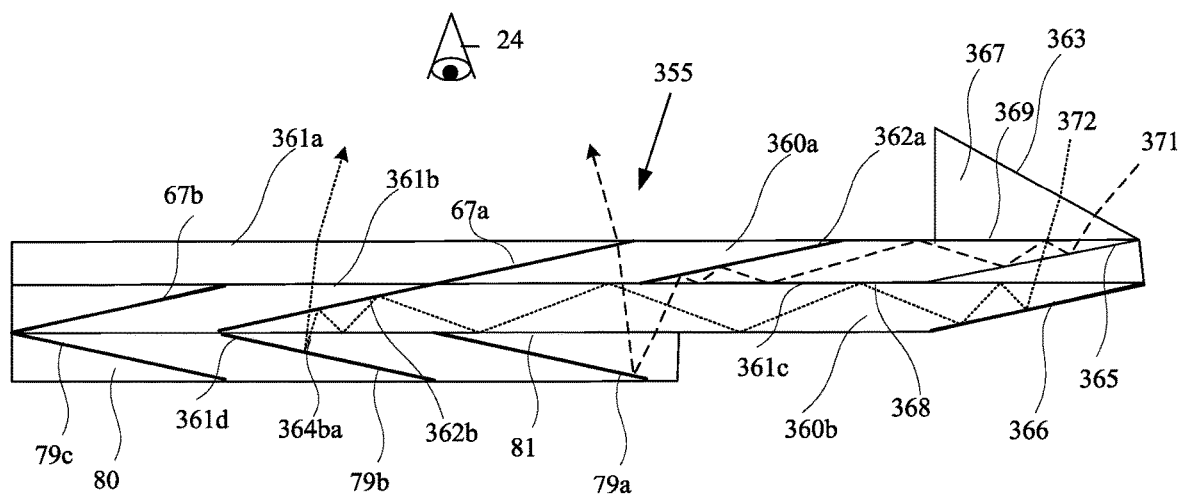
Figure 24B:
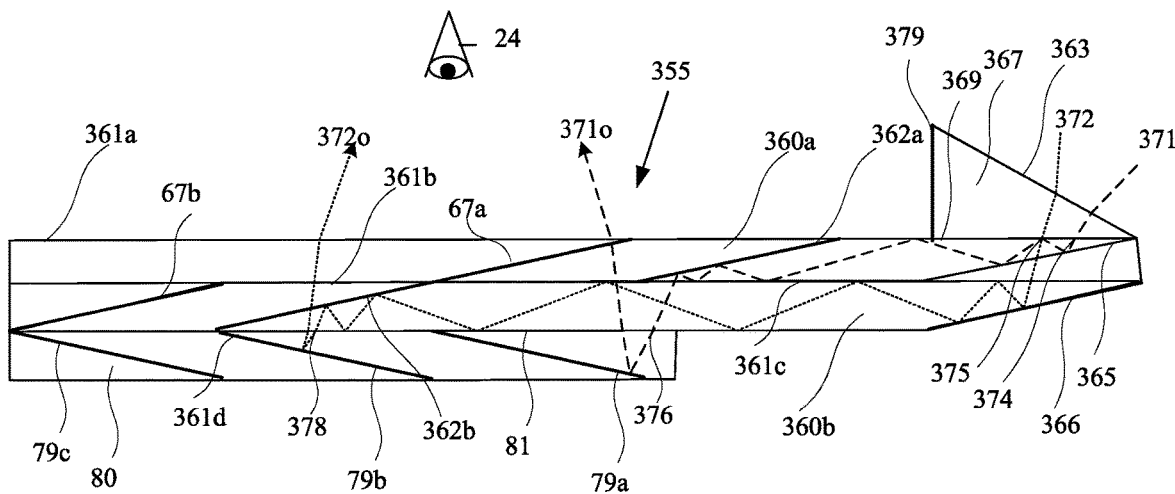
Figure 25A:
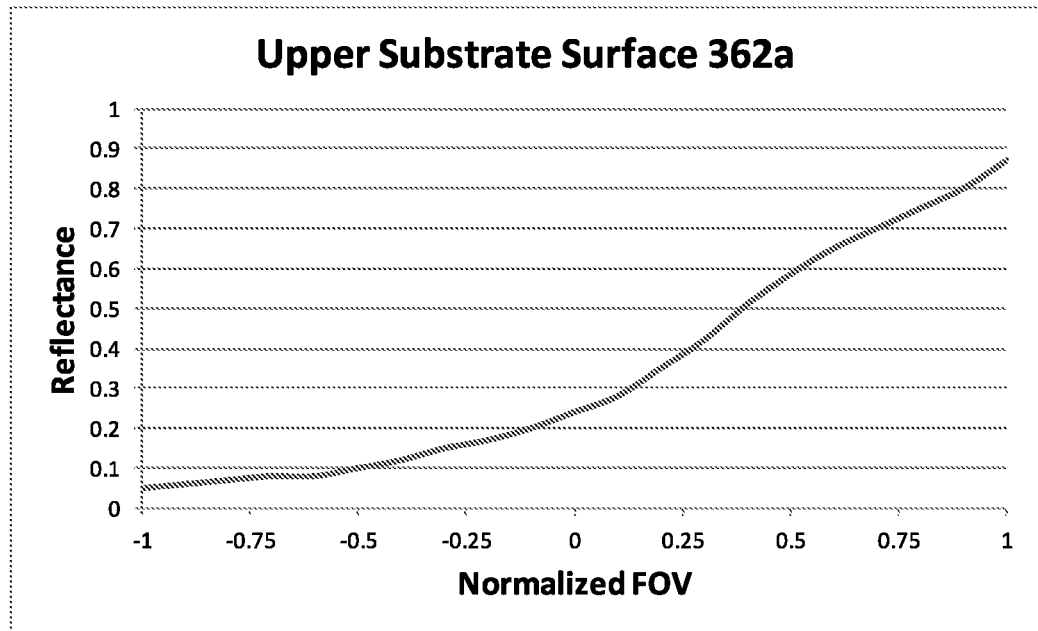
Figure 25B:
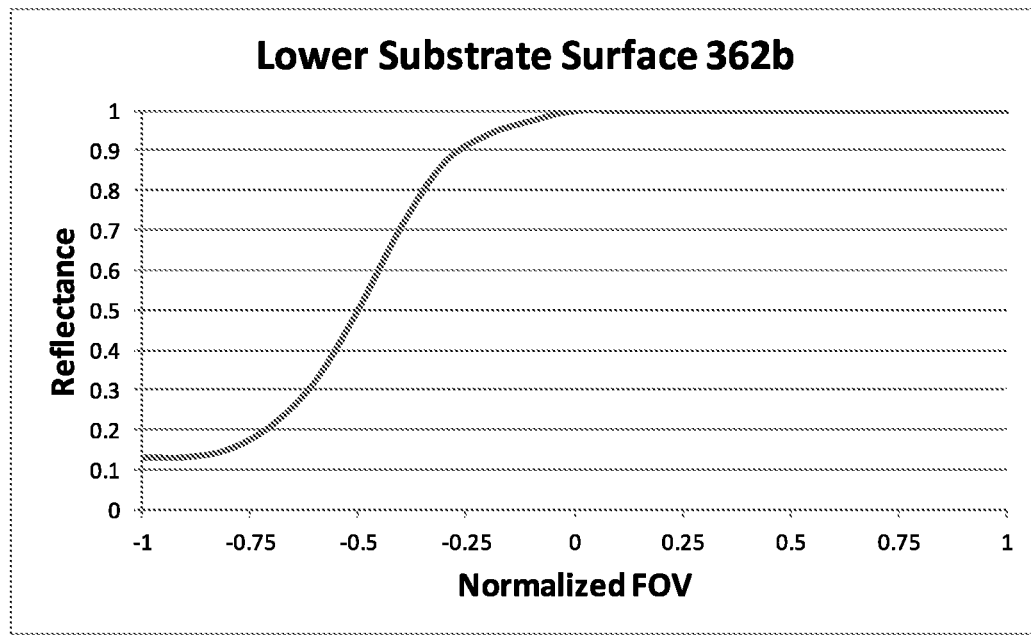
Figure 25C:
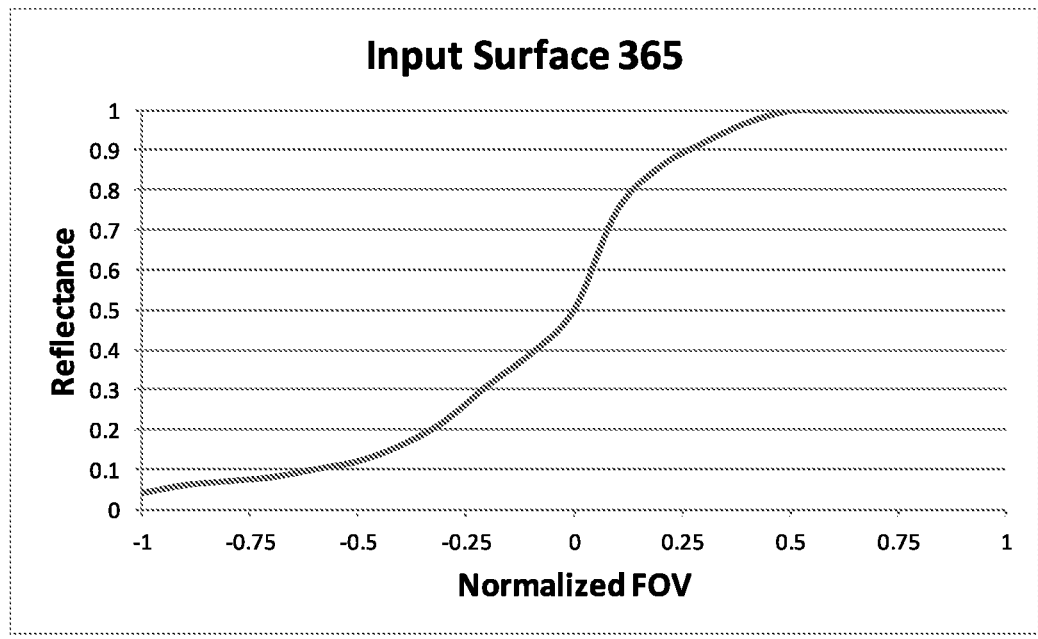
Figure 26:
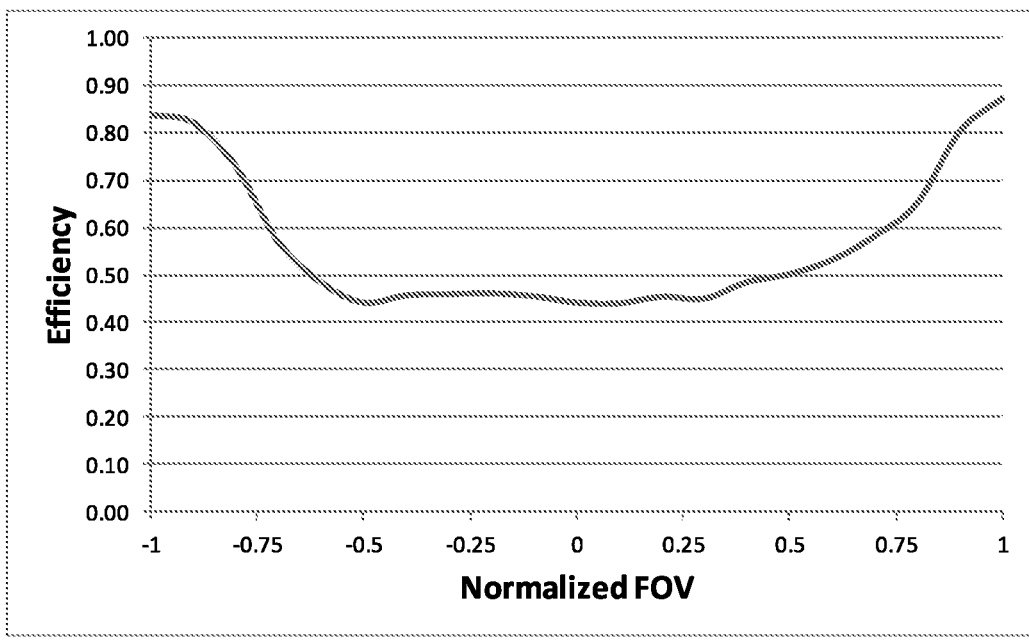
Figure 27A:
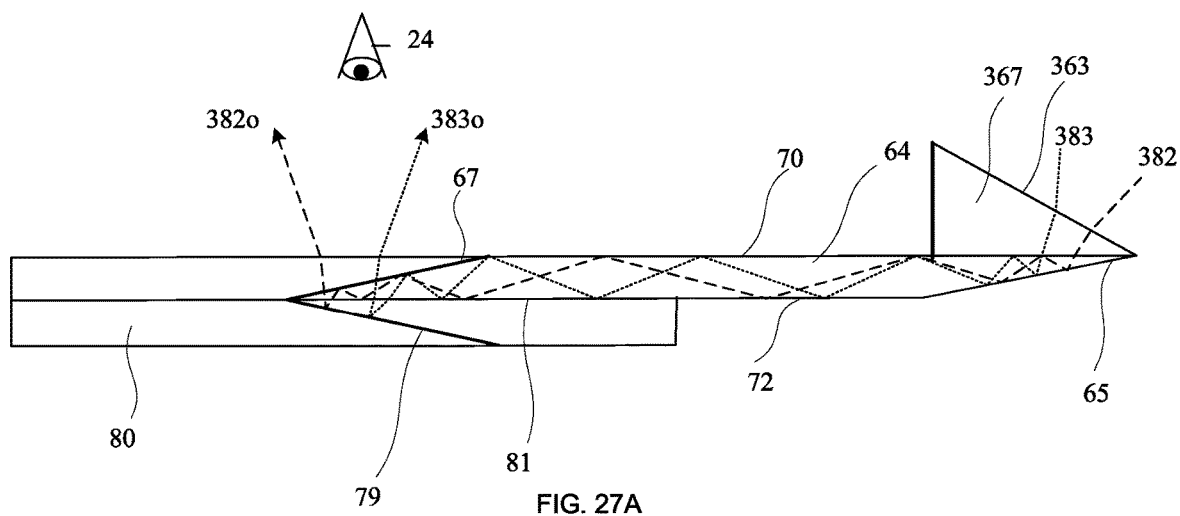
Figure 27B:
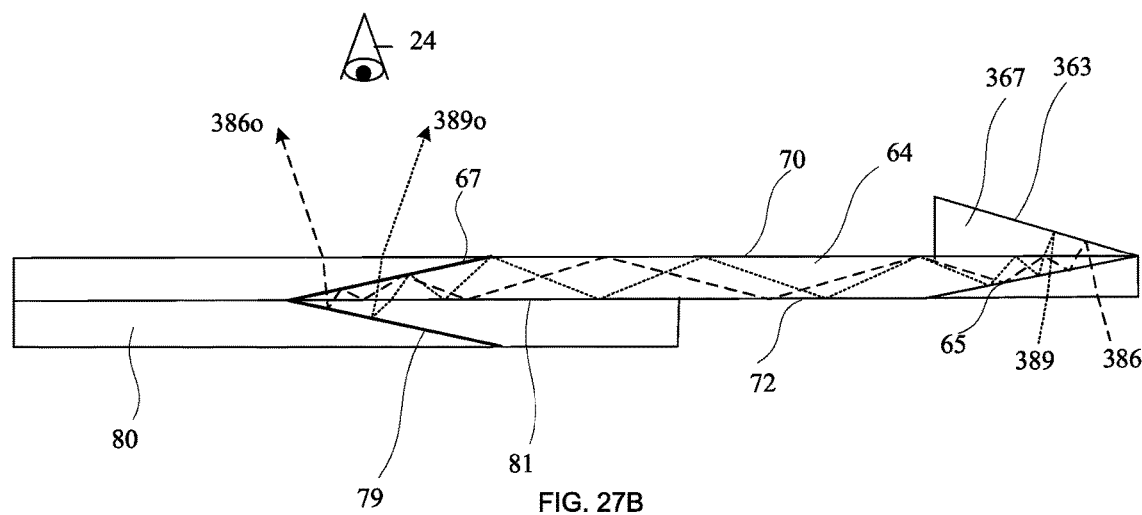
Figure 28A:
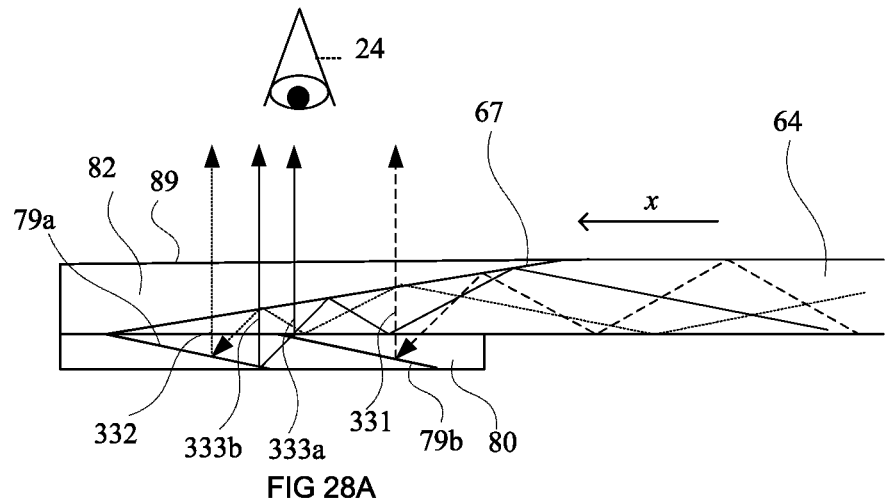
Figure 28B:
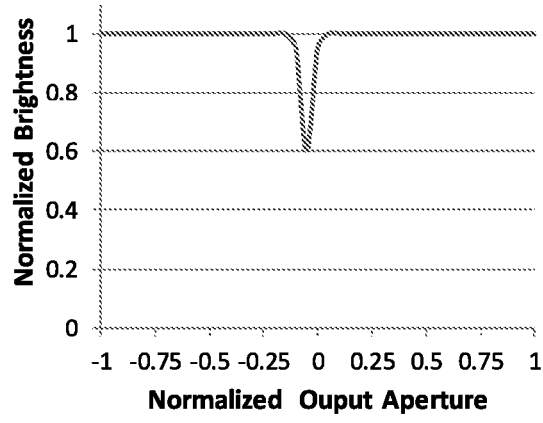
Figure 29A:
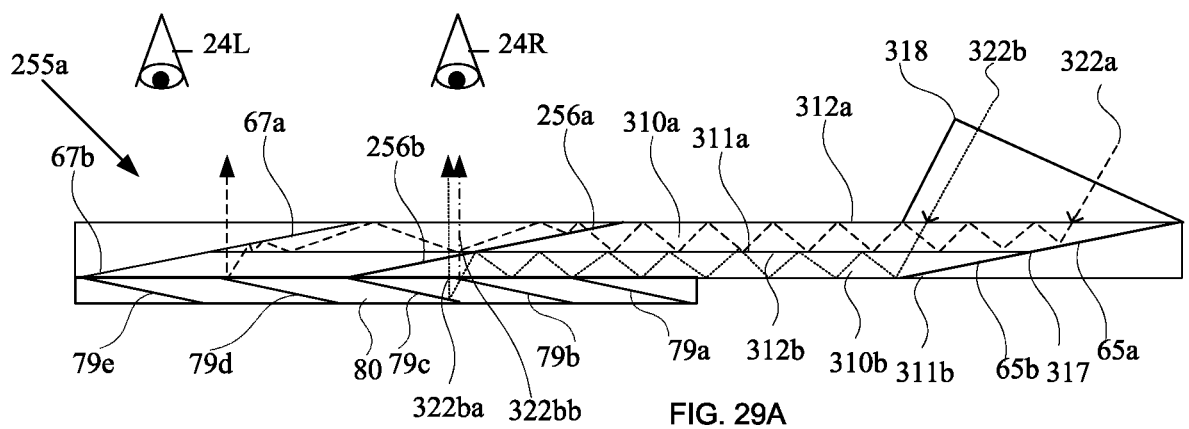
Figure 29B:
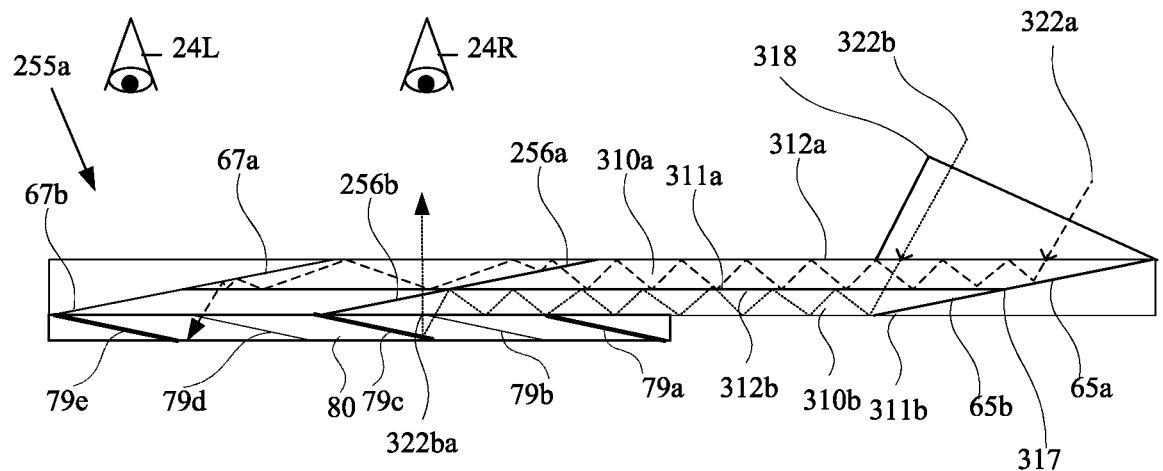
Figure 29C:
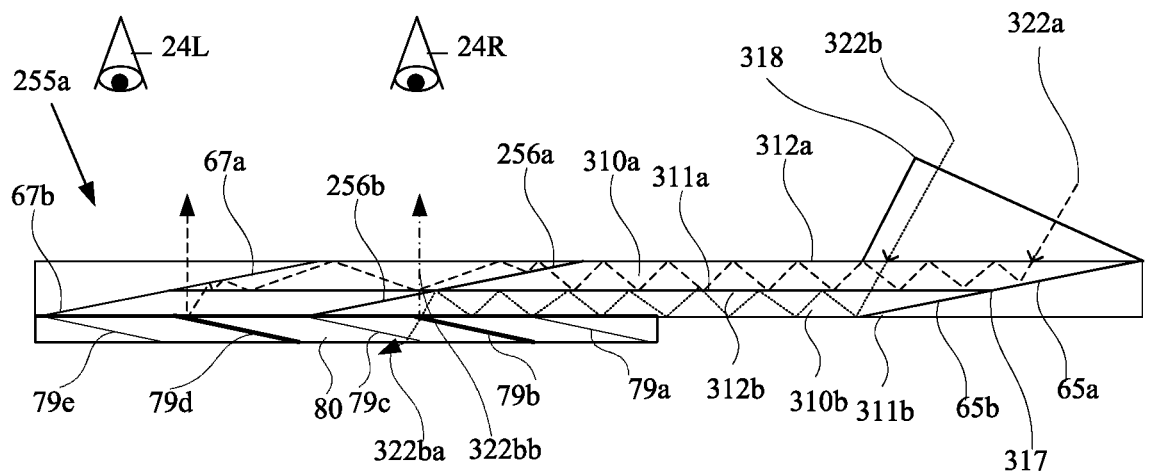
Figure 31A:
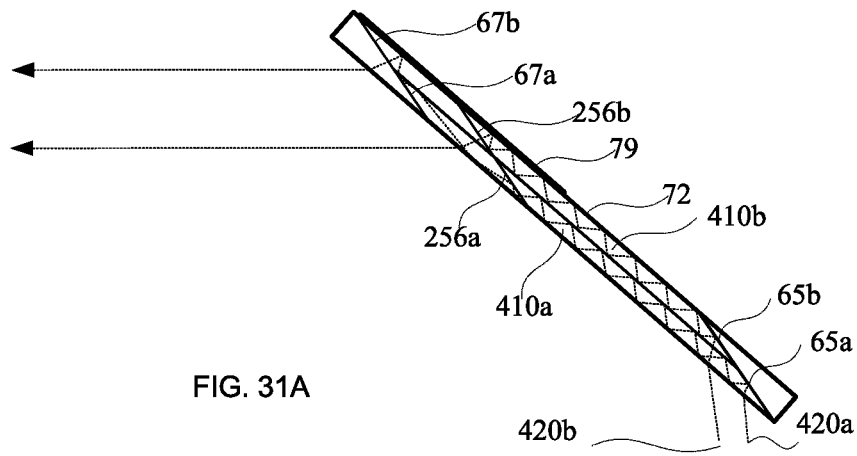
Figure 31B:
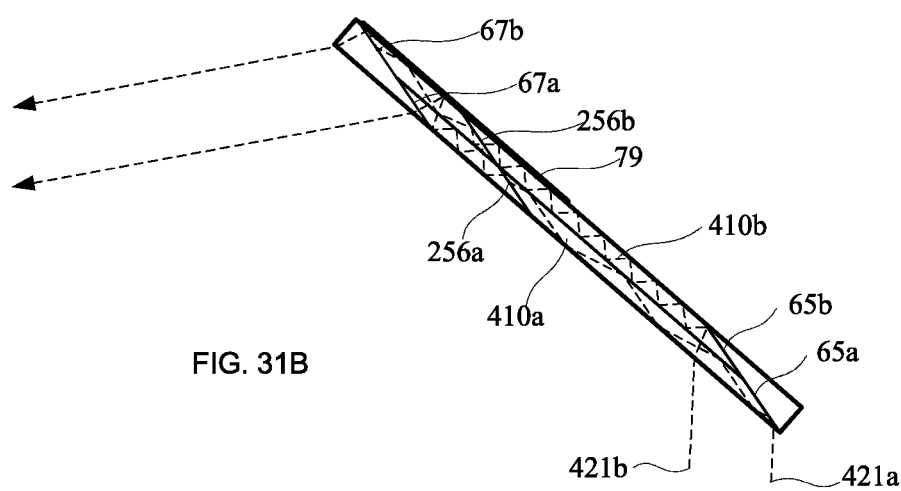
Figure 31C:
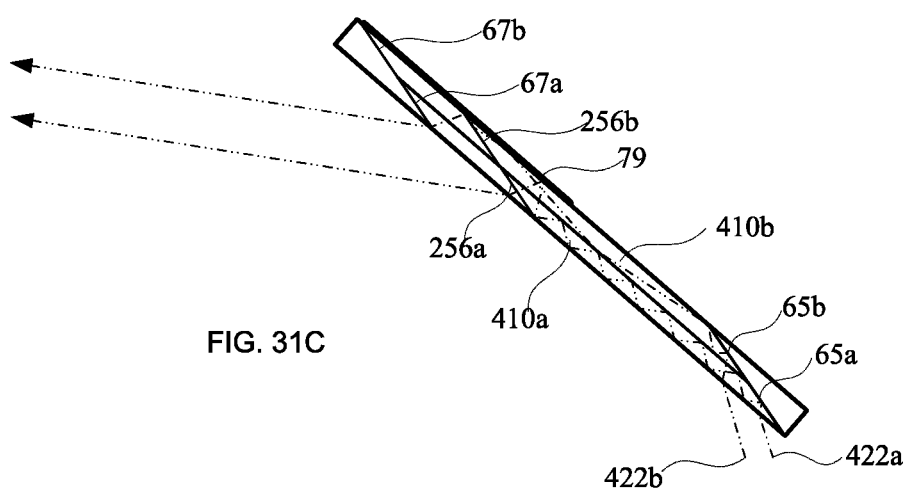
Figure 32A:
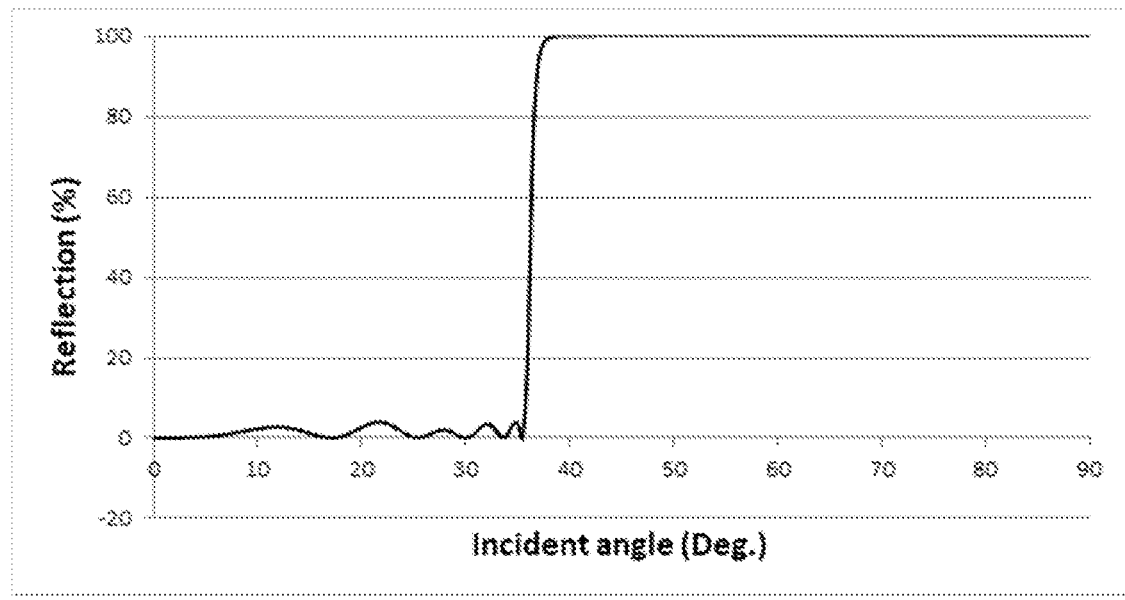
Figure 32B:
Figure 33:
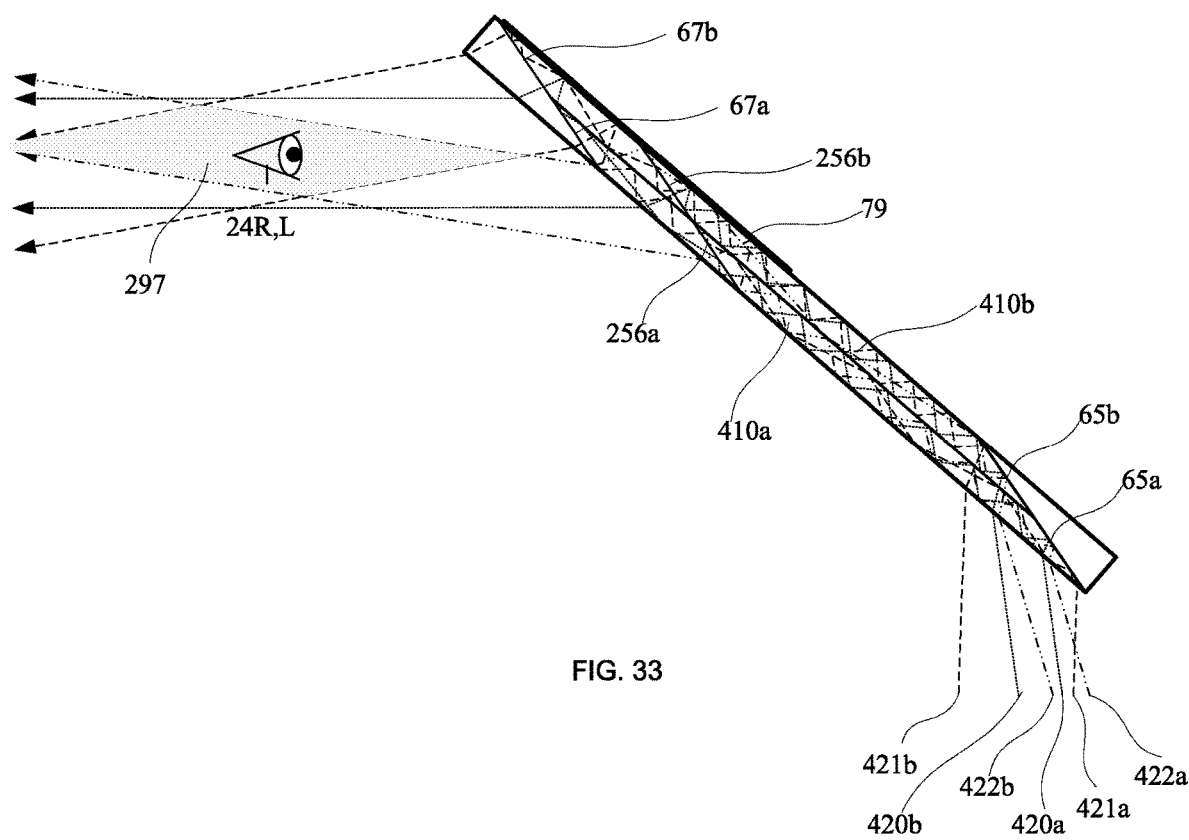

FIGS. 8A, 8B, and 8C illustrate sectional views of a dynamic partially reflecting element comprising two identical transferrable arrays of parallel mirrors, according to the present invention;

FIGS. 9A, 9B, and 9C illustrate sectional views of another dynamic partially reflecting element comprising three transferrable arrays of parallel mirror, according to the present invention;

FIGS. 10A and 10B illustrate some optical characteristic of a prior art optical system during a period of one frame-time;

FIGS. 11A and 11B illustrate some optical characteristic of an optical system during a period of one frame-time, according to the present invention;

FIGS. 12A and 12B illustrate some optical characteristic of an optical system during a period of one frame-time, wherein the display source of the system is based on a time sequential color imaging, according to the present invention;

FIGS. 13A, 13B, and 13C illustrate sectional views of a transparent substrate comprising a coupling-in surface, two coupling-out surfaces, a dynamic partially reflecting element and dynamic re-coupling surfaces, according to the present invention;

FIGS. 14A, 14B, 14C, and 14D illustrate sectional views of a transparent substrate comprising a coupling-in surface, three coupling-out surfaces, a dynamic partially reflecting element, dynamic re-coupling surfaces, an eyeball tracking unit, and a dynamic control unit, according to the present invention;

FIGS. 15A and 15B illustrate a dynamic partially reflecting element, comprising an electrically switchable transreflective mirror, pixelized into a two-dimensional array of pixels, according to the present invention;

FIGS. 16A and 16B illustrate a dynamic partially reflecting element, comprising two identical, two-dimensional arrays of transferrable mirrors, according to the present invention;

FIGS. 17A, 17B, and 17C illustrate sectional views of a transparent substrate comprising a coupling-in surface, two coupling-out surfaces, a pair of angular sensitive reflecting elements and an array of redirecting surfaces, according to the present invention;

FIG. 18 schematically illustrates active parts of a coupling-out surface according to the viewing angle and the eye-motion-box (EMB) of the system;

FIGS. 19A and 19B are graphs illustrating the reflection of incident light waves on two different angular sensitive coupling-out surfaces as a function of the incident angle, according to the present invention;

FIG. 20 schematically illustrates active parts of redirecting elements according to the viewing angle and the eye-motion-box of the system, wherein at least part of the coupling-out elements are angular sensitive reflecting surfaces;

FIG. 21 illustrates sectional views of a transparent substrate comprising a coupling-in surface, two coupling-out surfaces, an array of angular sensitive reflecting elements and an array of redirecting surfaces, according to the present invention;

FIG. 22 illustrates sectional views of a transparent substrate comprising a coupling-in surface, three coupling-out surfaces, an array of angular sensitive reflecting elements and an array of redirecting surfaces, according to the present invention;

FIG. 23 illustrates sectional views of a transparent substrate comprising an angular sensitive coupling-in surface, two coupling-out surfaces, a pair of partially reflecting elements for coupling the light waves out of the substrate and an array of redirecting surfaces, according to the present invention;

FIG. 24A illustrates a sectional view of a transparent substrate comprising an angular sensitive coupling-in surface, two coupling-out surfaces, a pair of angular sensitive reflecting elements for coupling the light waves out of the substrate and an array of redirecting surfaces, according to the present invention;

FIG. 24B illustrates a sectional view of a transparent substrate comprising an angular sensitive coupling-in surface, two coupling-out surfaces, a pair of angular sensitive reflecting elements for coupling the light waves out of the substrate and an array of redirecting surfaces, wherein different parts of the substrate are composed of different optical materials;

FIGS. 25A, 25B and 25C are graphs illustrating the reflection of incident light waves on three different angular sensitive surfaces as a function of the incident angle, according to the present invention;

FIG. 26 is a graph illustrating the brightness efficiency of the light waves as a function of the FOV of the system;

FIGS. 27A and 27B illustrate sectional views of a transparent substrate comprising a single coupling-out surface, a redirecting prism and a coupling-in prism, wherein different parts of the substrate are composed of different optical materials;

FIG. 28A is a schematic sectional-view of folding reflecting surfaces which redirect the coupled-out light waves into the viewer's eye, according to the present invention;

FIG. 28B is a graph illustrating the brightness of the coupled-out light waves as a function of the aperture, according to the present invention;

FIGS. 29A, 29B and 29C are schematic sectional views of a HUD system comprising active folding partially reflecting element which dynamically redirects the coupled-out light waves into both of the viewer's eyes, according to the present invention;

FIGS. 30A and 30B are schematic sectional top and side views of another HUD system wherein the light waves propagate inside the substrate along the vertical axis, according to the present invention;

FIGS. 31A, 31B and 31C are schematic sectional views of yet another HUD system comprising at least one pair of angular sensitive coupling-out surfaces and a single flat partially reflecting element which redirects the coupled-out light waves into both viewer's eyes, according to the present invention;

FIGS. 32A and 32B are graphs illustrating the reflection of incident light waves on two different angular sensitive coupling-out surfaces as a function of the incident angle, according to the present invention, and FIG. 33 schematically illustrates active parts of the single flat redirecting element according to the viewing angle and the head-motion-box of the system, wherein at least part of the coupling-out elements are angular sensitive reflecting surfaces.

DETAILED DESCRIPTION OF EMBODIMENTS

Figure 1A:
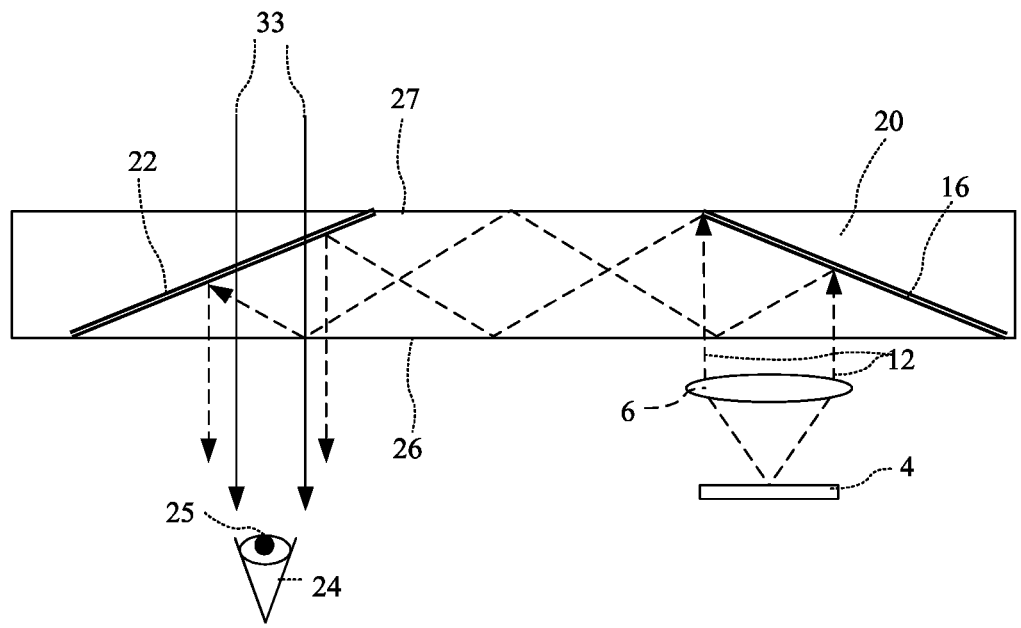

FIG. 1A illustrates a sectional view of a prior art light-transmitting substrate. The first reflecting surface 16 is illuminated by a collimated light wave 12 emanating from a display source 4 and collimated by a lens 6 located between the source 4 and a substrate 20 of the device. The reflecting surface 16 reflects the incident light from the source such that the light wave is trapped inside the planar substrate 20, by total internal reflection. After several reflections off the major surfaces 26, 27 of the substrate 20, the trapped light waves reach a partially reflective element 22, which couple the light out of the substrate into the eye 24, having a pupil 25, of a viewer. Herein, the input surface of the substrate will be defined as the surface through which the input light waves enter the substrate, and the output surface of the substrate will be defined as the surface through which the trapped light waves exit the substrate. In the case of the substrate illustrated in FIG. 1, both the input and the output surfaces coincide with the lower surface 26. Other configurations are envisioned, however, in which the input and the image light waves from the displace source 4 are located on opposite sides of the substrate, or on one of the edges of the substrate.

Figure 1B:
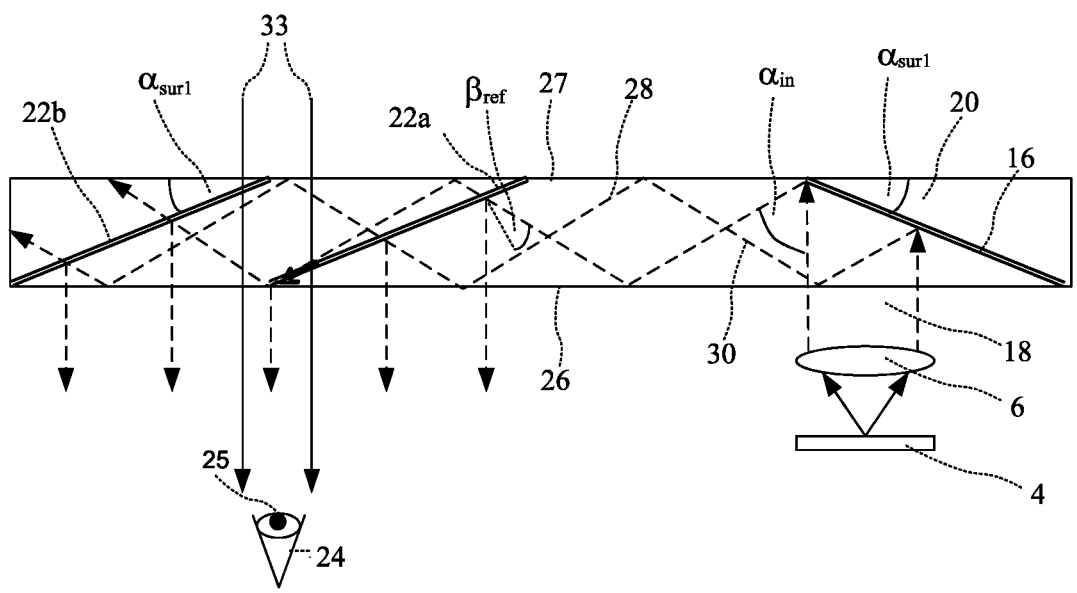

The element which couples-out the light waves from the substrate can be either a single partially reflective surface 22, as illustrated in FIG. 1A, or an array of partially reflecting surfaces 22a, 22b etc. as illustrated in FIG. 1B. In see-through systems, such as HMDs for augmented reality (AR) applications, wherein the viewer should see the external scene through the substrate, the partially reflecting surfaces 22 should be at least partially transparent to enable the external light rays 33 to pass through the substrate and to reach the viewer's eye 24. The optimal value of the transmissivity of the partially reflecting surfaces, however, is not a constant and depends on the lighting conditions of the external scene. For bright scenes, in order to improve the contrast of the projected image, it is required that the reflectivity of the partially reflecting surfaces will be high to maximize the brightness of the image, while the transmissivity of the surfaces should be relatively low to prevent the external scene from dazzling the viewer. On the other hand, for dark external scenes, it is required that the transmissivity of the surfaces should be relatively high in order not to block the external view. As a result, it would be advantageous to have an optical system wherein the transmissivity (and consequently the reflectance) of the partially reflecting surfaces 22 can be dynamically controlled, either manually by the viewer, or automatically by a pre-set mechanism which measures the brightness of the external view. Unfortunately, for most of the present technologies which are used to materialize see-through augmented reality systems, the possibility to utilize active partially reflecting surfaces is impractical.

Referring to the optical embodiment illustrated in FIG. 1B and assuming that the central light wave of the source is coupled out of the substrate 20 in a direction normal to the substrate surface 26, the partially reflecting surfaces 22a, 22b are flat, and the off-axis angle of the coupled light wave inside the substrate 20 is $\alpha_{in}$, then the angle $\alpha_{sur2}$ between the reflecting surfaces and the major surfaces of the substrate is:

$$\alpha_{sur2} = \frac{\alpha_{in}}{2}. \tag{1}$$

As can be seen in FIG. 1B, the trapped rays arrive at the reflecting surfaces from two distinct directions 28, 30. In this particular embodiment, the trapped rays arrive at the partially reflecting surface 22 from one of these directions 28 after an even number of reflections from the substrate major surfaces 26 and 27, wherein the incident angle $\beta_{ref}$ between the trapped ray and the normal to the reflecting surface is:

$$\beta_{ref} = \alpha_{in} - \alpha_{sur2} = \frac{\alpha_{in}}{2}. \tag{2}$$

The trapped rays arrive at the partially reflecting surface 22 from the second direction 30 after an odd number of reflections from the substrate surfaces 26 and 27, where the off-axis angle is $\alpha'_{in} = -\alpha_{in}$ and the incident angle between the trapped ray and the normal to the reflecting surface is:

$$\beta'_{ref} = \alpha'_{in} - \alpha_{sur2} = -\alpha_{in} - \alpha_{sur2} = -\frac{3\alpha_{in}}{2}, \tag{3}$$

where, the minus sign denotes that the trapped ray impinges on the other side of the partially reflecting surface 22. As further illustrated in FIG. 1B, for each reflecting surface, each ray first arrives at the surface from the direction 30, wherein some of the rays again impinge on the surface from direction 28. In order to prevent undesired reflections and ghost images, it is important that the reflectance be negligible for the rays that impinge on the surface having the second direction 28.

A solution for this requirement that exploits the angular sensitivity of thin film coatings was previously proposed in the Publications referred to above. The desired discrimination between the two incident directions can be achieved if one angle is significantly smaller than the other one. It is possible to provide a coating with very low reflectance at high incident angles, and a high reflectance for low incident angles. This property can be exploited to prevent undesired reflections and ghost images by eliminating the reflectance in one of the two directions. For example, choosing $\beta_{ref} \sim 25°$, it can be calculated that:

$$\beta'_{ref} = 105°; \alpha_{in} = 50°; \alpha'_{in} = 130°; \alpha_{sur2} = 25°. \tag{4}$$

If a reflecting surface is determined for which $\beta'_{ref}$ is not reflected but $\beta_{ref}$ is, then the desired condition is achieved.

Figure 2B:
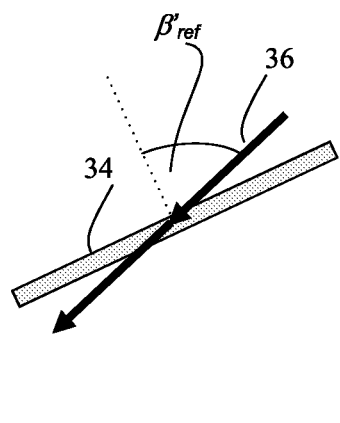
Figure 2A:
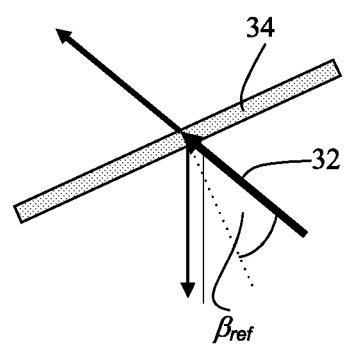

Referring now specifically to FIGS. 2A and 2B, these figures illustrate desired reflectance behavior of partially reflecting surfaces. While the ray 32 (FIG. 2A), having an off-axis angle of $\beta_{ref} \sim 25°$, is partially reflected and coupled out of the substrate 20, the ray 36 (FIG. 2B), which arrives at an off-axis angle of $\beta'_{ref} \sim 75°$ to the reflecting surface (which is equivalent to $\beta'_{ref}\sim 105°$), is transmitted through the reflecting surface 34, without any notable reflection.

Figure 3:
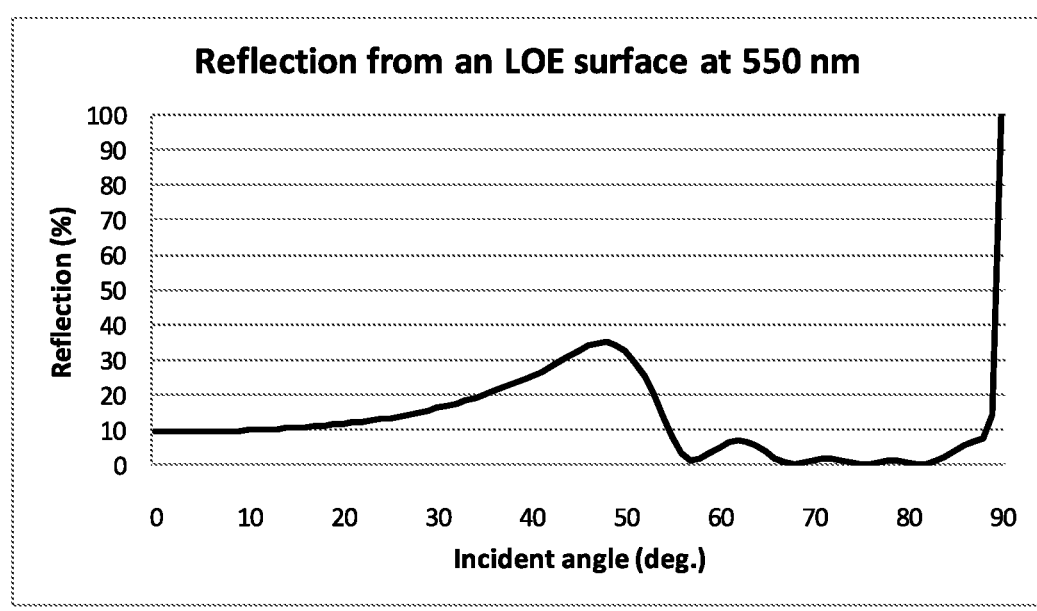

FIG. 3 illustrates the reflectance curve of a typical partially reflecting surface of this specific system, as a function of the incident angle for S-polarized light with the wavelength $\lambda=550$ nm. For a full-color display, similar reflectance curves should be achieved for all the other wavelengths in the photopic region. There are two significant regions in this graph: between 65° and 85°, where the reflectance is very low, and between 10° and 40°, where the reflectance increases monotonically with increasing incident angles. As can be seen in FIGS. 2 and 3, the requested reflectance behavior of the partially reflective surfaces 22 of the embodiment illustrated in FIGS. 1A and 1B is not conventional, and indeed, cannot be materialized as an active partially reflective surface using present technologies. Furthermore, even if such a requested active technology were to be found in the future, to keep the low reflectance at the higher angular region, the reflectance at the lower angular region cannot be higher than 20%-30% and hence, the maximum achievable efficiency is comparatively low. As a result, the idea of utilizing an active partially reflecting surface for the embodiment illustrated in FIGS. 1A and 1B is impractical.

Figure 4:
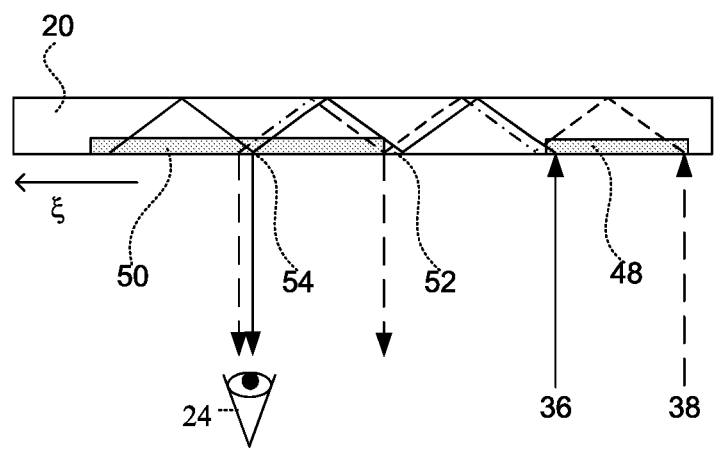

Another approach to couple light waves into and out from a light-guided optical element is by using diffractive elements. As illustrated in FIG. 4, the light rays 38 and 40 are coupled into the transparent substrate 20 by a diffractive element 48, and after some total internal reflection from the external surfaces of the substrate, the light rays are coupled-out from the substrate by a second diffractive element 50. As illustrated, ray 38 is coupled-out at least twice at two different points 52 and 54 on element 54. Consequently, to achieve uniform output light waves, the diffraction efficiency of element 50 should be increased gradually along the $\xi$ axis. It is, however, complicated to materialize dynamic gratings using the present techniques, and it is practically impossible to achieve same for the particularly requested grating function of element 50. As a result, it is not possible to apply the idea of utilizing a dynamic element for the diffractive embodiment illustrated in FIG. 4.

Figure 5A:
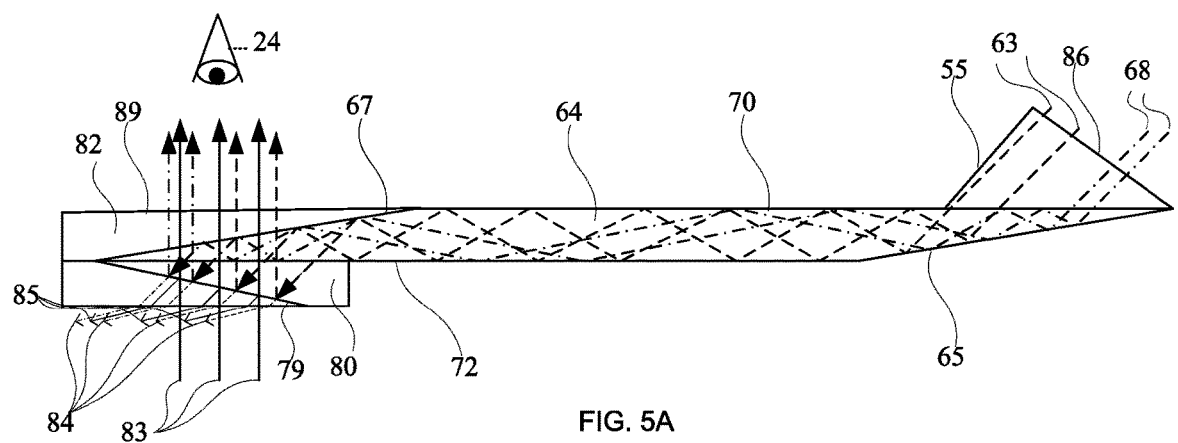
Figure 5B:
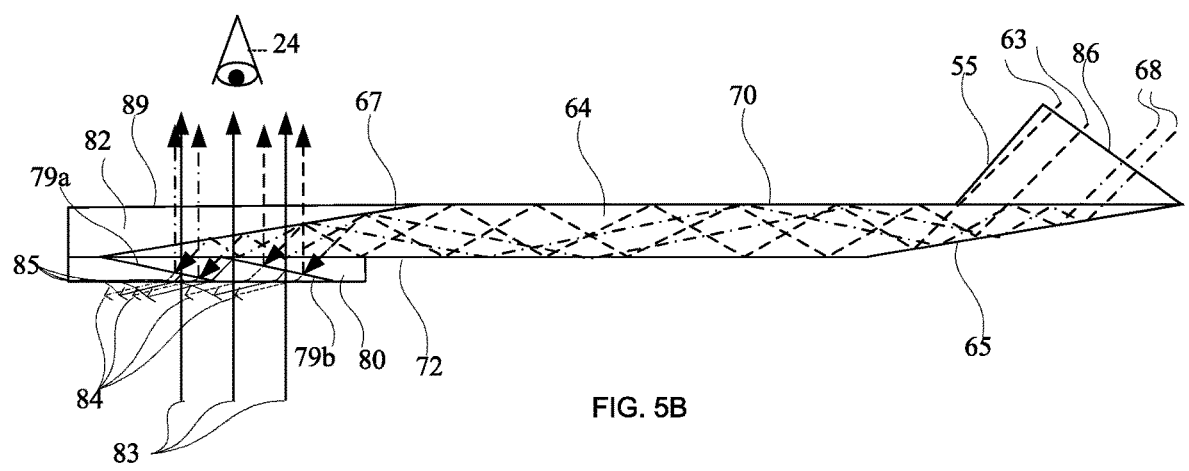

FIGS. 5A and 5B illustrate embodiments for overcoming the above-described problem, according to the present invention. Instead of using a single element (22 in FIG. 1A or 50 in FIG. 4), which performs the dual function of coupling the light waves out of the substrate 20, as well as directing the light waves into the user's eye 24, the requested function is divided into two different elements; namely, one element which is embedded inside the substrate couples the light waves out of the substrate, while a second conventional partially reflecting element which is located out of the substrate, redirects the light waves into the viewer's eye. As illustrated in FIG. 5A, two rays 63 (dashed lines) from a plane light wave emanating from a display source and collimated by a lens (not shown) enter a light transparent substrate 64, having two parallel major surfaces 70 and 72, through the input aperture 86 of the coupling-in prism 55, at an incident angle of $\alpha_{in}^{(0)}$ with respect to the major surfaces 70, 72 of the substrate. The rays impinge on the reflecting surface 65, which is inclined at an angle $\alpha_{sur1}$ to the major surfaces of the substrate. The reflecting surface 65 reflects the incident light rays such that the light rays are trapped inside a planar substrate 64 by total internal reflection from the major surfaces. In order to differentiate between the various "propagation orders" of the trapped light waves, a superscript (i) will denote the order i. The input light waves which impinge on the substrate in the zero order are denoted by the superscript (0). After each reflection from the coupling-in reflecting surface the order of the trapped ray is increased by one from (i) to (i+1). The off-axis angle $\alpha_{in}^{(1)}$ between the trapped ray and the normal to the major surfaces 70, 72 is $$\alpha_{in}^{(1)} = \alpha_{in}^{(0)} + 2\cdot\alpha_{sur1}. \quad (5)$$

After several reflections off the surfaces of the substrate, the trapped light rays reach a second flat reflecting surface 67, which couples the light rays out of the substrate. Assuming that surface 67 is inclined at the same angle to the major surfaces as the first surface 65, that is to say, surfaces 65 and 67 are parallel and $\alpha_{sur2}=\alpha_{sur1}$, then the angle $\alpha_{out}$ between the coupled-out rays and the normal to the substrate plane is $$\alpha_{out} = \alpha_{in}^{(1)} - 2\cdot\alpha_{sur2} = \alpha_{in}^{(1)} - 2\cdot\alpha_{sur1} = \alpha_{in}^{(0)}. \quad (6)$$

That is to say, the coupled-out light rays are inclined to the substrate at the same angle as the incident light rays. So far, the coupled-in light waves behave similarly to the light waves illustrated in FIG. 1A. FIG. 5A, however, illustrates, a different behavior wherein two light rays 68 (dashed-dotted lines), having the same incident angle of $\alpha_{in}^{(0)}$ as rays 63, impinge on the right side of the reflecting surface 65. After two reflections from surface 65, the light waves are coupled inside the substrate 64 by a total internal reflection, and the off-axis angle of the trapped rays inside the substrate is now $$\alpha_{in}^{(2)} = \alpha_{in}^{(1)} + 2\cdot\alpha_{sur1} = \alpha_{in}^{(0)} + 4\cdot\alpha_{sur1}. \quad (7)$$

After several reflections off the major surfaces of the substrate, the trapped light rays reach the second reflecting surface 67. The light rays 68 are reflected twice from the coupling-out surface 67 and are coupled out from the substrate at the same off-axis angle $\alpha_{out}$ as the other two rays 63 which are reflected only once from surfaces 65 and 67, which is also the same incident input angle of these four rays on the substrate major planes.

As illustrated in FIG. 5A, the inclination angle $\alpha_{out}$ of the image can be adjusted by adding a partially reflecting surface 79 which is inclined at an angle of $$\frac{\alpha_{in}}{2}$$

to the surface 72 of the substrate. As shown, the image is reflected and rotated such that it passes again through the substrate substantially normal to the substrate major surfaces and reaches the viewer's eye 24 through the output aperture 89. To minimize distortion and chromatic aberrations, it is preferred to embed surface 79 in a redirecting prism 80, and to complete the shape of the substrate 64 with a second prism 82, both of them fabricated of a material similar to that of the substrate. In order to minimize the thickness of the system, it is possible, as illustrated in FIG. 5B, to replace the single reflecting surface 80 with an array of parallel partially reflecting surfaces 79a, 79b, etc., where the number of the partially reflecting surfaces can be determined according to the requirements of the system.

There are two contradicting requirements from the coupling-out surface 67. On the one hand, the first two order images $F^{(1)}$ and $F^{(2)}$ should be reflected from that plane, while on the second hand, the zero order image $F^{(0)}$ from the substrate 64 should substantially pass through it, after being reflected from surface 79, with no significant reflections. In addition, for see-through systems, the transparency of the optical system for substantially normal incident light ray 83 from the external scene should be as high as possible. A possible way to achieve this is to use an air gap in surface 67. For achieving a rigid system, it is preferred, however, to apply an optical adhesive in surface 67, in order to cement the substrate 64 with prism 82 using an optical adhesive having a refractive index, which is substantially smaller than that of the substrate.

An alternative approach is to exploit a moth-eye film, or any similar hyperfine structure, as the required angular sensitive reflective mechanism. That is to say, when prism 82 is attached to the external surface 67 of the substrate 64, an air gap film is cemented to prism 82 such that the hyperfine structure faces surface 67 after the attachment. Therefore, when the coupled-in light waves inside the substrates 64 impinge on the hyperfine structure at different oblique angles, they "see" only the external part of the periodic structure. The actual refractive index, which is "seen" by the incoming optical light waves, is therefore close to the refractive index of the air, and the total internal reflection mechanism is preserved. On the other hand, the air gap film is substantially transparent to the incoming light waves from the external scene 83 or to the light waves which are coupled out from the substrate 64 and reflected back by surface 79. In any of the proposed approaches, to minimize the Fresnel reflections of the transmitted light waves from the coupling-out surface 67, it is preferred to apply a suitable anti-reflective (AR) coating to this surface.

As explained above with regard to FIG. 1A, in see-through systems such as HMDs for augmented reality (AR) applications, wherein the viewer should see the external scene through the substrate, the partially reflecting surfaces 79 should be at least partially transparent to enable the external light rays 63 and 68 passing through the substrate and reaching the viewer's eye 24. Since surfaces 79 are only partially reflective, only part of the coupled light waves 63 and 68 is reflected by surfaces 79 and reaches the viewer's eye, while another part of the light waves 84 passes through surfaces 79, coupled out from the prism 80 and do not reach the viewer's eye. Similarly, since surfaces 79 are only partially transmissive, only part of the external light rays 83 passes through surfaces 79 and reaches the viewer's eye, while another part of the light rays 85 is reflected from surfaces 79, coupled out from the prism 80 and does not reach the viewer's eye, as well. Naturally, the efficiency of the projected image can be increased on account of the external scene, and vice-versa, namely, by increasing the reflectivity of the partially surfaces 79 the brightness of the coupled rays 63 and 68 is increased. Consequently, however, the transmissivity of surfaces 79 is decreased, and hence, the brightness of the external image 83 is reduced accordingly.

In contradiction to the embodiments illustrated in FIGS. 1-4, the combiner 79 that reflect the coupled-out light from the substrate to the viewer's eye and at the same time transmits the external rays, is a conventional partially reflecting mirror without any special or complicated characteristics as surfaces 22 and 50 of the embodiments illustrated in FIGS. 1 and 4 respectively. As a result, it is possible to dynamically control the reflectivity (and consequently, the transmissivity) of the partially reflective surfaces 79 according to the external lighting conditions and the specific image which is projected to the viewer's eye. One method to control the reflectivity of surfaces 79 is by using an electrically switchable transreflective mirror, which is a solid-state thin film device made from a special liquid crystal material, and which can be rapidly switched between pure reflection, partial-reflection, and total transparent states. The required state of the switchable mirror can be set either manually by the user or automatically by using a photometer which controls the reflectivity of the mirror according to the external brightness. For the sake of simplicity, it will be assumed henceforth that the absorption of the dynamic partially reflecting device is negligible, and that the sum of the reflectivity and the transmissivity of the device is summed up to a value of approximately one.

Figure 6A:
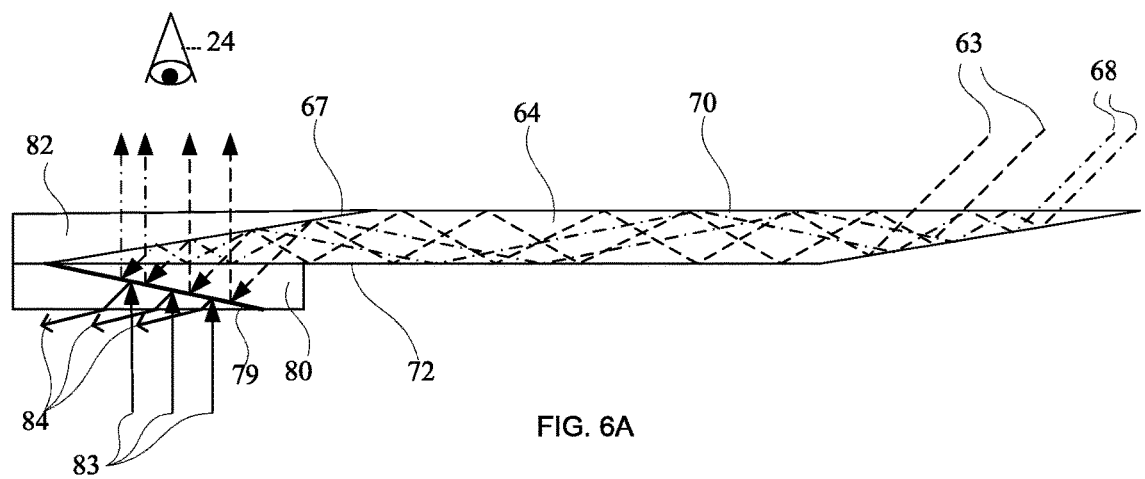
Figure 6B:
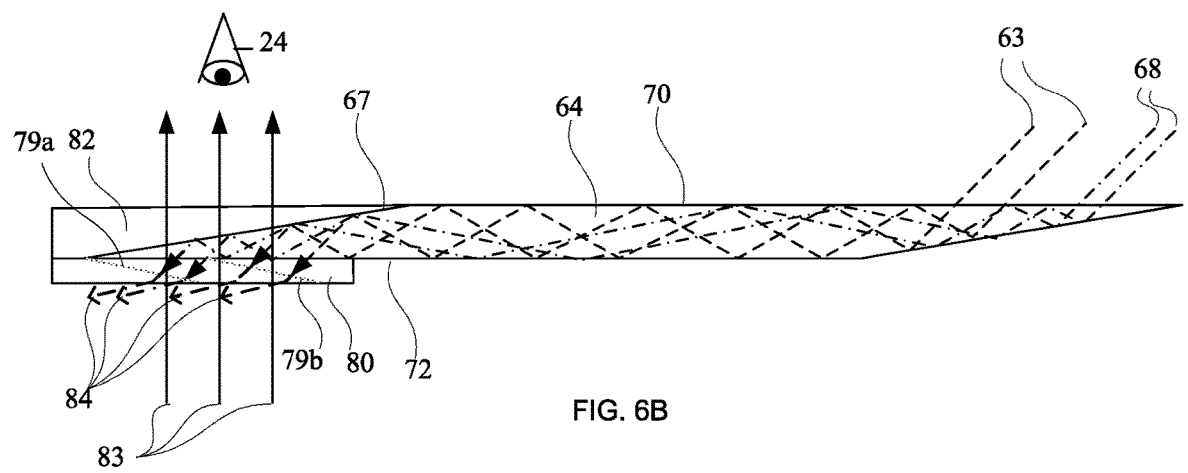

FIGS. 6A and 6B illustrate use of the switchable mirror in two extreme situations. FIG. 6A illustrates a condition in which the external scene should be blocked from interfering with the projected image, for example, wherein a video movie is projected, and the brightness of the external scene is relatively high. As shown, the dynamic surface 79 is switched into a total-reflection state and, as a result, the coupled out light rays 63 and 68 from the substrate are totally reflected from surface 79 to the viewer's eye, while the external rays 83 are totally reflected, as well, and hence, are prevented from reaching the viewer's eye. FIG. 6B illustrates a different condition wherein it is essential not to block the image from the external scene at all, and it is not necessary at that moment to project information from the coupled image into the viewer's eye. As shown, the dynamic surface 79 is switched into a total-transparent state and, as a result, the coupled out light rays 63 and 68 from the substrate pass substantially through surfaces 79a and 79b, and hence, are prevented from reaching the viewer's eye, while the external rays 83 pass substantially through surfaces 79a and 79b, as well, and hence, reach the viewer's eye undisturbed.

Figure 7A:
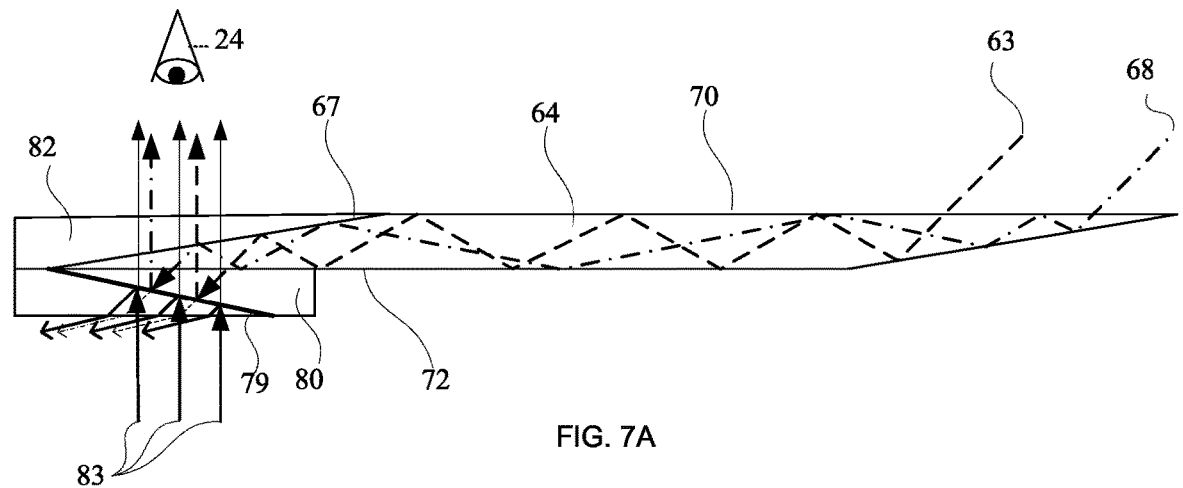
Figure 7B:
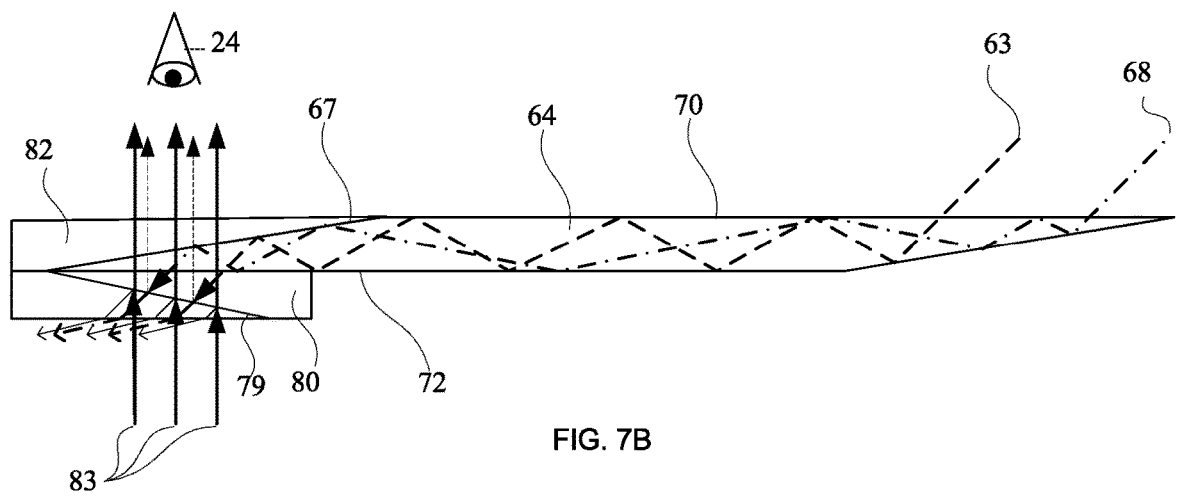

FIGS. 7A and 7B illustrate use of the switchable mirror in two different intermediate situations. FIG. 7A illustrates a condition in which the projected image should be properly combined with the external image, but the brightness of the external scene is comparatively high, and hence, it should be mostly blocked from interfering with the projected image. On the other hand, the efficiency of the projected image should be high enough to achieve a reasonable contrast. As shown, the dynamic surface 79 is switched into a primary reflection state, namely, the reflection of the switchable mirror is much higher than its transmission. As a result, the coupled out light rays 63 and 68 from the substrate are mainly reflected from surface 79 to the viewer's eye, while only small part of the light waves passes through surface 79. On the other hand, the external rays 83 are mostly reflected from surface 79 and only small part reaches the viewer's eye. FIG. 7B illustrates a different condition wherein the external scene is comparatively dark, and it is necessary to prevent the projected image from dazzling the viewer. As shown, the dynamic surface 79 is switched primarily into a transmission state, and thus, the reflection of the switchable mirror is much lower than its transmission. As a result, the coupled out light rays 63 and 68 from the substrate mainly pass through surfaces 79a and 79b, and hence, only a small portion of the light rays reaches the viewer's eye, while the external rays 83 mostly pass through surfaces 79a and 79b, as well, and hence reach the viewer's eye substantially undisturbed.

Another approach for achieving the required dynamic partially reflecting element is illustrated in FIGS. 8A-8C. As shown in FIG. 8A, an array of parallel mirrors 791a, 791b, etc. is embedded inside the transparent plate 80a. The mirrors are inclined at an angle of $\alpha_{in}/2$ the major surface 72 of the substrate. The fill-factor of the mirrors inside the plate is substantially a half. Assuming that the projection of a mirror on the major surface 72 is d, then the lateral distance between two adjacent mirrors is d. Another identical plate 80b is located adjacent to plate 80a. As illustrated in FIG.

8A, the edges of the plates are located adjacent to each other, and each mirror $792i$ (i=a,b,c . . . ) in plate $80b$ is positioned exactly below the mirror $791i$ in plate $80a$. As a result, the reflectivity, and consequently, the transmissivity of the embodiment of FIG. 8A, is substantially 50% for the coupled-out image waves, as well as for the light waves from the external scene. As illustrated in FIG. 8B, plate $80b$ is translated by a distance of d/2 in relation to plate $80a$, resulting in the reflection-transmission ratio of the embodiment being modified to approximately the ratio of 75%/25%. In the embodiment of FIG. 8C, plate $80b$ is translated by a distance d in relation to plate $80a$, and the embodiment is substantially reflective. Eventually, plate $80b$ can be translated by any other intermediate distance, and hence, the reflection-transmission ratio of the embodiment can be any value between 50%:50% and 100%:0%.

The main drawback of the embodiment illustrated in FIGS. 8A-8C is that the maximum achievable transmissivity is limited by the value of 50%. This fault is severe for optical systems wherein the transmissivity should be comparatively high to let the external scene reach the viewer's eye with minimal interference. FIGS. 9A-9C illustrate an embodiment composed of three identical transparent plates, wherein the fill-factor of the embedded mirrors is ⅓, namely, assuming that the projection of a mirror on the major surface 72 is d, then the lateral distance between two adjacent mirrors is 2d. As illustrated, the distances between the edges of two adjacent plates are 0, d, and 2d, and consequently, the reflection-transmission ratios are substantially 33%:67%, 67%:33% and 100%:0% for the embodiments of FIGS. 9A, 9B, and 9C, respectively. Eventually, plates $80b$ and $80c$ can be translated by any other intermediate distances, and hence, the reflection-transmission ratio of the embodiment can be any value between 33%:67% and 100%:0%. As a result, the systems illustrated in FIGS. 9A-9C have a higher dynamic range as compared to that of FIGS. 8A-8B and the maximal achievable transmissivity is 67% instead of 50%. The dynamic range can be even further increased by using embodiments having larger numbers of identical plates. For example, for an embodiment having n plates wherein in each plate the fill-factor of the mirrors is 1/n, the reflection-transmission ratio of the embodiment can be any value between $$\frac{1}{n} : \frac{n-1}{n}$$

and 100%:0%.

Hitherto, it has been assumed that the reflectivity of the partially reflecting surface 79 can be modified, and hence, the ratio between the efficiencies of the virtual image coupled out from the substrate and the external scene can be dynamically modified to achieve optimal performance in a given scenario. In all the embodiments illustrated thus far, however, improving the efficiency of one of the two images is to the detriment of the other image, that is to say, it is not possible to achieve a system wherein the efficiencies of the projected and the external images are very high simultaneously, using the above-illustrated embodiments. For a dynamic partially reflecting element, however, having a switching time which is smaller than the frame-time of the image which is projected into the substrate, it is possible to improve the total efficiency of the system, namely it is possible to increase the brightness of the projected image as well as that of the external image, which reaches the viewer's eye without increasing the power consumption of the optical system.

FIGS. 10A-10B illustrate optical characteristics of a conventional system during a period of one frame-time $\tau_f$. It is assumed that the average brightness of the coupled-in image $B_0$ and the external scene $B_s$ are constants and that the reflection of the partially reflective element is substantially 50%, i.e., the potential efficiency is equally divided between the projected and the external images and particularly the brightness of the virtual image and that of the external scene which are projected into the viewer's eye (neglecting residual losses inside the substrate and Fresnel reflections from the external surfaces), are $B_0/2$ and $B_s/2$, respectively.

FIG. 11A illustrates a modified system wherein during each frame-time the image is projected from the display source and coupled into the substrate only during a limited time slot having a period of $\tau_f/n$. The average brightness of the coupled-in image during that time slot is increased by a factor of n to $n \cdot B_0$. It is assumed that the brightness of the projected image depends linearly on the power consumption of the display source. Since the product of the operation period with the average brightness is identical for the two systems of FIGS. 10A and 11A, they will have substantially the same power consumption. FIG. 11B illustrates the reflection curve of the partially reflecting element wherein this element is substantially reflective only during a limited time slot having a period of $\tau_f/n$, wherein this time slot is synchronized with that of the projected brightness illustrated in FIG. 11A. During the rest of the frame-time, the partially reflective element is substantially transmissive. As a result, the average brightness of the projected image is increased by a factor of two from $B_0/2$ to $B_0$, while the brightness of the external scene is increased to $$\frac{n-1}{n} \cdot B_s.$$

Naturally, by reducing the actual switching time, namely, by increasing the factor n, it is possible to improve the efficiency of the external scene.

FIGS. 12A and 12B illustrate a modified version of the system shown in FIGS. 11A and 11B. The display source here is based on a time sequential color imaging, in which the color images are generated by sequentially laying down three basic colors of red, green, and blue (RGB) light in a single image frame, which typically lasts 1/f of a second, where f is the frequency of the system, usually 50 or 60 hertz. The frame-time $\tau_f$ is divided into three equal sub-periods $\tau_f/3$, wherein in each one, only one color is illuminating the display. It is also assumed that the dynamic partially reflecting element can be controlled to yield a high reflection in each one of the primary three colors while having at the same time high transmittance for the other two colors. As illustrated in FIG. 12A, during each frame-time for each of the three primary colors, the image is projected from the display source and coupled into the substrate only during a limited time slot having a period of $\tau_f/n$. The average brightness of the coupled-in image during that time slot is $$\frac{n \cdot B_0}{3}.$$

FIG. 12B illustrates the reflection curve of the partially reflecting element wherein this element is substantially reflective for each of the three primary colors only during a limited time slot having a period of $\tau_f/n$, wherein each of these three slots is synchronized with the respective slot of the projected brightness as illustrated in FIG. 12A. The average brightness of the projected image is $B_0$, while the brightness of the external scene is $$\frac{n-1}{n} \cdot B_s.$$

The exploitation of a dynamic partially reflecting element can be particularly advantageous for the multi-facet element 255 illustrated in FIG. 13A. As shown, a reflecting surface 256 is embedded inside the substrate 258. Surface 256 has the same reflecting characteristics as surface 67 and is parallel to the coupling-in and the coupling-out surfaces 65 and 67. A ray 260 having an off-axis angle of $\alpha_{in}$ is coupled into the substrate 258 after one reflection from surface 65, and after a few reflections from the major surfaces of the substrate 258 impinges on surface 256. The ray is coupled out from the substrate 258 and is then partially reflected into the viewer's eye in a similar manner as to that which is illustrated in FIGS. 5A-5B. The reflected ray is, however, in this case is not propagated undisturbed into the viewer's eye, as in the embodiments illustrated in FIGS. 5A and 5B. Instead, the reflected ray impinges on a partially reflecting surface 264a, which is parallel to surface 79a and coupled inside a flat prism 267, which is attached to the upper surface 70 of the substrate 268. Part of the intensity of the light ray 260 which impinges on surface 264a, passes through the surface as ray 260a and continues to propagate toward the viewer's eye. Since surfaces 79a and 264a are parallel, the other part of the intensity of the light ray 260 is reflected from surface 264a as ray 260b having an off-axis angle of $\alpha_{in}$ and impinges again on surface 256. After two reflections from surface 256, it propagates inside the substrate 258, and after two more reflections from the coupling-out surface 67, the ray 260b is coupled out from substrate 258 having the same off-axis angle $\alpha_{in}$. The ray is then reflected from surface 79d, which is parallel to surface 79a, into the viewer's eye having the same direction as ray 260a.

As also illustrated in FIG. 13A, another ray 262 is coupled into the substrate 258 after two reflections from surface 65, and after a few reflections from the major surfaces of the substrate 258, the ray 262 impinges on surface 256. The ray is coupled out from the substrate 258 having an off-axis angle $\alpha_{in}$ and is then partially reflected by surface 79b, which is parallel to surface 79a, into the viewer's eye in a similar manner to ray 260. The reflected ray impinges on the partially reflecting surface 264b which is parallel to surfaces 79b and 264a and is coupled inside prism 267. Part of the intensity of the light ray 262, which impinges on surface 264b, passes through the surface as ray 262a and continues to propagate toward the viewer's eye. Since surfaces 79b and 264b are parallel, the other part of the intensity of the light ray 262 is reflected from surface 264b as ray 262b having an off-axis angle of $\alpha_{in}$, and impinges again on surface 256. After one reflection from surface 256 it propagates inside the substrate 258, and after one reflection from the coupling-out surface 67, the ray 262b is coupled out from substrate 258 having the same off-axis angle $\alpha_{in}$. The ray is then reflected from surface 79c, which is parallel to surface 79b, into the viewer's eye having the same direction as ray 260a. Hence, all four of the rays, 260a, 260b, 262a, and 262b, which originated from the same point on the display source, reach the viewer's eye having the same propagating direction.

As a result, the output aperture of substrate 258 is the combination of surfaces 256 and 67. Consequently, the active area of the output aperture of substrate 258 has been doubled as compared to that of substrate 64, which is illustrated in FIG. 5, while the thickness of the substrate remains the same. On the other hand, the brightness of light waves coupled out from substrate 258 has been reduced by a factor of two as compared to that of substrate 64. Furthermore, not only the coupled-out light waves 260 and 262 of the virtual image impinge on the partially reflecting surfaces 264A and 264B, but also rays 82 from the external scene. As a result, the brightness of these waves is reduced by the same factor accordingly. There are ways, however, to improve the brightness of the coupled-out light waves of both images. For embodiments wherein the light waves coupled inside the substrate are linearly polarized, such as systems where the display source is an LCD or an LCOS display, the partially reflecting surfaces 79i, as well as 264i (i=a,b, . . . ), can be designed to be polarization-sensitive reflecting surfaces. These surfaces are reflective (or partially reflective) for one polarization (preferably for the s-polarization) and substantially transparent to the orthogonal polarization (preferably for the p-polarization). In such a case, the transmittance of the external scene for see-through applications can be improved, since the entire element 255 is now substantially transparent to the polarization (which is orthogonal to that of the light waves coupled inside the substrate). While the reflecting surfaces 79i can be totally reflective for the relevant polarization (which is the same as that of the light waves coupled inside the substrate), surfaces 264i should be partially reflective for this polarization, wherein the exact reflection coefficient of the surfaces can be determined according to the number of reflecting surfaces 264i in the system. For the embodiment illustrated in FIG. 13A, wherein two reflective surfaces 256 and 67 are embedded inside the substrate 258, a reflection coefficient of 0.5 can yield a total brightness efficiency of 50% for the light waves coupled inside the substrate and transmittance of 50% for the external scene.

An alternative embodiment for improving the efficiencies of both of the images, which can be applied to polarized as well as non-polarized image sources, is illustrated in FIGS. 13B and 13C. Here, surfaces 79i, in addition to surfaces 264i, are dynamic reflecting surfaces. As illustrated in FIGS. 11A and 11B, during each frame-time the image is projected from the display source and coupled into the substrate only during a limited time slot having a period of $\tau_f/n$ wherein the average brightness of the coupled-in image is $n \cdot B_0$. In addition, as illustrated in FIG. 13B, the elements 79i and 264i are reflective only during the same time slot, wherein surfaces 79i are substantially reflective and the reflectivity of surfaces 264i is around 50%. As illustrated in FIG. 13C, during the rest of the frame-time, the reflective elements 79i and 264i are substantially transmissive, and the external light rays reach the viewer's eye without any interference. As a result, the average brightness of the projected image even for a non-polarized image is increased by a factor of two from $B_0/4$ to $B_0/2$, while the brightness of the external scene is increased to $$\frac{n-1}{n} \cdot B_s.$$

The embodiment for expanding the output aperture by embedding a reflecting surface 256 into the substrate 258, as illustrated in FIGS. 13A and 13B, is not limited to a single reflecting surface. For optical systems having wide FOVs together with relatively large EMB values, an array of n flat reflecting surfaces 256*i* (i=a,b . . . ), which are parallel to the output reflecting surface 67, can be embedded internally inside the substrate to increase the output aperture of the substrate by a factor of n+1. Consequently, the number of the reflecting surfaces 264*i* (i=a,b . . . ) should be increased accordingly, to completely cover the output aperture of the embedded surfaces 256*i*. The reflectance and lateral extension of each reflecting surface 264*i* should be designed to ensure the uniformity characteristics of the light waves coupled into the viewer's eye.

As illustrated in FIGS. 14A to 14D, the efficiency of a system having an additional number of coupling-out facets 256*i* can be increased by adding an eyeball tracking unit 272 to the optical system. Eyeball tracking is the process of measuring either the location, the point of gaze, or the motion of an eye relative to the display, namely, an eyeball tracker is a device for measuring eye positions and eye movement. The most popular method for operating this device is by utilizing an optical method for measuring eye motion. Light from an emitter, typically infrared, is reflected from the eye and sensed by a video camera, or some other specially designed optical sensors. The information is then analyzed to extract eye rotation and translation from changes in reflections. Video-based eye trackers typically use corneal reflection and the center of the pupil as features to track over time.

Figure 14A:
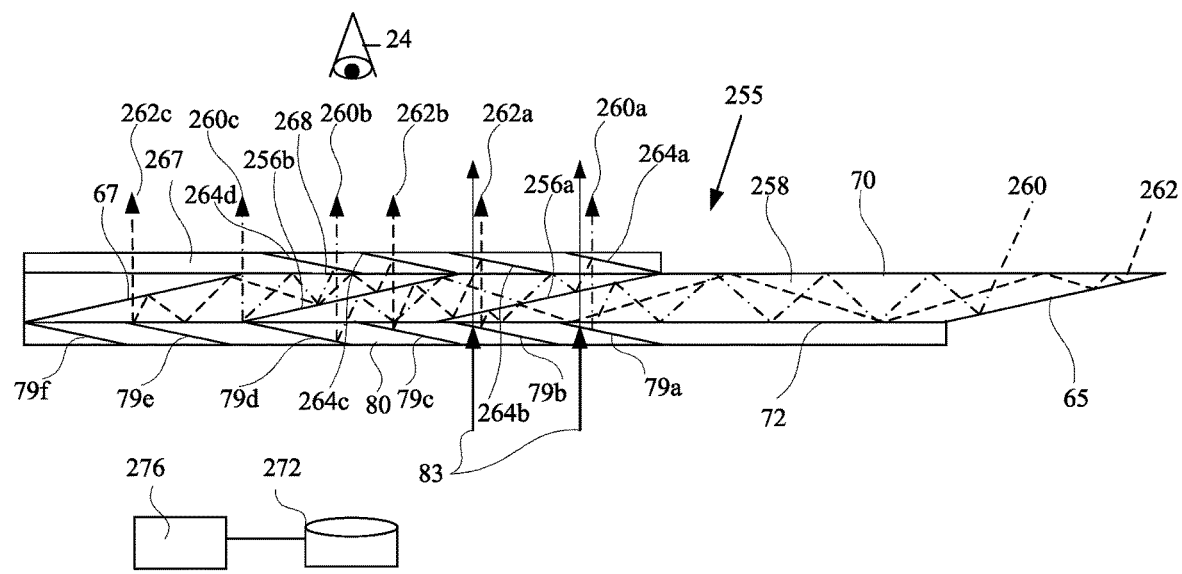

In accordance with the present invention, it would be advantageous to physically combine the two optical units, namely, the dynamically controlled stereoscopic display and the eyeball tracking unit. The system should also contain a dynamic control unit 276, which will be capable of setting, by identifying the position and gazing point of the viewer's eyes, the operation times and the reflectance for each of the reflecting surfaces 264*i*. Seen in FIG. 14A is an optical system, wherein three coupling out surfaces, 256*a*, 256*b* and 67 are embedded inside the substrate 258. To achieve coupled-out light waves having a uniform brightness over the entire output aperture, the reflectance of the partially surfaces 264*i*, which are adjacent to the coupling-out surfaces 256*a* and 256*b*, should be set to 67% and 50%, respectively. The maximal efficiency of the coupled-out light waves, in that case, is approximately 33%.

Figure 14B:
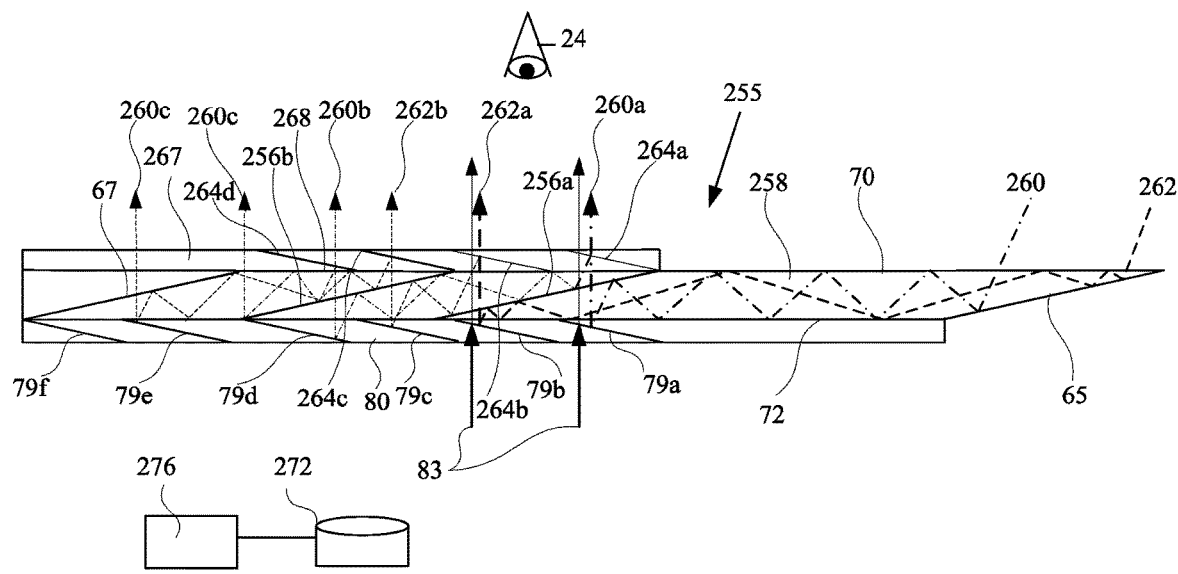

For optical systems, however, having a large EMB values, not all the light waves which are coupled out from the substrate are exploited simultaneously. As a result, the efficiency of the optical system can be improved by increasing the brightness of the light waves that reach the viewer's eye on account of the other light waves. As illustrated in FIG. 14B, the viewer's eye is located in the right section of the EMB. Consequently, the eye is illuminated mostly by light waves which are coupled out by surface 256*a*, and hence, it would be advantageous to increase the brightness of these light waves on account of those which are coupled out by surfaces 256*b* and 67. This improvement can be achieved by decreasing the reflectance of surfaces 264*a* and 264*b*, which are adjacent to surface 256*a*. Therefore, most of the light waves will pass through surfaces 264*a* and 264*b* into the viewer's eye, and only a small part thereof will be reflected and coupled-in again into the substrate.

Figure 14C:
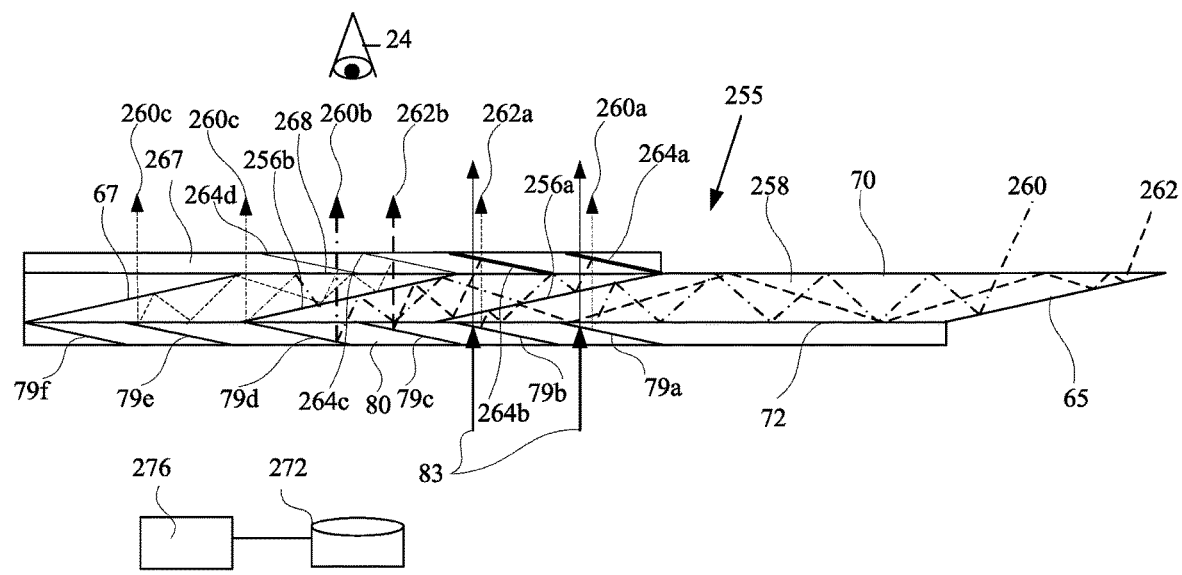

A different situation is illustrated in FIG. 14C, wherein the viewer's eye is located in the central section of the EMB. Consequently, the eye is illuminated mostly by light waves which are coupled out by surface 256*b*, and hence, it would be advantageous to increase the brightness of these light waves on account of those which are coupled out by surfaces 256*a* and 67. This improvement can be achieved by increasing the reflectance of surfaces 264*a* and 264*b*, which are adjacent to surface 256*a*, and reducing the reflectance of surfaces 264*c* and 264*d*, which are adjacent to surface 256*b*. Therefore, most of the light waves will be reflected from surfaces 264*a* and 264*b*, coupled-in again into substrate 258 and coupled out by surface 256*b*. Now, most of the remaining light waves will pass through surfaces 264*c* and 264*d* into the viewer's eye, and only a small part thereof will be reflected and coupled-in again into the substrate.

Figure 14D:
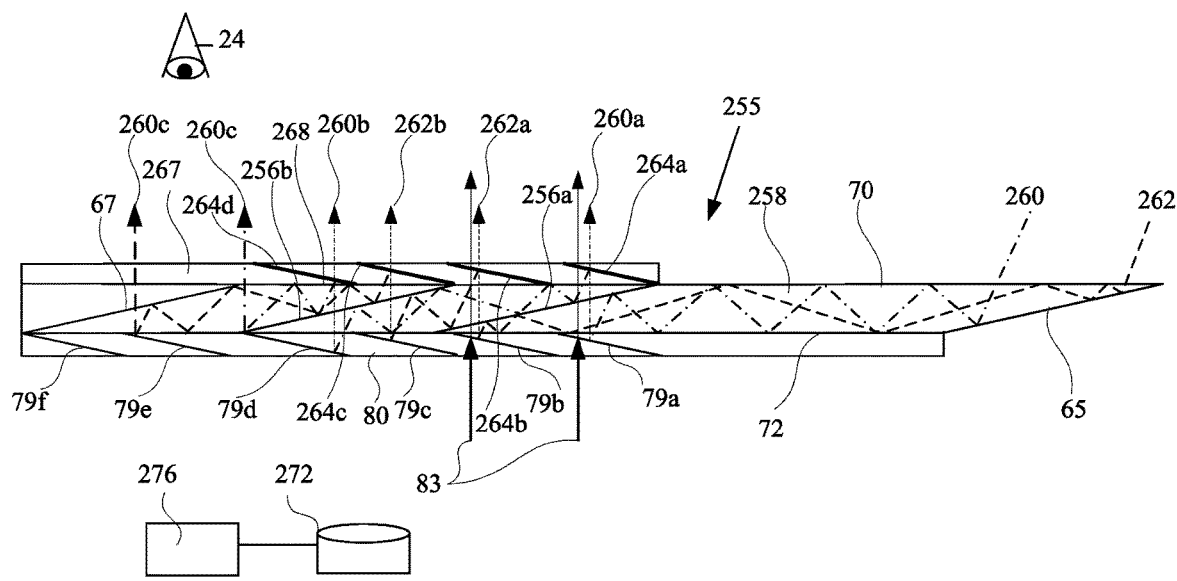

A further different situation is illustrated in FIG. 14D, wherein the viewer's eye is located in the left section of the EMB. Consequently, the eye is illuminated mostly by light waves which are coupled out by surface 67, and hence, it would be advantageous to increase the brightness of these light waves on account of those which are coupled out by surfaces 256*a* and 256*b*. This improvement can be achieved by increasing the reflectance of surfaces 264*a* and 264*b*, as well as surfaces 264*c* and 264*d*, which are adjacent to surfaces 256*a* and 256*b*, respectively. As a result, most of the light waves will be reflected from surfaces 264*a* and 264*b*, as well as from surfaces 264*c* and 264*d*, will be coupled-in again into substrate 258, and then coupled out by surface 67 to reach the viewer's eye undisturbed. Eventually, the exact values of the reflectance of surfaces 264*i* will be set by the control unit according to the position and gazing point of the viewer's eyes, the EMB and the FOV of the optical system, and other possible relevant parameters.

Hereinbefore, it has been assumed that the reflectivity (and therefore the transmissivity) of the dynamic partially reflective element is constant over its entire aperture. There are situations, however, where it would be beneficial to use a dynamic element wherein its reflectance can be modified locally. That is to say, different parts of the dynamic element will have various degrees of reflectivity. By combining this ability with the eyeball tracking unit 272 and the dynamic control unit 276, it will be possible to adjust the local reflection of the dynamic element optimally. The exact localized reflectivity can be set according to the type of the information which is projected to the viewer's eye, the location of the symbols or the video in the FOV of the image, the brightness of the external scene, and the position and the gazing point of the viewer's eyes.

FIGS. 15A and 15B illustrate possible embodiments for achieving a requested dynamic element. As shown in FIG. 15A, the active area of reflectivity the electrically switchable transreflective mirror 280 is pixelized into a two-dimensional array of pixels 281, wherein the reflectivity of each pixel can be separately set by the dynamic control unit 276 (not shown). As demonstrated in FIG. 15B, a sub-area 282 of element 280 has been set to be substantially reflective; another two sub-areas 283 and 286 are partially reflective while the other active area 289 of element 280 is substantially transmissive.

A different approach for achieving the required dynamic partially reflective element is illustrated in FIGS. 16A and 16B. As shown in FIG. 16A, the dynamic element is composed of two identical arrays (291 and 292) of sub-mirrors 295, wherein each sub-mirror can be separately translated by the dynamic control unit 276 (not shown). Since the sub-mirror can be small and light elements, it is possible to translate them using piezoelectric devices. The fill factor of each array is 50%, and each sub-mirror in array 291 is located substantially adjacent to the relative sub-mirror in array 292. As a result, the reflectivity and the transmittance of element 290 here are around 50% over the entire area of the dynamic element 290. FIG. 16B illustrates a different situation wherein in two different locations 296 and 297 some sub-mirrors in array 292 have been laterally translated to yield high reflectance in these areas.

In the embodiment illustrated in FIGS. 13A to 13C and 14A to 14D, the output aperture of the optical system has been extended utilizing external partially reflecting surfaces 264, which were attached to the upper surface 70 of the substrate 258. FIGS. 17A to 17C illustrate an alternative embodiment for expanding the output aperture wherein the coupling-out surface 256 is sensitive to the incident angle of the coupled light waves. As shown in FIG. 17A, optical rays 320$a$ and 320$b$ having an input direction of $\alpha_{in}^{(0)}$ impinge on an optical element 309, composed of two substrates 310$a$ and 310$b$, wherein the lower surface 311$a$ of substrate 310$a$ is attached to the upper surface 312$b$ of substrate 310$b$ defining an interface plane 317.

There are two contradicting requirements from the interface plane 317 between the substrates 310$a$ and 310$b$. On the one hand, the first two orders image $F^{(1)}$ and $F^{(2)}$ should be reflected from that plane, while the zero order image $F^{(0)}$ from the upper substrate 310$a$ should substantially pass through it, after being reflected from surfaces 256 and 67, with no significant reflections. Similarly, surface 317 should be transparent to rays 320$a$ and 320$b$ entering the substrate through element 318 having the input angle of $\alpha_{in}^{(0)}$. In addition, for see-through systems the transparency of the optical system for substantially normal incident light, should be as high as possible. A possible way to achieve this is to use an air gap in the interface plane 317, however, for achieving a rigid system, it is preferable to apply an optical adhesive in the interface plane 317, in order to cement the substrates 310$a$ and 310$b$. This approach is illustrated with an optical system having the following parameters:

$$\alpha_{sur1} = \alpha_{sur2} = 9°; F^{(0)} = \{32°, 44°\}; F^{(1)} = \{50°, 62°\}$$

$$F^{(2)} = \{68°, 80°\}. \quad (8)$$

The light waves are s-polarized. The optical material of the substrates 310$a$ and 310$b$ is Schott N-SF57 having a refractive index of $v_d = 1.8467$, and the optical adhesive is NOA 1315, having a refractive index of $v_d = 1.315$. The critical angle is therefore $\alpha_{cr} > 45.4°$. All the optical rays in the higher orders $F^{(1)}$ and $F^{(2)}$ have off-axis angles higher than the critical angle and are therefore totally reflected from the interface plane 317. All the optical rays in the zero order impinge on the interface plane at an incident angle lower than the critical angle, and hence, they pass through it. To minimize the Fresnel reflections of the coupled-out light waves from the interface plane, however, it is preferred to apply a suitable anti-reflective (AR) coating to this plane.

In contradistinction to the substrates illustrated in FIGS. 13A to 14D, the coupling-out elements 256$a$ and 256$b$ are not conventional reflecting surfaces as surface 256 in substrate 258, but angular sensitive reflective surfaces. Each one of the surfaces is substantially total reflective for the part of the angular range of the coupled-in light waves inside the respective substrate, and substantially transparent for the other part of the angular range. Unlike surfaces 256$a$ and 256$b$, surfaces 67$a$ and 67$b$ could be conventional reflecting surface, such as surface 67 in the embodiments of FIGS. 5A and 5B. As a result, the efficiency of the optical system is significantly improved, and the brightness of the coupled-out image is substantially retained, similar to that of the input image. To achieve this improvement, the fact that the light waves coupled out from the substrate are not required to illuminate the entire active area of the coupling-out surface is utilized.

As illustrated in FIG. 18, showing the rays that should impinge on the partially reflective surface 79 for illuminating the EMB 197, the two marginal (107R, 107L) and the central (107M) light waves of the image are coupled out from the substrate and redirected into the viewer's eye 24. As shown, the light waves 107R, 107M, and 107L, having the zero order off-axis angles $\alpha_{in}^{(0)}(\max)$, $\alpha_{in}^{(0)}(\text{mid})$ and $\alpha_{in}^{(0)}(\min)$, illuminate only the parts 79R, 79M and 79L of the partially reflecting surface 79, respectively, which reflect into to EMB 197. As a result, a method can be found where the coupled-in light waves are split in such a way that they will illuminate only the required respective part of surface 79, and the original brightness will be preserved. To achieve this, the angular range of the light waves $F_{sur1}^{(1)} \equiv \{\alpha_{min}, \alpha_{max}\}$, which impinge on the angular sensitive coupling-out surfaces 256$a$ and 256$b$ at the incident angles of $\alpha_{sur}^{(1)} = \alpha_{in}^{(0)} + \alpha_{sur1} = \alpha_{in}^{(1)} - \alpha_{sur1}$ (FIG. 17A), is divided into three substantially equal segments: $F_{low}^{(1)} \equiv \{\alpha_{min}, \alpha_{m1}\}$, $F_{mid}^{(1)} \equiv \{\alpha_{m1}, \alpha_{m2}\}$ and $F_{max}^{(1)} \equiv \{\alpha_{m2}, \alpha_{max}\}$. The aim of the embodiment is that the light waves having the higher incident angles in the FOV of $F_{max}^{(1)} \equiv \{\alpha_{m2}, \alpha_{max}\}$ will be coupled out from the substrates 310$a$, 310$b$ by the angular sensitive coupling-out element 256$a$ and 256$b$; the light waves having the lower incident angles in the FOV of $F_{min}^{(1)} \equiv \{\alpha_{min}, \alpha_{m1}\}$ will be coupled out from the substrates 310$a$, 310$b$ by the coupling-out element 67$a$ and 67$b$, and the light waves in the FOV of $F_{mid}^{(1)} \equiv \{\alpha_{m1}, \alpha_{m1}\}$ will be coupled out from the upper substrate 310$a$, by the coupling-out element 67$a$ and from the lower substrate 310$b$, by the angular sensitive coupling-out element 256$b$.

In order to achieve this, surfaces 256$a$ and 256$b$ should substantially reflect all the light waves in $F_{max}^{(1)}$ such that they will be coupled-out from the substrates 310$a$ and 310$b$ and substantially transmit all the light waves in $F_{min}^{(1)}$, such that they will continue to propagate inside the substrate and be coupled-out by the reflecting surfaces 67$a$ and 67$b$. In addition, the light waves in $F_{mid}^{(1)}$ should pass-through the angular sensitive surface 256$a$, continue to propagate inside the substrate 310$a$ and be coupled-out by the surface 67$a$, but will be coupled-out from substrate 310$b$ by the angular sensitive surface 256$b$.

Consequently, the angular sensitive reflecting surfaces 256$a$ and 256$b$ should fulfill the following three characteristics for the entire relevant photopic range:
  a. substantially total reflective for the angular range of $\{\alpha_{m2}, \alpha_{max}\}$;
  b. substantially transparent for the angular range of $\{\alpha_{min}, \alpha_{m1}\}$; and
  c. while the lower surface 256$b$ is substantially total reflective for the angular range of $\{\alpha_{m1}, \alpha_{m2}\}$ the upper surface 256$a$ is substantially transparent for the same angular range of $\{\alpha_{m1}, \alpha_{m2}\}$.

It is possible to achieve these requirements by applying angular sensitive dielectric coatings on surfaces 256$a$ and 256$b$, but the process for achieving these coatings can be fairly complicated. A simpler way is to cement the optical part adjacent to surfaces 256$a$ and 256$b$ using optical adhesives having proper refractive indices that yield critical angles of $\alpha_{m1}$ and, $\alpha_{m2}$ at surfaces 256$a$ and 256$b$, respectively. The high transparency for angles lower than the respective critical angles can be achieved using proper AR coatings. To simplify the fabrication process of the angular sensitive surfaces, it is usually required that the Abbe numbers of the optical adhesive and the optical material of the substrate will be similar to avoid undesired chromatic effects in the image. It is possible, however, to achieve the required reflecting curves utilizing proper thin-film coating design techniques, even for cases where the Abbe numbers of the adhesive and the optical material are substantially different.

FIG. 17A illustrates two rays 320a and 320b from the same plane input wave having incident angles of $\alpha_{si}^{(1)} < \alpha_{m1}$ which impinge on the angular sensitive coupling-out elements 256a and 256b, respectively. As a result of condition (b) stated hereinabove, both rays pass through surfaces 256a and 256b. Ray 320a is reflected three times from the coupling-in element 65a, trapped inside the substrate 310a at an off-axis angle of $\alpha_{in}^{(3)} = \alpha_{in}^{(0)} + 6 \cdot \alpha_{sur1}$, and is reflected twice from surface 256a before being impinged on the left part of surface 256a at an incident angle of $\alpha_{si}^{(1)} = \alpha_{in}^{(1)} - \alpha_{sur1}$. Ray 320b is reflected twice from the coupling-in element 65b, trapped inside the substrate 310b at an off-axis angle of $\alpha_{in}^{(2)} = \alpha_{in}^{(0)} + 4 \cdot \alpha_{sur1}$, and is reflected once from surface 256b before being impinged on the left part of surface 256b at an incident angle of $\alpha_{si}^{(1)} = \alpha_{in}^{(1)} - \alpha_{sur1}$. After passing through surface 256a, ray 320a continues to propagate inside substrate 310a at an off-axis angle of $\alpha_{in}^{(1)}$, and after a single reflection from surface 67a is coupled-out from substrate 310a and redirected into the viewer's eye by the partially reflecting surface 79b. After passing through surface 256b, ray 320b is reflected once from the left side of surface 256b, continues to propagate inside substrate 310b at an off-axis angle of $\alpha_{in}^{(2)}$, and after a double reflection from surface 67b is coupled-out from substrate 310b, and redirected into the viewer's eye by the partially reflecting surface 79b.

FIG. 17B illustrates two rays 321a and 321b from the same plane input wave having incident angles of $\alpha_{si}^{(0)} > \alpha_{m2}$ which impinge on the angular sensitive coupling-out elements 256a and 256b, respectively. As a result of condition (a) stated hereinabove, both rays are reflected from surfaces 256a and 256b and are coupled-out from the substrates 310a and 310b by these angular sensitive reflective surfaces respectively. Ray 321a is reflected once from the coupling-in element 65a, trapped inside the substrate 310a at an off-axis angle of $\alpha_{in}^{(1)} = \alpha_{in}^{(0)} + 2 \cdot \alpha_{sur1}$, and impinges on the right part of surface 256a at an incident angle of $\alpha_{si}^{(1)} = \alpha_{in}^{(1)} - \alpha_{sur1}$. Ray 320b is reflected twice from the coupling-in element 65b, trapped inside the substrate 310b at an off-axis angle of $\alpha_{in}^{(2)} = \alpha_{in}^{(0)} + 4 \cdot \alpha_{sur1}$, and is reflected once from surface 256b before being impinged on the left part of surface 256b at an incident angle of $\alpha_{si}^{(1)} = \alpha_{in}^{(1)} - \alpha_{sur1}$. After being reflected and coupled-out from the substrates, rays 321a and 321b are redirected by the partially reflecting surface 79a into the viewer's eye.

FIG. 17C illustrates two rays 322a and 322b from the same plane input wave having incident angles of $\alpha_{m1} < \alpha_{si}^{(0)} < \alpha_{m2}$, which impinge on the angular sensitive coupling-out elements 256a and 256b, respectively. Ray 322a is reflected once from the coupling-in element 65a, trapped inside the substrate 310a at an off-axis angle of $\alpha_{in}^{(1)} = \alpha_{in}^{(0)} + 2 \cdot \alpha_{sur1}$, and impinges on the right part of surface 256a at an incident angle of $\alpha_{si}^{(1)} = \alpha_{in}^{(1)} - \alpha_{sur1}$. As a result of condition (c) stated hereinabove, ray 322a passes through surfaces 256a and after a single reflection from the left side of surface 256a, ray 322a continues to propagate inside substrate 310a at an off-axis angle of $\alpha_{in}^{(2)}$, and after a double reflection from 67a is coupled-out from substrate 310a, and redirected into the viewer's eye by the partially reflecting surface 79b. Ray 322b is reflected once from the coupling-in element 65b, trapped inside the substrate 310b at an off-axis angle of $\alpha_{in}^{(1)} = \alpha_{in}^{(0)} + 2 \cdot \alpha_{sur1}$, and impinges on the right part of surface 256b at an incident angle of $\alpha_{si}^{(1)} = \alpha_{in}^{(1)} - \alpha_{sur1}$. As a result of condition (c) stated hereinabove, ray 322b is reflected from surface 256b, coupled-out from the substrate 310b, and is redirected by the partially reflecting surface 79a into the viewer's eye.

The implementation of the angular sensitive reflecting surfaces 256a and 256b utilized in the embodiments of FIGS. 17A, 17B and 17C is illustrated herein with an optical system having the following parameters for the optical system 309:

$$\alpha_{sur1} = \alpha_{sur2} = 9°; F^{(0)} = \{32°, 44°\}; F^{(1)}\{50°, 62°\}$$

$$F^{(2)} = \{68°, 80°\}; F_{sur1}^{(1)} = \{41°, 53°\}); F_{sur1}^{(2)} = \{59°, 71°\}, \qquad (9)$$

The light waves are s-polarized. The optical material of the substrate 64 using Schott N-SF57 having a refractive index of $v_d = 1.846$, and the optical adhesives which are adjacent to surfaces 256a and 256b in FIGS. 17A-17C are NOA-139 and NOA 1315, having refractive indices of $v_d = 1.315$ and $v_d = 1.39$, respectively. The overall FOV of the coupled-in image is $F^{(0)} = \{32°, 44°\}$ (which is practically a FOV of 22° in the air) and the angular range of $F_{sur1}^{(0)} = \{41°, 53°\}$ is divided into three substantially equal segments: $F_{low}^{(0)} = \{41°, 45°\}$, $F_{mid}^{(0)} = \{45°, 49°\}$ and $F_{max}^{(0)} = \{49°, 53°\}$.

FIG. 19A illustrates the graph of the reflection from the angular sensitive reflective surface 256b in FIGS. 17A, 17B and 17C coated with an appropriate AR dielectric coating as a function of the incident angle for three different wavelengths: 450 nm, 550 nm and 650 nm. As shown, the reflection is 100%, due to total internal reflection for angular spectrum above 45.4°, while it is very low for the incident angles of {41°, 44.9°}. FIG. 19B illustrates the graph of the reflection from the angular sensitive reflective surface 256a in FIGS. 17A, 17B and 17C coated with an appropriate AR dielectric coating as a function of the incident angle for three different wavelengths: 450 nm, 550 nm and 650 nm. As shown, the reflection is 100%, due to total internal reflection, for angular spectrum above 48.8°, while it is very low for the incident angles of {41°, 48.6°}.

Since each one of the two substrates 310a, 310b functions independently, there are no longer any constraints on the co-linearity of each adjacent coupling-in and coupling-out surfaces. The only constraint is that for each separate substrate 310a or 310b, the major surfaces and the coupling-in and the coupling-out surfaces should be parallel to each other, respectively. Moreover, each separate substrate can have a different thickness and a different inclination angle, according to the requirements of the optical system.

FIG. 20 illustrates the two marginal and the central light waves of the image which are coupled out from the substrate and redirected into the viewer's eye 24. As shown, the light waves 320, 321 and 322, having the zero order off-axis angles of $\alpha_{in}^{(0)}$(min), $\alpha_{in}^{(0)}$(max) and $\alpha_{in}^{(0)}$(mid), are illuminating each only the parts of the partially reflecting surfaces 79a and 79b which are required to illuminate the EMB 197; the rightmost light wave 321 (dashed-dotted lines) is reflected only from the right surface 79a; the leftmost light wave 320 (dotted lines) is reflected only from the left surface 79b, while the central light wave 322 (dashed lines) is reflected from the left part of the right surface 79a, and the right part of the left surface 79b. All the light waves reach the viewer's eye over the entire extent of the EMB 197. Consequently, the EMB 197 of the embodiment illustrated in FIGS. 17A to 17C and 20 has the same brightness as the embodiment illustrated in FIGS. 5A and 5B, while the output aperture is doubled. Apparently, the brightness of the coupled-out light waves can be increased furthermore by exploiting partially reflecting surfaces 79, which can be dynamically controlled according to the methods illustrated beforehand in relation to FIGS. 6A to 12B. As a result, the brightness of the coupled-out image waves which reaches the viewer's eye can be increased to a level very close to the brightness of the light waves coupled into the substrate, namely, the brightness efficiency of the element can be nearly 1.

FIGS. 17A to 17C and 20 illustrate outlines of embodiments comprising a pair of substrates, and two angular sensitive coupling-out surfaces embedded respectively inside these substrates, wherein the output aperture is increased by a factor of two without reducing the brightness of the projected image. There are systems, however, having a wide FOV and an input aperture remotely located from the EMB, which significantly increase the required output aperture of the main substrate. In these cases, increasing the aperture by a factor of two in not enough and a higher increasing factor is required. To achieve this goal, the above-illustrated increasing method can be generalized to increasing factors of n>2.

Assuming that it is necessary to increase the aperture of the image by a factor of n, as illustrated in FIG. 21, n−1 pairs of angular sensitive coupling-out surfaces should be inserted respectively into the substrates. For each pair, the surfaces should be adjacently located in the same manner as surfaces 256a and 256b are located in substrates 310a and 310b. In addition, the projection of the lower angular sensitive coupling-out surface, over the major surface of the substrate, should be adjacently located to the projection of the upper angular sensitive coupling-out surface of the consecutive pair. The angular range of the light waves which impinge on the coupling-out surfaces $F_{sur1} \equiv \{\alpha_{min}, \alpha_{max}\}$ is divided now into 2n−1 substantially equal segments, by setting 2n−2 equally separated angles $\alpha_j$. That is, $F_1 \equiv \{\alpha_{min}, \alpha_1\}$, $F_2 \equiv \{\alpha_1, \alpha_2\}$ ... $F_j \equiv \{\alpha_{j-1}, \alpha_j\}$ and $F_{2n-1} \equiv \{\alpha_{2n-2}, \alpha_{max}\}$. Assuming that the angular sensitive coupling-out surfaces are denoted as $S_j$, where j is the running index from right (j=1) to left (j=2n−2), then each surface $S_j$ of the 2n−2 elements should fulfill the following conditions for the entire relevant photopic range:

a. substantially totally reflective for the angular range of $\alpha_{si}^{(0)} > \alpha_{2n-j-1}$, and b. substantially transparent for the angular range of $\alpha_{si}^{(0)} < \alpha_{2n-j-1}$, wherein, the coupling-out element $S_j$ should reflect all the impinging light waves having incident angles higher than the limit angle of $\alpha_{2n-j-1}$, to couple-out these light waves from the substrate, and to substantially transmit all the other light waves toward the next coupling-out element $S_{j+2}$. As explained above, the simplest way to achieve these requirements is to cement the optical parts adjacent to the respective coupling-out surface, using optical adhesives having proper refractive indices that yield critical angles of $\alpha_{2n-j-1}$. Also, as previously described, the high transparency for incident angles lower than the respective critical angles, can be achieved using proper AR coatings.

The above illustrated embodiments, comprising n−1 pairs of angular sensitive coupling-out surfaces, will have the following characteristics:

a. The light waves which are coupled-out by each surface $S_j$ (j=1 ... 2n−2) are those in the angular range of $\{\alpha_{2n-j-1}, \alpha_{2n-j+1}\}$ ($\alpha_{min}$ and $\alpha_{max}$ are denoted here as $\alpha_0$ and $\alpha_{2n-1}$ respectively). The light waves coupled-out by the conventional coupling-out element 67a and 67b are those in the angular ranges of $\{\alpha_0, \alpha_2\}$ and $\{\alpha_0, \alpha_1\}$, respectively, while the light waves which are coupled-out by the first surface $S_l$ are those in the angular range of $\{\alpha_{2n-2}, \alpha_{max}\}$.

b. each light wave (inside the angular range of the light waves which impinge on the input surface of the upper pair $F_{sur1} \equiv \{\alpha_{min}, \alpha_{max}\}$) having an incident angle of $\alpha_{j-1} < \alpha_s < \alpha_j$ (j=1 ... 2n−1), is coupled-out by two adjacent surfaces—$S_{2n-j}$ and $S_{2n-j+1}$ and is consequently redirected into the viewer's eye by the respective part of the k partially reflecting surfaces 79$_i$ (i=1 ... k). Therefore, each light wave which is coupled inside the embodiment by total internal reflection, is coupled out by 1/n part of the overall coupling-out element. By proper design, however, substantially all the coupled light waves will cover the designated EMB of the system.

It has been previously assumed that two adjacent substrates are exploited to increase the output aperture by a factor of n without reducing the brightness of the projected image. For systems having a relatively wide FOV, however, it will be more appropriate to utilize three, instead of two adjacent substrates. In that case, as illustrated in FIG. 22, n−1 triplets of angular sensitive coupling-out surfaces should be inserted respectively into the three substrates, 301a, 310b, and 310c. For each triplet the surfaces should be adjacently located, and the projection of the lower angular sensitive coupling-out surface should be adjacently located to the projection of the upper angular sensitive coupling-out surface of the consecutive triplet, in the same manner described heretofore in relation to the double substrate. The angular range of the light waves which impinge on the coupling-out surfaces $F_{sur1} \equiv \{\alpha_{min}, \alpha_{max}\}$ is divided now into 3n−2 substantially equal segments, by setting 3n−3 equally separated angles $\alpha_j$. That is, $F_1 \equiv \{\alpha_{min}, \alpha_1\}$, $F_2 \equiv \{\alpha_1, \alpha_2\}$ ... $F_j \equiv \{\alpha_{j-1}, \alpha_j\}$ and $F_{3n-2} \equiv \{\alpha_{3n-3}, \alpha_{max}\}$. As previously, each surface $S_j$ of the 3n−3 elements should be substantially totally reflective for the angular range of $\alpha_{si}^{(0)} > \alpha_{3n-j-2}$, and substantially transparent for the angular range of $\alpha_{si}^{(0)} < \alpha_{3n-j-2}$.

That is to say, the coupling-out element $S_j$ should reflect all the impinging light waves having incident angles higher than the limit angle of $\alpha_{3n-j-2}$, to couple-out these light waves from the substrate, and to substantially transmit all the other light waves toward the next coupling-out element $S_{j+3}$.

The above illustrated embodiments, comprising n−1 triplets of angular sensitive coupling-out surfaces, will have the following characteristics:

a. The light waves which are coupled-out by each surface $S_j$ (j=1 ... 3n−3) are those in the angular range of $\{\alpha_{3n-j-2}, \alpha_{2n-j+1}\}$ ($\alpha_{min}$ and $\alpha_{max}$ are denoted here as $\alpha_0$ and $\alpha_{3n-2}$ respectively). The light waves coupled-out by the conventional coupling-out element 67a, 67b and 67c are those in the angular ranges of $\{\alpha_0, \alpha_3\}$, $\{\alpha_0, \alpha_2\}$ and $\{\alpha_0, \alpha_1\}$, respectively, while the light waves which are coupled-out by the first surface $S_l$ are those in the angular range of $\{\alpha_{3n-3}, \alpha_{max}\}$.

b. each light wave (inside the angular range of $F_{sur1} \equiv \{\alpha_{min}, \alpha_{max}\}$) having an incident angle of $\alpha_{j-1} < \alpha_s < \alpha_j$ (j=1 ... 3n−2), is coupled-out by three adjacent substrates—$S_{3n-j-1}$, $S_{3n-j}$ and $S_{3n-j+1}$ and is consequently redirected into the viewer's eye by the respective part of the k partially reflecting surfaces 79$_i$ (i=1 ... k).

Clearly, the number of the adjacent substrates that can be exploited to increase to output aperture is not limited to three. Any number m of adjacent substrates and (n−1)·m of angular sensitive surfaces can be utilized according to the various parameters of the optical system.

FIG. 23 illustrates an alternative embodiment for expanding the output aperture wherein not only the coupling-out surfaces, but also some of the coupling-in surfaces, are sensitive to the incident angle of the input waves. As shown, an optical ray 364 impinges on an optical element 355, composed of two substrates 360a and 360b, wherein the lower surface 361b of substrate 360a is attached to the upper surface 361c of substrate 360b defining an interface plane 368. The coupling-in element 365 of the first substrate 360a is an angular sensitive reflecting surface, wherein the coupling-in element 366 of the lower surface is a reflecting surface which is located beneath the surface 365. The input ray 364, which enters the upper substrate 360a through the front surface 363 of the intermediate prism 367, can either be totally reflected by surface 365 and coupled inside the upper substrate 360a (dashed line), can substantially pass through surface 364 to be coupled by surface 367 inside the lower substrate 360b (dotted line), or may be partially reflected by surface 364 and coupled inside substrate 360a, as well as inside substrate 360b.

Ray 364a, which is coupled inside the upper substrate 360a, can either be totally reflected by the angular sensitive reflecting surface 362a to be coupled out from element 355 as ray 364aa, or substantially pass-through surface 362a to be coupled again by surface 362a inside the upper substrate 360a and coupled out from the element 355 by the coupling-out element 67a as ray 364ab, or may be partially reflected by surface 362a and coupled out from element as rays 364aa and 364ab.

Ray 364b, which is coupled inside the lower substrate 360b, can either be totally reflected by the angular sensitive reflecting surface 362b to be coupled out from element 355 as ray 364ba, or could substantially pass-through surface 362b to be coupled again by surface 362b inside the lower substrate 360b and be coupled-out from the element 355 by the coupling-out element 67b as ray 364bb, or be partially reflected by surface 362b and be coupled out from element as rays 364ba and rays 364bb.

The simplest way to obtain element 355 is by designing elements 362a, 362b and 365 as conventional beamsplitters which are not sensitive to the incident angle of the input waves. As a result, each input ray will be evenly split by the partially reflecting surfaces, and hence, be coupled-out from all the reflecting surfaces as rays 364aa, 364ab, 364ba and 364bb. Consequently, for each input light wave the output aperture will be the projection of surfaces 362a, 362b, 67a and 67b on the lower surface 361d. The output aperture is expanded by a factor of 4 compared to the input aperture, which is the projection of surfaces 365 and 367 on surface 361d. Accordingly, however, the brightness of the coupled-out light wave is attenuated by a factor of 4 as compared to that of the input light wave.

Another way to achieve element 355 is to divide the angular range of the light waves $F_{sur1}^{(1)} \equiv \{\alpha_{min}, \alpha_{max}\}$, which impinge on the angular sensitive coupling-in surface 365 and the coupling-out surfaces 362a and 362b at the incident angles of $\alpha_{sur}^{(1)} = \alpha_{in}^{(0)} + \alpha_{sur1} = \alpha_{in}^{(0)} - \alpha_{sur1}$, into four substantially equal segments: $F_{low}^{(1)} \equiv \{\alpha_{min}, \alpha_{m1}\}$, $F_{mid1}^{(1)} \equiv \{\alpha_{m1}, \alpha_{m2}\}$, $F_{mid2}^{(1)} \equiv \{\alpha_{m2}, \alpha_{m3}\}$ and $F_{max}^{(1)} \equiv \{\alpha_{m3}, \alpha_{max}\}$. The aim of the embodiment is that the light waves having the higher incident angles in the FOV of $F_{max}^{(1)} \equiv \{\alpha_{m2}, \alpha_{max}\}$ will be reflected by angular sensitive surface 365 and be coupled into the upper substrate 360a, while the light waves having the lower incident angles in the FOV of $F_{min}^{(1)} \equiv \{\alpha_{min}, \alpha_2\}$ will pass through the angular sensitive surface 365 and be coupled into the lower substrate 360b. After being coupled into the upper substrate, the light waves having the most higher incident angles in the FOV of $F_{max}^{(1)} \equiv \{\alpha_{m3}, \alpha_{max}\}$ will be reflected by angular sensitive surface 362a and be coupled out from the substrate, while the second higher incident angles in the FOV of $F_{mid2}^{(1)} \equiv \{\alpha_{m2}, \alpha_{m3}\}$ will pass through the angular sensitive surface 362a and be coupled out from the substrate by the coupling-out element 67a. After being coupled into the lower substrate, the light waves having the third higher incident angles in the FOV of $F_{mid1}^{(1)} \equiv \{\alpha_{m1}, \alpha_{m2}\}$ will be reflected by angular sensitive surface 362d and coupled out from the substrate, while the most lower incident angles in the FOV of $F_{min}^{(1)} \equiv \{\alpha_{min}, \alpha_{m2}\}$ will pass through the angular sensitive surface 362b and be coupled out from the substrate by the coupling-out element 67b. The main advantage of this option is the output aperture is increased by a factor of 4, but disadvantageously, the achievable EMB of the system is actually zero.

An alternative embodiment is to modify the reflection curves of the angular sensitive surfaces 365, 362a and 362b, such that the reflection curves as a function of the incident angle, will not fall sharply as did those of surfaces 256a and 256b shown in FIGS. 19A and 19B. As seen, part of the light waves will be coupled into both the upper and the lower substrates and part of the light waves which are coupled inside a given substrate 360i (i=a,b) will be coupled-out by both the angular sensitive surface 362i and the coupling-out element 67i. Specifically, part of the light waves in the second highest angular segment $F_{mid2}^{(1)}$ will pass through surface 365 and be coupled inside the lower substrate 360b, while part of the light wave in the angular segment $F_{mid2}^{(1)}$ will be reflected by surface 365 and coupled inside the upper substrate 360a. The light waves having the incident angles in the FOV of $F_{up}^{(1)} \equiv \{\alpha_{up}, \alpha_{max}\}$ will be coupled inside the upper substrate 360a (wherein $\alpha_{up} < \alpha_{m2}$), while the light waves having the incident angles in the FOV of $F_{low}^{(1)} \equiv \{\alpha_{min}, \alpha_{low}\}$ will be coupled inside the lower substrate 360b (wherein $\alpha_{low} > \alpha_{m2}$) As a result, the light waves having the incident angles in the FOV of $F_{both}^{(1)} \equiv \{\alpha_{up}, \alpha_{low}\}$ will be coupled inside the upper substrate 360a as well as the lower substrate 360b.

Similarly, part of the light waves in the second highest angular segment $F_{mid2}^{(1)}$ will be reflected by surface 362a and coupled out the substrate 360a, while part of the light wave in the angular segment $F_{max}^{(1)}$ will pass through surface 362a and be coupled out the substrate 360a by the coupling-out element 67a. In addition, part of the light waves in the angular segment $F_{min}^{(1)}$ will be reflected by surface 362b and coupled out the substrate 360b, while part of the light wave in the angular segment $F_{mid1}^{(1)}$ will pass through surface 362b and be coupled out the substrate 360b by the coupling-out element 67b. By proper design, the output brightness of the coupled-out light waves will be moderately attenuated, but the requested EMB of the system will be covered by the entire angular range of the output light waves.

Another issue to consider is the maximum achievable FOV of the image which is projected into the viewer's eye. In most of the substrate-guided based HMD technologies, either reflective or diffractive, the light waves are coupled out from the guiding substrate substantially normal to the major surfaces of the substrate. Consequently, due to the Snell refraction from the substrate the external FOV of the image is:

$$F^{(out)} \sim F^{(in)} \cdot v_s \qquad (10)$$

wherein the FOV inside the substrate is $F^{(in)}$ and the refractive index of the substrate is $v_s$. The orders of the light waves which are coupled inside the substrate should be strictly separated, namely, $$\alpha_{min}^{(1)} \alpha_{min}^{(0)} + 2 \cdot \alpha_{sur1} > \alpha_{max}^{(0)}. \quad (11)$$

Therefore, the internal FOV is limited by the constraint $$F^{(in)} = \alpha_{max}^{(0)} - \alpha_{min}^{(0)} < 2 \cdot \alpha_{sur1}, \quad (12)$$

wherein usually a margin of at least 2 degrees should be kept between $\alpha_{max}^{(0)}$ and $\alpha_{min}^{(1)}$ to confirm the separation between the two orders. The limitation of Eq. (12) yields for systems wherein the refraction indices of the substrate, the coupling-in and the coupling-out elements are equal.

Referring to FIGS. 24A and 24B, the substrates 360a and 360b, the coupling-in prism 367, and the redirecting prism 80 are all fabricated from the same optical material, and as a result, the two marginal rays, 371 and 372, coupled inside the element 355, are refracted into different directions only when passing through the input surface 363 and the output surface 361a of the system. As a result of the similarities between the optical materials which compose element 355, the coupled rays do not experience any refraction when passing through the interface surfaces 369, 81 between the substrates and the coupling-in 367 and the redirecting 80 prisms, respectively. Since the optical rays are refracted only at angles with close proximity to the normal of the entrance 363 and the exit 361a surfaces, the directions of the rays are modified according to the approximated equation:

$$\alpha_{out} \sim \frac{v_{in}}{v_{out}} \cdot \alpha_{in}, \quad (13)$$

and subsequently, the limitation of Eq. (10) is sustained.

The fact that the optical rays enter the substrate at highly oblique angles can be exploited to improve the above limitation. As illustrated in FIG. 24B, the coupling-in 367 and the redirecting 80 prisms as fabricated from the same optical material having refractive index which have the following optical characteristics $$v_p < v_s; A_p \sim A_s \quad (14)$$

wherein $v_p$ is the refractive index of the prisms 367 and 80, and $A_p$, $A_s$ are the Abbe numbers of the prisms and the substrates respectively. As a result of the dissimilarities between the optical material of the substrates 360a, 360a and that of the coupling-in 367 and the redirecting prisms 80, and the high obliquity that rays 371 and 372 incident at the interface surfaces 369 and 81, the rays currently experience substantial refraction when passing through the interface surfaces 369 and 81. Since prisms 367 and 80 have the same optical characteristics, the refractions at surfaces 369 and 81 for each passing ray will have the same magnitude and the opposite directions respectively, and therefore, they will be mutually compensated. The angular deviation between two different light rays inside the prisms as a function of the deviation inside the substrates can be calculated according to the approximated equation $$\Delta \alpha_p \sim \frac{v_s}{v_p} \cdot \frac{\cos \alpha_s}{\cos \alpha_p} \cdot \Delta \alpha_s, \quad (15)$$

wherein $\alpha_s$ and $\alpha_p$ are the off-axis angles inside the substrate and the prisms, respectively. Similarly, the angular deviation between the rays outside of element 355 is $$\Delta \alpha_{out} \sim v_p \cdot \Delta \alpha_p. \quad (16)$$

Consequently, the ratio between the angular deviation outside element 355 and inside the substrates 360a and 360b is $$\Delta \alpha_{out} \sim v_s \cdot \frac{\cos \alpha_s}{\cos \alpha_p} \cdot \Delta \alpha_s, \quad (17)$$

or $$F^{(out)} \sim F^{(in)} \cdot v_s \frac{\cos \alpha_s}{\cos \alpha_p}. \quad (18)$$

That is to say, by modifying the optical material of the prisms 369 and 80, it is possible to increase the FOV of the system in the air by a factor of $$\frac{\cos \alpha_s}{\cos \alpha_p}.$$

It should be noted that in order to keep the constraint of Eq. (12), the light waves having the incident angles of $\alpha_{in}^{(1)} < \alpha_{up}$ should not be coupled inside the upper substrate 360a, and the light waves having the incident angles of $\alpha_{in}^{(1)} > \alpha_{low}$ should not be coupled inside the lower substrate 360b. The first requirement can be achieved by constructing the interface surface 369 as an angular sensitive reflecting surface, which will be substantially total reflective for the angular range of $\{\alpha_{up}, \alpha_{max}\}$ and substantially transparent for the angular range of $\{\alpha_{min}, \alpha_{up}\}$, in a similar manner to the construction of surfaces 256a and 256b, as illustrated in relation to FIGS. 19A and 19B. As a result, all the light waves in the angular range of $\{\alpha_{min}, \alpha_{up}\}$ which will be reflected by surface 365 will be coupled-out from the upper substrate through surface 369 into the prism 367 and blocked by surface 379 of prism 367. The second requirement could be achieved by causing that all the light waves in the angular range of $\{\alpha_{low}, \alpha_{max}\}$ to be totally internally reflected by surface 365, and hence, be coupled inside only the upper substrate 360a.

It should be further noted here that for the most of the relevant display systems, the two requirements should be fulfilled over the entire photopic region. As mentioned with regard to the fabrication process of the angular sensitive surfaces 256a and 256b, it is usually required that the Abbe numbers of the optical adhesive, which is adjacent to the surface and the optical material of the substrate, will be similar to avoid undesired chromatic effects in the image. There are cases, however, wherein the Abbe numbers of the adhesive and the optical material are substantially different. The chromatic dispersion due to the variation between the Abbe numbers can be compensated by choosing an optical material for the coupling-in and the redirecting of prisms 367 and 80, having an Abbe number which is different than that of the substrates 360a and 360b. By proper selection, the difference between the Abbe numbers can induce a chromatic dispersion having the same magnitude and opposite direction. As a result, the two induced dispersions will be mutually compensated.

The implementation of the angular sensitive reflecting surfaces 362a, 362b and 365 utilized in the embodiment of FIG. 24B illustrated herein with an optical system having the following parameters for substrate 360a:

$\alpha_{sur1}=\alpha_{sur2}=8°; F^{(0)}=\{38°,50°\}; F^{(1)}=\{54°,66°\}$ $F^{(2)}=\{70°,82°\}; \alpha_{sur}^{(1)}=\{46°,58°\}; \alpha_{sur}^{(2)}=\{62°,74°\},$  (19)

and the following parameters for substrate 360b:

$\alpha_{sur1}=\alpha_{sur2}=10.5°; F^{(0)}=\{31°,43°\}; F^{(1)}=\{52°,64°\}$ $F^{(2)}=\{73°,85°\}; \alpha_{sur}^{(1)}=\{41.5°,53.5°\}; \alpha_{sur}^{(2)}=\{62.5°, 74.5°\}.$  (20)

The light waves are non-polarized. The optical material of the substrates 360a and 360b is advantageously Ohara S-LAH88 having a refractive index of $v_d=1.917$, an Abbe number of 30.6, and the optical material of the prisms 367 and 80 is Ohara S-FTM-88 having a refractive index of $v_d=1.592$ and an Abbe number of 35.3. The optical adhesives which are adjacent to surfaces 369, 365, 368 (and 81), 362a and 362b are NOA 142, NOA 76, NOA 148, Noa 170 and NOA 61, having refractive indices of $n_s=1.42$, 1.51, 1.48, 1.70 and 1.56, respectively. The overall FOV of the coupled-in image inside the substrates 360a and 360b is $F^{(0)}=\{31°, 50°\}$. The overall FOV of the coupled-in image inside the prisms 80 and 367 is $F^{(0)}=\{38°, 67°\}$, and the overall FOV of the coupled-in image in the air is $F^{(0)}=\{-23°, 23°\}$, namely, the system has an FOV of 46° along a single axis. The thickness of each substrate is 1 mm and the active area of the output and the input apertures are 25.5 mm and 6.5 mm, respectively.

The FOV in the air, as seen by the viewer, is expanded by a factor of 2.4 as compared to the combined FOV inside the substrates 360a and 360b, and therefore, the limitation given in Eq. (10) is overcome. By utilizing the expansion illustrated in FIG. 24B, wherein the refractive index of prisms 367 and 80 is substantially smaller than that of the substrates 360a and 360b, it is possible to materialize a system wherein the ratio between the external FOV in the air and the FOV inside the substrate is significantly bigger than the refractive index of the substrate. This expansion can be exploited not only for the specific configuration illustrated in FIG. 24B, but generally for any substrate, even with a single coupling-out element, having optical material different than the coupling-in and the redirecting prisms.

FIGS. 25A to 25C illustrate the reflectance curves of the angular sensitive reflecting surfaces 362a, 362b and 365 as the function of the normalized FOV inside the substrates.

FIG. 26 illustrates the efficiency of element 355 as a function of the FOV. As shown, in most of the FOVs the efficiency is between 45% and 50%, while at the edges of the FOVs the efficiency is substantially higher. Even though the output aperture is expanded by a factor of four, the efficiency is attenuated only by a factor of two. Regarding the non-uniformity of the efficiency at the edges of the FOV, for most of the back and front illuminated displays such as LCD and LCOS, the illumination, and hence, the brightness of the display sources, are usually stronger at the center of the display as a result of the Gaussian distribution of the illuminating light source. Consequently, the non-uniform efficiency curve of the system can compensate for the non-uniform illumination, and in addition, the brightness of the coupled-out image can be improved. For display sources having a uniform brightness distribution, it is possible to attenuate the higher intensities at the edges of the image either electronically or optically by reducing the reflectance of surface 67b of FIG. 24B for light waves at the left edge of the FOV and by reducing the transmission of surface 81 for light waves at the right edge of the FOV.

The expansion can be exploited not only for the specific configuration illustrated in FIG. 24B, but generally for any substrate. As illustrated in FIG. 27A, this expansion is utilized for a system having a single substrate 64 and a single coupling-out surface 67, wherein the two marginal rays 382 and 383 are coupled into the substrate through a coupling-in prism 367 and are redirected into the viewer's eye 24 by a redirecting prism 80, wherein the substrate 64 has an optical material different than the coupling-in and the redirecting prisms. FIG. 27B illustrates an embodiment wherein the marginal rays 386 and 389 are coupled into the substrate by reflection from an external surface 363 of the coupling-in prism 367.

The non-uniformity of the projected image into the viewer's eye will be referred to with reference to FIG. 28A. Three different rays, 331, 332 and 333a are coupled-out from the substrate 64 by coupling-out element 67 and then redirected by the partially reflecting surfaces 79a and 79b into the viewer's eye. On the other hand, ray 333b pass through surface 79b before being reflected by surface 79a. As a result, the brightness of ray 333b is attenuated by surface 79b, as a function of the transmittivity of that surface, before reaching the viewer's eye. As illustrated in FIG. 28B, which plots the normalized brightness of the coupled-out light waves as a function of the lateral coordinate x of the output aperture 89, the output brightness is reduced at a central part of the output aperture. This brightness pattern has the form of a dark stripe over a bright background, or, for an array of several partially reflecting surfaces 79a, 79b, 79c . . . , a pattern of alternating dark and bright stripes, not shown. For near-to-eye displays, the eye integrates the light wave emerging from a single viewing angle and focuses it onto one point on the retina, and since the response curve of the eye is logarithmic, small variations, if any, in the brightness of the display, will not be noticeable. Therefore, if the stripes are dense enough (namely, the lateral dimension of each stripe is significantly smaller than the eye's pupil), and if the eye is positioned close enough to the substrate, the viewer can still experience a high-quality image even with the stripes. For displays which are located at a distance from the eye, however, such as head-up displays (HUDs), the stripes will be noticeably seen by the viewer's eyes, which significantly reduces image quality and the overall performance of the optical system. Therefore, a solution must be found to the stripes phenomenon to allow the exploitation of the projection elements, proposed in this application, for far-from-eyes applications.

There are several different alternatives for achieving the HUD configuration. As illustrated in FIG. 29A, a collimated image 322a, 322b is coupled into the substrates 310a, 310b from the side part of the viewer's head and is propagating inside the substrate along the horizontal axis. In that case, exit pupil of the optical system 255a is determined by both eyes of the viewer, and hence, is extended significantly compared to an EMB of a near-to eye system, wherein the image is projected into a single eye of a viewer. Consequently, the output aperture of the optical system should be increased accordingly, a single coupling-out element is not enough and at least a few different coupling-out elements should be utilized to accomplish the required aperture.

FIG. 29A illustrates a possible embodiment wherein four coupling-out elements, 256a, 256b, 67a and 67b, are utilized according to the embodiment in relation to FIG. 17. The problem with the dark stripes occurs in this embodiment: while the light rays 322ba and 322bb are coupled out from the substrates 310a and 310b by the coupling-out elements 67a and 256b, respectively, and then redirected by the partially reflecting surfaces 79d and 79b into the viewer's eyes, and ray 322ba is attenuated by surface 79b before being reflected by surface 79c into the viewer's eyes. A possible solution for the non-uniformity problem is to utilize a single partially reflecting surface 79 (as illustrated in FIG. 5A) instead of an array of surfaces. The result of utilizing this solution, however, is that the thickness of the prism 80, and consequently the size of the entire optical system, will be increased beyond the point of a reasonable use of the system. Another possible solution is to utilize a dense array of surfaces wherein the lateral dimension of each element is in the order of 1-2 mm. As a result, the lateral dimension of the partially blocked segment in each element will be in the order of 0.1-0.2 mm and will be unnoticeable at a watching distance of 30-50 cm.

An alternative solution to the non-uniformity problem, exploiting dynamically controlled partially reflecting surfaces, is illustrated in FIGS. 29B and 29C. It is assumed that the dynamic surfaces 79i (i=a,b, . . . ) are operated as a totally reflective p section (p<1) of each frame-time to yield a system having a reflectivity of p and a transmissivity of (1−p). Instead of operating the reflectance of all the dynamic surfaces simultaneously, it is possible to operate them alternately, namely, the surfaces having an odd index and those having an even index are activated as reflective surfaces at two exclusively separated operating times during each frame-time. Since each surface is partially blocked only by its right adjacent surface, and two adjacent surfaces are not activated simultaneously any more, the partial blocking problem is avoided. As illustrated in FIG. 29B, only surfaces 79a, 79c and 79e are activated, during the first period of time p, as fully reflective, while surfaces 79b and 79d are fully transparent. As a result, ray 322ba is no longer blocked by surface 79b and is redirected, after being coupled-out by surface 256b, into the viewer's eyes. As illustrated in FIG. 22C, only surfaces 79b and 79d are activated, during the second period of time p, as fully reflective while surfaces 79a, 79c and 79e, are fully transparent. Now, the light rays 322a and 322bb are coupled out from the substrates 310a and 310b by the coupling-out elements 67a and 256b, respectively, and then redirected by the active reflective surfaces 79d and 79b into the viewer's eyes, while ray 322ba passes through the transparent surface 79c. With this proposed embodiment, different rays reach the viewer's eye at different time slots. All of these time slots, however, are contained in the same frame-time, for all the light rays of the image. Therefore, because of the persistence of vision, the light rays from all the pixels of the display source will be integrated into the viewer's eye, thereby creating a single image. Since the two sets of surfaces are alternately operated at two distinct time periods p during a single time frame, the value of p should satisfy the condition $$p<0.5. \quad (21)$$

As a result, the efficiency of the projected image into the viewer's eyes cannot exceed the value of 50%.

An alternate configuration for the HUD embodiment, wherein the display source and the collimating module 360 are positioned at the lower (or the upper) part of the optical module and the coupled light waves are propagating along the vertical axis, is illustrated in FIGS. 30A to 30B. Here, the exit pupil is extended along the normal axis to the propagation direction inside the substrate and the aperture should be extended accordingly. The non-uniformity issue can also be solved here similarly to the manner illustrated with reference to FIGS. 29A to 29C, but an even simpler solution can be utilized here. Unlike the embodiments of near-to-eye displays, wherein the combiner should be substantially normal to the line-of-sight of the viewer, for the HUD configurations, it is possible to rotate the combiner around the horizontal axis (or another axis which is normal to the line of sight of the viewer) at a substantial angle, which is usually around 45□.

As illustrated in FIG. 31A, it is possible to design the configuration of the coupling-in and the coupling-out element, such that the central light wave of the image (that is, the light wave which is located at the center of the FOV of the image), after being coupled-out by the coupling-out element, is refracted from the substrate at a direction which is oriented at a substantial off-axis angle which is nearly 45° relative to the major surfaces of the substrate. As a result, since the substrate is rotated at an approximate angle of 45°, the partially reflecting surface 79 should not be rotated with respect to the major surface to redirect the light waves into the viewer's eyes. Element 79 can be a single flat partially reflecting element which is attached to the major surface 72 of the substrate. Consequently, the light waves which are coupled out from the substrate are redirected into the viewer's eye by a flat uniform surface and the nonuniformity issue is totally aborted.

FIGS. 31A to 31C illustrate a possible embodiment wherein four coupling-out elements, 256a, 256b, 67a and 67b, are utilized to expend the output aperture along the vertical axis according to the aforementioned embodiments in relation to FIGS. 17A to 17C. Seen in FIG. 31A are two rays 420a and 420b from the same plane input wave having incident angles of $\alpha_{m1}<\alpha_{si}^{(0)}<\alpha_{m2}$, which impinge on the angular sensitive coupling-out elements 256a and 256b, respectively. Ray 420a is reflected once from the coupling-in element 65a, trapped inside the substrate 410a at an off-axis angle of $\alpha_{in}^{(1)}=\alpha_{in}^{(0)}+2\cdot\alpha_{sur1}$, and impinges on the right part of surface 256a at an incident angle of $\alpha_{si}^{(1)}=\alpha_{in}^{(1)}-\alpha_{sur1}$. As a result of condition (c) described with reference to FIGS. 17A to 17C hereinabove, ray 420a passes through surfaces 256a and after a single reflection from the left side of surface 256a, it continues to propagate inside substrate 410a at an off-axis angle of $\alpha_{in}^{(2)}$, and after a double reflection from surface 67a is coupled-out from substrate 410a, and redirected into the viewer's eye by the flat partially reflecting surface 79. Ray 420b is reflected once from the coupling-in element 65b, trapped inside the substrate 410b at an off-axis angle of $\alpha_{in}^{(1)}=\alpha_{in}^{(0)}+2\cdot\alpha_{sur1}$, and impinges on the right part of surface 256b at an incident angle of $\alpha_{si}^{(1)}=\alpha_{in}^{(1)}-\alpha_{sur1}$. As a result of condition (c) described hereinabove, ray 420b is reflected from surface 256b, coupled-out from the substrate 410b and is redirected by the flat partially reflecting surface 79 into the viewer's eye, wherein the parallel rays 420a and 420b propagate substantially co-linear to the viewer's line-of-sight.

FIG. 31B illustrates two rays 421a and 421b from the same plane input wave having incident angles of $\alpha_{si}^{(1)}<\alpha_{m1}$ which impinge on the angular sensitive coupling-out elements 256a and 256b, respectively. As a result of condition (b) described hereinabove with reference to FIGS. 17A to 17C, both rays pass through surfaces 256a and 256b. Ray 421a is reflected twice from the coupling-in element 65a, trapped inside the substrate 410a at an off-axis angle of $\alpha_{in}^{(2)}=\alpha_{in}^{(0)}+4\cdot\alpha_{sur1}$, and reflected once from surface 256a before being impinged on the left part of surface 256a at an incident angle of $\alpha_{si}^{(1)}=\alpha_{in}^{(1)}-\alpha_{sur1}$. Ray 421b is reflected once from the coupling-in element 65b, trapped inside the substrate 410b at an off-axis angle of $\alpha_{in}^{(2)}=\alpha_{in}^{(0)}+2\cdot\alpha_{sur1}$, and impinges on the left part of surface 256b at an incident angle of $\alpha_{si}^{(1)}=\alpha_{in}^{(1)}-\alpha_{sur1}$. After passing through surface 256a, ray 421a continues to propagate inside substrate 410a at an off-axis angle of $\alpha_{in}^{(1)}$, and after a single reflection from surface 67a is coupled-out from substrate 410a and redirected into the viewer's eye by the flat partially reflecting surface 79. After passing through surface 256b, ray 421b is reflected once from the left side of surface 256b, continues to propagate inside substrate 410b at an off-axis angle of $\alpha_{in}^{(2)}$, and after a double reflection from surface 67b is coupled-out from substrate 410b, and redirected into the viewer's eye by the flat partially reflecting surface 79.

FIG. 31C illustrates two rays 422a and 422b from the same plane input wave having incident angles of $\alpha_{si}^{(0)} > \alpha_{m2}$ which impinge on the angular sensitive coupling-out elements 256a and 256b, respectively. As a result of condition (a) described hereinabove with reference to FIGS. 17A to 17C, both rays are reflected from surfaces 256a and 256b and are coupled-out from the substrates 410a and 410b by these angular sensitive reflective surfaces, respectively. Ray 422a is reflected once from the coupling-in element 65a, trapped inside the substrate 410a at an off-axis angle of $\alpha_{in}^{(1)} = \alpha_{in}^{(0)} + 2 \cdot \alpha_{sur1}$, and impinges on the right part of surface 256a at an incident angle of $\alpha_{si}^{(1)} = \alpha_{in}^{(1)} - \alpha_{sur1}$. Ray 422b is reflected twice from the coupling-in element 65b, trapped inside the substrate 410b at an off-axis angle of $\alpha_{in}^{(2)} = \alpha_{in}^{(0)} + 4 \cdot \alpha_{sur1}$, and is reflected once from surface 256b before being impinged on the left part of surface 256b at an incident angle of $\alpha_{si}^{(1)} = \alpha_{in}^{(1)} - \alpha_{sur1}$. After being reflected and coupled-out from the substrates, rays 422a and 422b are redirected by the flat partially reflecting surface 79 into the viewer's eye.

The implementation of the rotated HUD system utilized in the embodiments of FIGS. 31A to 31C is illustrated herein with an optical system having the following parameters:

$$\alpha_{sur1} = \alpha_{sur2} = 12°; F^{(0)} = \{18°, 28°\}; F^{(1)} = \{42°, 52°\}$$

$$F^{(2)} = \{66°, 76°\}; F_{sur1}^{(1)} = \{30°, 40°\}; F_{sur1}^{(2)} = \{54°, 64°\}, \quad (22)$$

The light waves are s-polarized and the system has a quasi-monochromatic display source having a wavelength of $\lambda = 550$ nm. The optical material of the substrate 64 is Schott N-SF57 having a refractive index of $v_d = 1.846$, and the optical adhesives which are adjacent to surfaces 256a and 256b is NOA 1315, having refractive indices of $v_d = 1.315$. The overall FOV of the coupled-in image is $F^{(0)} = \{18°, 28°\}$ (which is practically an FOV of $F^{(air)} = \{35°, 61°\}$ in the air). The angular range of $F_{sur1}^{(0)} \equiv \{30°, 40°\}$ is divided into three substantially equal segments: $F_{low}^{(0)} \equiv \{30°, 33.3°\}$, $F_{mid}^{(0)} \equiv \{33.3°, 36.7°\}$ and $F_{max}^{(0)} \equiv \{(36.7°, 40°\}$. The optical materials which yield critical angles of 33.3° and 36.7° for a substrate having a refractive index of $v_d = 1.846$ should be 1.013 and 1.103, respectively. Optical material having the required optical indices cannot be practically found. Therefore, for optical system using quasi-monochromatic light it is possible to "shift" leftward the reflectance curve of the angular sensitive surface utilizing a proper dielectric coating.

FIG. 32A illustrates a graph of the reflection from the angular sensitive reflective surface 256a in FIGS. 31A to 31C, coated with an appropriate dielectric coating as a function of the incident angle for the wavelength of 550. As shown, the reflection is substantially 100%, even below the critical angle of 45□, for angular spectrum above 37°, while it is very low for the incident angles of {30°, 36.4° }. FIG. 25B illustrates the graph of the reflection from the angular sensitive reflective surface 256b in FIGS. 24A to 24C coated with an appropriate dielectric coating as a function of the incident angle for the wavelength of 550. As shown, the reflection is 100%, even below the critical angle of 45□, for angular spectrum above 33.7°, while it is very low for the incident angles of {30°, 33°}.

FIG. 33 illustrates two marginal and central light waves of the image which are coupled out from the substrate and redirected into the viewer's eyes 24R and 24L. As shown, the light waves 420, 421 and 422, having the zero order off-axis angles of $\alpha_{in}^{(0)}$(min), $\alpha_{in}^{(0)}$(max) and $\alpha_{in}^{(0)}$(mid), are illuminating each only the parts of the flat partially reflecting surface 79 which are required to illuminate the EMB. That is to say, the rightmost light wave 422 (dashed-dotted lines) is reflected only from the right part of surface 79, the leftmost light wave 421 (dashed lines) is reflected only from the left part of surface 79, while the central light wave 420 (dotted lines) is reflected from the central part of surface 79. All the light waves reach the viewer's eyes over the entire extent of the HMB 297. Consequently, the HMB 297 of the embodiment illustrated in FIG. 33 has been extended without decreasing the image's brightness, and when the non-uniformity issue is entirely resolved. The brightness of the coupled-out light waves can be increased even furthermore by exploiting a dynamically controlled partially reflecting surface 79. The maximal efficiency of the dynamic surface 79 is not currently limited to 50% as in the embodiment illustrated in FIG. 29, and it can be practically increased to nearly 100%. That is to say, the brightness of the coupled-out image waves which reaches the viewer's eyes could be close to the brightness of the light waves coupled into the substrate.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects $\alpha_s$ illustrative and not restrictive, the scope of the invention being indicated by the appended claims rather than by the foregoing description, and all changes which come within the meaning and range of equivalency of the claims are therefore intended to be embraced therein.

In particular it should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

The invention claimed is:

1. An optical device, comprising:
   an input aperture;
   an output aperture;
   a light-transmitting substrate having at least two major surfaces and edges, composed of a first optical material;
   a coupling-in element positioned outside of the substrate and composed of a second optical material, for coupling light waves having a field-of view into the substrate;
   a first flat reflecting surface located between the two major surfaces of the light-transmitting substrate for reflecting the coupled-in light waves to effect total internal reflection from the major surfaces of the substrate;
   a second flat reflecting surface having at least one active side located between the two major surfaces of the light-transmitting substrate for coupling light waves out of the substrate, and a redirecting optical element positioned outside of the substrate for redirecting light waves coupled-out from the substrate into a viewer's eye, wherein the refractive indices of the first and the second optical materials are substantially different and the ratio between the field of view of the light waves coupled-out from the substrate into the viewers' eye and the field of view of the light waves coupled inside the substrate, is substantially bigger than the refractive index of the first optical material.

2. The optical device according to claim 1 wherein light waves trapped inside the substrate are substantially reflected at least twice by the active side of the second reflecting surface before being coupled out from the substrate and redirected into the viewer's eye.

3. The optical device according to claim 1 wherein the light waves are redirected into the viewer's eye substantially normal to the major surfaces of the substrate.

4. The optical device according to claim 1 wherein the redirecting optical element is a transparent prism composed of a third optical material and comprising at least one partially reflecting surface, and the optical characteristics of the second and the third optical materials are similar to each other.

5. The optical device according to claim 4 wherein the coupling-in element is a prism having at least two external surfaces, one of the external surfaces of the prism is optically attached to one of the major surfaces of the substrate defining a first interface plane, light waves to be coupled into the substrate by the coupling-in element substantially pass through the first interface plane before being reflected by the first reflecting surface without any significant reflectance, and light waves coupled inside the substrate after a reflection from the first reflecting surface are substantially reflected by the first interface plane without any significant transmittance.

6. The optical device according to claim 4 wherein the light waves pass through two external surfaces of the coupling-in element before being coupled into the substrate.

7. The optical device according to claim 4 wherein the light waves are reflected from one of the external surfaces of the coupling-in element before being coupled into the substrate.

8. The optical device according to claim 4 wherein the transmittance and the reflectance of the partially reflecting element are dynamically controlled.

9. The optical device according to claim 8 wherein the transmittance and the reflectance of the partially reflecting element are manually controlled by the viewer.

10. The optical device according to claim 8 further comprising a photometer for measuring the brightness of the external scene, wherein the transmittance and the reflectance of the partially reflecting element are set according to the brightness detected by the photometer.

11. The optical device according to claim 8 further comprising a display source characterized by a frame-time, wherein light waves from the display source are coupled inside the substrate, the transmittance and the reflectance of the partially reflecting element is dynamically controlled during each frame-time of the display source.

12. The optical device according to claim 11 wherein reflectance of different parts of the partially reflecting element can be alternately controlled during each frame-time of the display source.

13. The optical device according to claim 12 wherein the substrate is rotated around an axis which is substantially normal to the line of sight of the viewer, the central light wave of the image is refracted from the substrate at a direction which is oriented at a substantial off-axis angle relative to the major surfaces of the substrate.

14. An optical device according to claim 4 wherein the partially reflecting element is a single flat element attached to one of major surfaces of the substrate.

15. The optical device according to claim 1 further comprising a first angular sensitive reflecting surface located between the two major surfaces of the light-transmitting substrate for coupling light waves out of the substrate, wherein at least part of the light waves impinging on the first angular sensitive reflecting surface are substantially reflected from the surface and at least part of the light waves impinging on the first angular sensitive reflecting surface substantially pass through the surface.

16. The optical device according to claim 15 wherein the first angular sensitive reflecting surface is optically cemented to the substrate using an optical adhesive having a refractive index lower than the refractive index of the substrate.

17. The optical device according to claim 1 further comprising a second light-transmitting substrate having at least two parallel major surfaces and edges, an optical element for coupling light waves into the second substrate to effect total internal reflection and at least two flat reflecting surfaces located between the two major surfaces of the second light-transmitting substrate for coupling light waves out of the second substrate, wherein at least one of the flat reflecting surfaces is a second angular sensitive reflecting surface, the two substrates are optically cemented to each other by means of an optical adhesive defining a second interface surface, and the refractive index of the optical adhesive is lower than the refractive index of at least one of the substrates.

18. The optical device according to claim 1 wherein the refractive index of the first optical material is smaller than two and the ratio between the field of view of the light waves coupled-out from the substrate into the viewers' eye and the field of view of the light waves coupled inside the substrate is substantially bigger than two.

19. An optical device, comprising:
an input aperture;
an output aperture;
a light-transmitting substrate having at least two major surfaces and edges, composed of a first optical material;
a coupling-in element positioned outside of the substrate for coupling light waves having a field-of view into the substrate;
a first flat reflecting surface located between the two major surfaces of the light-transmitting substrate for reflecting the coupled-in light waves to effect total internal reflection from the major surfaces of the substrate;
a second flat reflecting surface having at least one active side located between the two major surfaces of the light-transmitting substrate for coupling light waves out of the substrate, and
a redirecting optical element positioned outside of the substrate material, comprising at least one partially reflecting surface, and composed of a second optical material, for redirecting light waves coupled-out from the substrate into a viewer's eye,
wherein the refractive indices of the first and the second optical materials are substantially different and the ratio between the field of view of the light waves coupled-out from the substrate into the viewers' eye and the field of view of the light waves coupled inside the substrate, is substantially bigger than the refractive index of the first optical material.

20. The optical device according to claim 19, wherein the coupling-in element is a transparent prism composed of a third optical, and the optical characteristics of the second and the third optical materials are similar to each other.

* * * * *